US012671571B2

(12) United States Patent　(10) Patent No.:　US 12,671,571 B2

Edge　(45) Date of Patent:　Jun. 30, 2026

(54) SYSTEMS AND METHODS FOR SUPPORT OF SECURITY FOR SIDELINK COMMUNICATION AND POSITIONING

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 18/597,512

(22) Filed: Mar. 6, 2024

(65) Prior Publication Data

US 2024/0305443 A1　Sep. 12, 2024

Related U.S. Application Data

(60) Provisional application No. 63/488,963, filed on Mar. 7, 2023.

(51) Int. Cl.
H04L 9/06　　　(2006.01)
H04W 92/18　　(2009.01)

(52) U.S. Cl.
CPC ........... H04L 9/0618 (2013.01); H04W 92/18 (2013.01)

(58) Field of Classification Search
CPC ....... H04L 9/0618; H04L 9/0833; H04L 9/06; H04W 92/18
See application file for complete search history.

(56) References Cited

U.S. PATENT DOCUMENTS 9,912,479 B1 *　3/2018　Yamada ................. H04L 9/002
11,736,283 B2 *　8/2023　Nix ......................... H04W 4/70
　　　　　　　　　　　713/168

(Continued)

FOREIGN PATENT DOCUMENTS

WO　　　2020155138 A1　8/2020

OTHER PUBLICATIONS

Escott A (Qualcomm Incorporated )., et al., "A New Solution for Group Communication Security for Ranging/SL Positioning Services", 3GPP Draft, 3GPP TSG-SA3 Meeting #110, S3-230818, Type PCR, FS_Ranging_SL_SEC, 3rd Generation Partnership Project, Mobile Competence Centre, 650, Route Des Lucioles, F-06921 Sophia-Antipolis Cedex, France, vol. 3GPP SA 3, No. Athens, GR, Feb. 20, 2023-Feb. 24, 20230224, Feb. 13, 2023, XP052237269, 4 pages, the whole document.

(Continued)

*Primary Examiner* — Quazi Farooqui
(74) *Attorney, Agent, or Firm* — Thien T. Nguyen

(57)　　　ABSTRACT

Techniques are described for supporting secure sidelink communication and secure sidelink positioning for user equipments (UEs). A server may configure each UE with a private cipher key, a random value and derived cipher keys. Two UEs may exchange their random values and may each use their private cipher key and a received random value to determine a derived cipher key already configured in the other UE. The two derived cipher keys now known to both UEs can enable secure communication and positioning. In a degenerate case, a Type B UE is configured with a random value and a derived cipher key which can be determined by a Type A UE configured with a private cipher key using the random value. The technique can be extended to secure communication and positioning for a group of UEs.

20 Claims, 19 Drawing Sheets

(56)                    References Cited

U.S. PATENT DOCUMENTS

| | | | | |
|---|---|---|---|---|
| 12,081,972 B2 * | 9/2024 | Escott | .................... | H04L 9/3273 |
| 2021/0120404 A1 * | 4/2021 | Sun | ......................... | H04L 9/321 |

OTHER PUBLICATIONS

International Search Report and Written Opinion—PCT/US2024/018840—ISA/EPO—May 29, 2024.
Soveri M. C (3GPP TR 33.893)., et al., "3rd Generation Partnership Project; Technical Specification Group Services and System Aspects; Study on Security Aspects of Ranging Based Services and Sidelink Positioning (Release 18)", 3rd Generation Partnership Project, Mobile Competence Centre, 650 Route Des Lucioles, F-06921 Sophia-Antipolis Cedex, France, vol. 0.6.0 (Feb. 2023) 3GPP TR 33.893, Mar. 1, 2023, XP052253271, 59 pages, p. 9-11, p. 33-35, fig 6.6.2-1, p. 54-57, fig 6.15.2.1-1.

\* cited by examiner

1. $K_{ID1}$, $RV_1$, Counter$_1$

2. $K_{ID2}$, $RV_2$, Counter$_2$

3. Determine $DK_{1x}$ and $DK_{2y}$

4. Determine $DK_{1x}$ and $DK_{2y}$

5. Determine common ciphering key(s)

6. Determine common ciphering key(s)

7. Exchange SLPP messages using the common key(s)

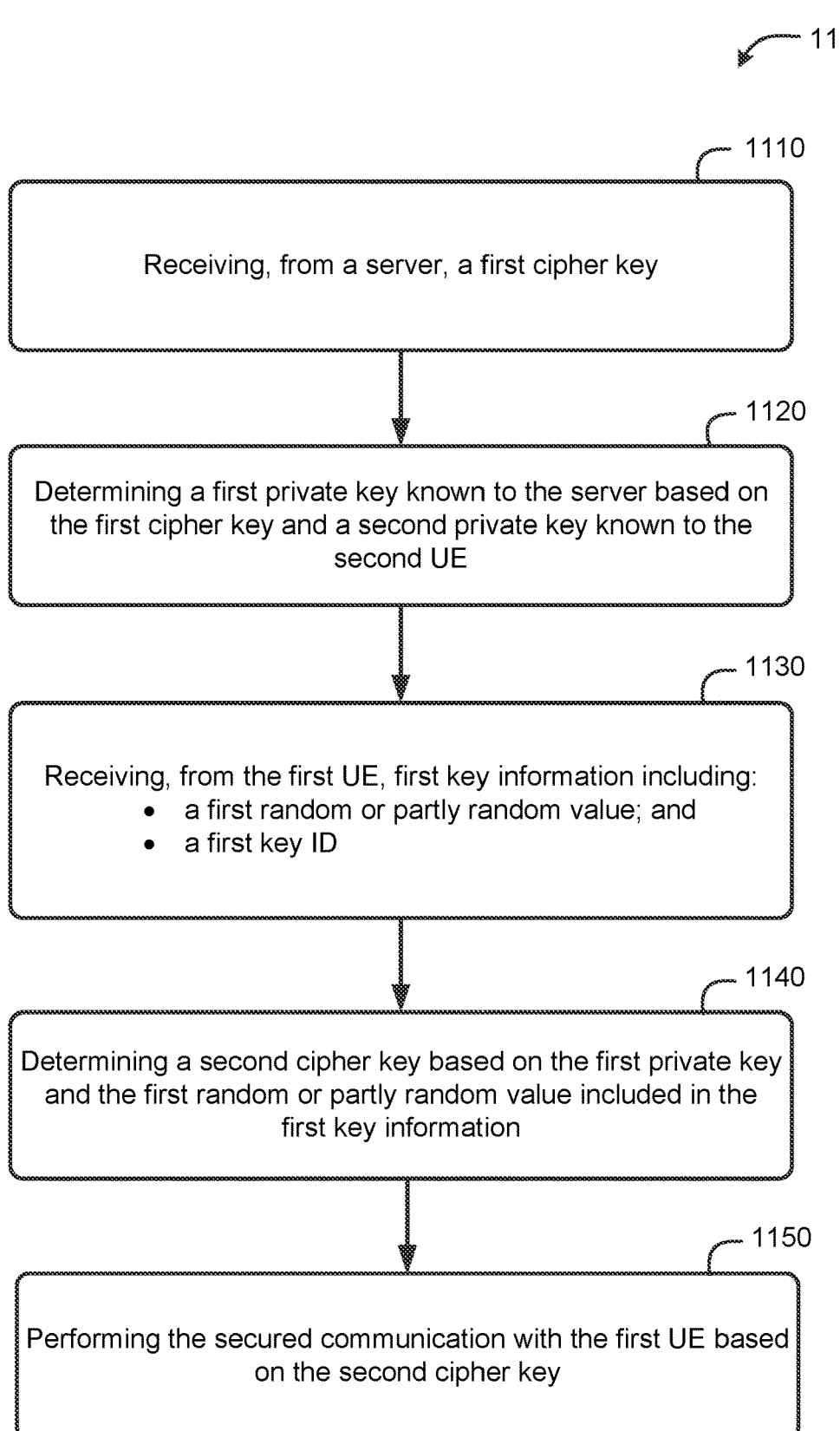

1100

1110

Receiving, from a server, a first cipher key

1120

Determining a first private key known to the server based on the first cipher key and a second private key known to the second UE

1130

Receiving, from the first UE, first key information including:
- a first random or partly random value; and
- a first key ID

1140

Determining a second cipher key based on the first private key and the first random or partly random value included in the first key information

1150

Performing the secured communication with the first UE based on the second cipher key

FIG. 11

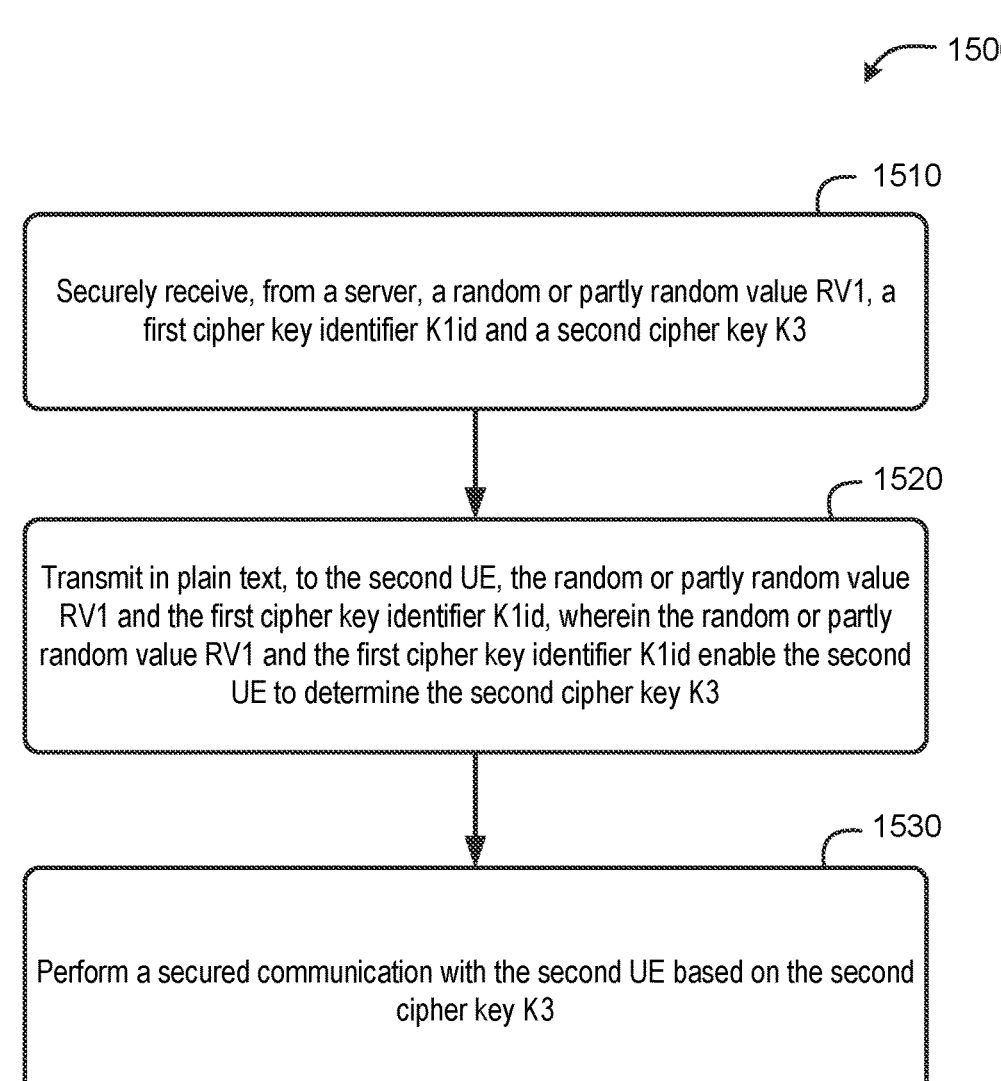

1500

1510

Securely receive, from a server, a random or partly random value RV1, a first cipher key identifier K1id and a second cipher key K3

1520

Transmit in plain text, to the second UE, the random or partly random value RV1 and the first cipher key identifier K1id, wherein the random or partly random value RV1 and the first cipher key identifier K1id enable the second UE to determine the second cipher key K3

1530

Perform a secured communication with the second UE based on the second cipher key K3

FIG. 15

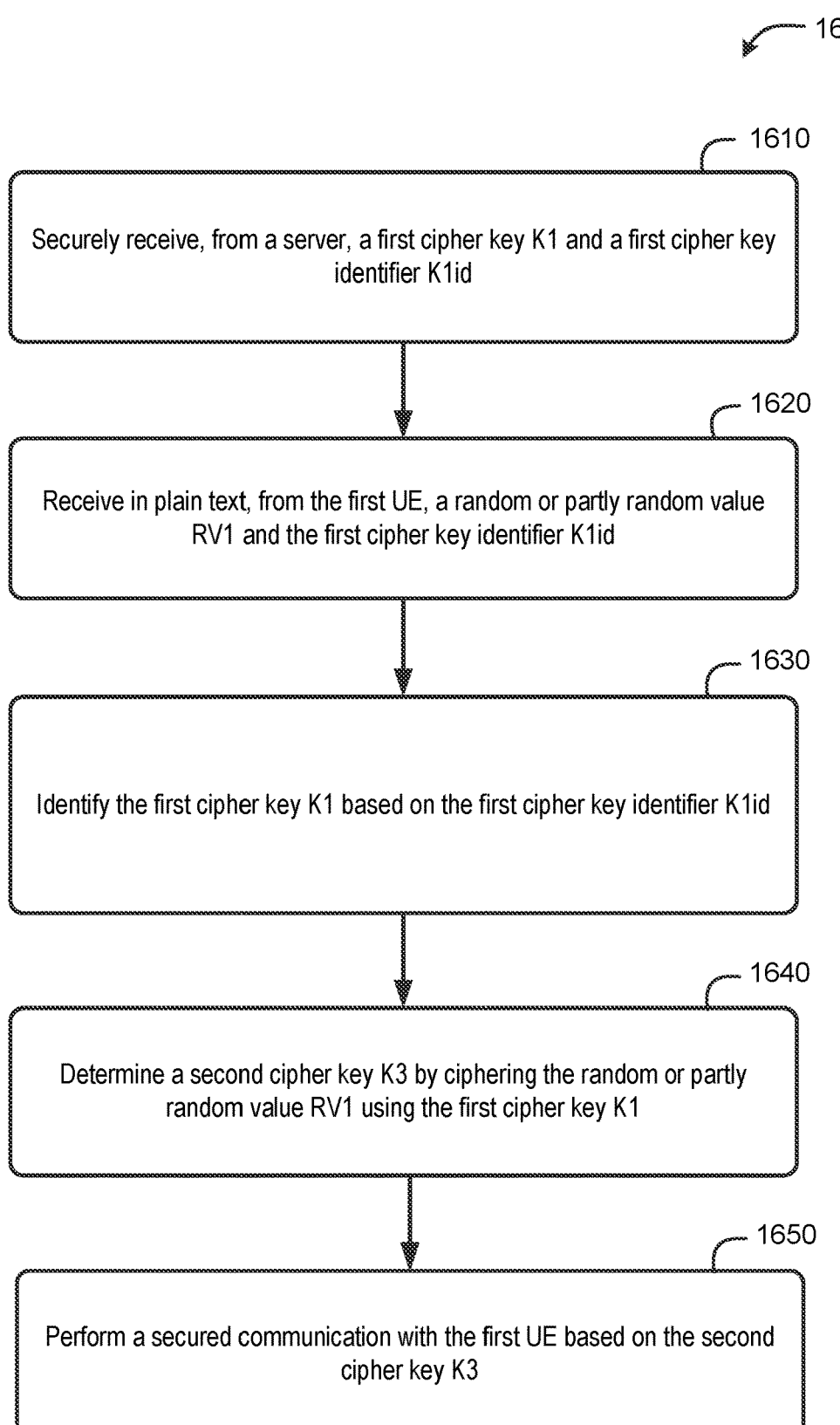

1600

1610

Securely receive, from a server, a first cipher key K1 and a first cipher key identifier K1id

1620

Receive in plain text, from the first UE, a random or partly random value RV1 and the first cipher key identifier K1id

1630

Identify the first cipher key K1 based on the first cipher key identifier K1id

1640

Determine a second cipher key K3 by ciphering the random or partly random value RV1 using the first cipher key K1

1650

Perform a secured communication with the first UE based on the second cipher key K3

FIG. 16

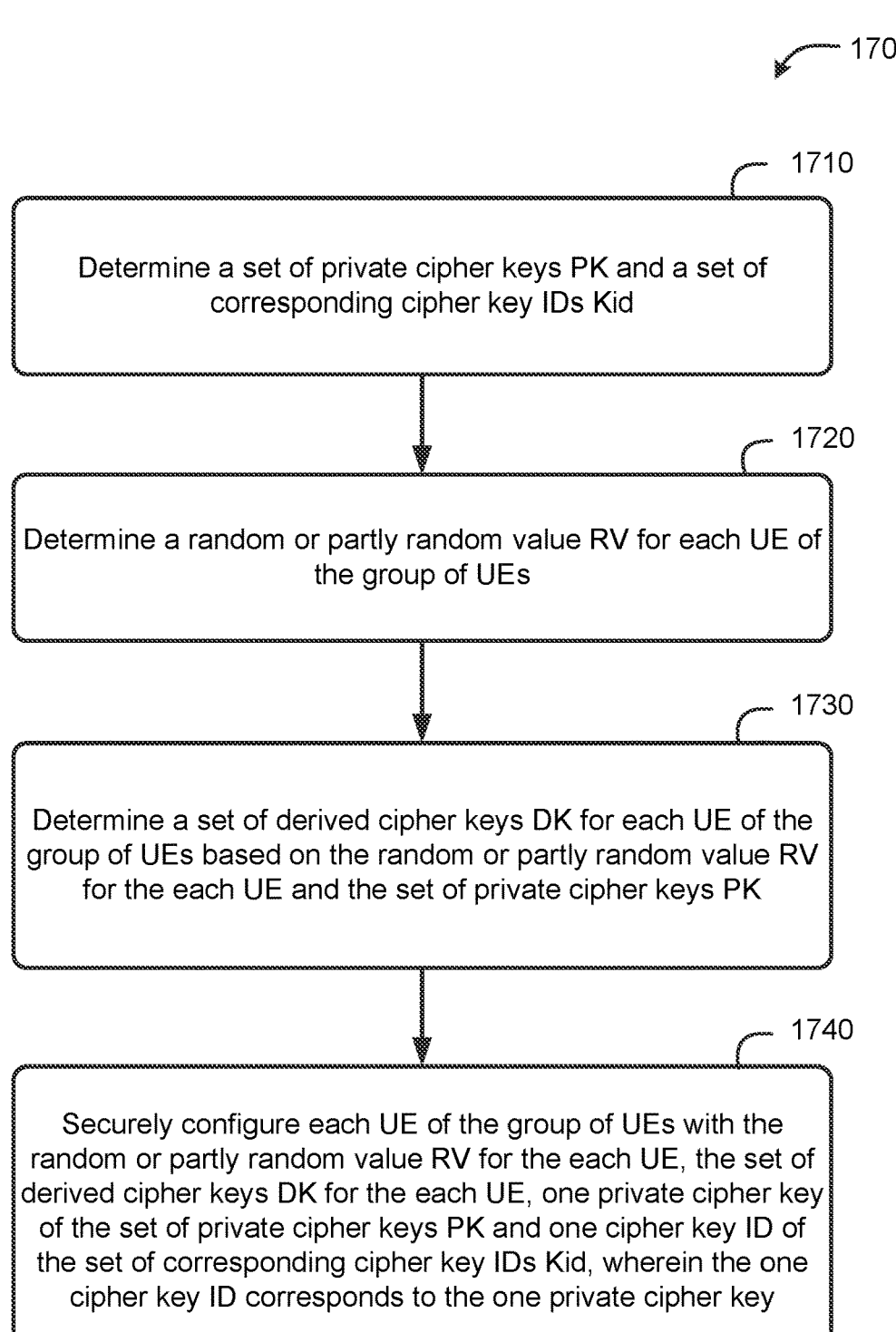

1700

1710

Determine a set of private cipher keys PK and a set of corresponding cipher key IDs Kid

1720

Determine a random or partly random value RV for each UE of the group of UEs

1730

Determine a set of derived cipher keys DK for each UE of the group of UEs based on the random or partly random value RV for the each UE and the set of private cipher keys PK

1740

Securely configure each UE of the group of UEs with the random or partly random value RV for the each UE, the set of derived cipher keys DK for the each UE, one private cipher key of the set of private cipher keys PK and one cipher key ID of the set of corresponding cipher key IDs Kid, wherein the one cipher key ID corresponds to the one private cipher key

FIG. 17

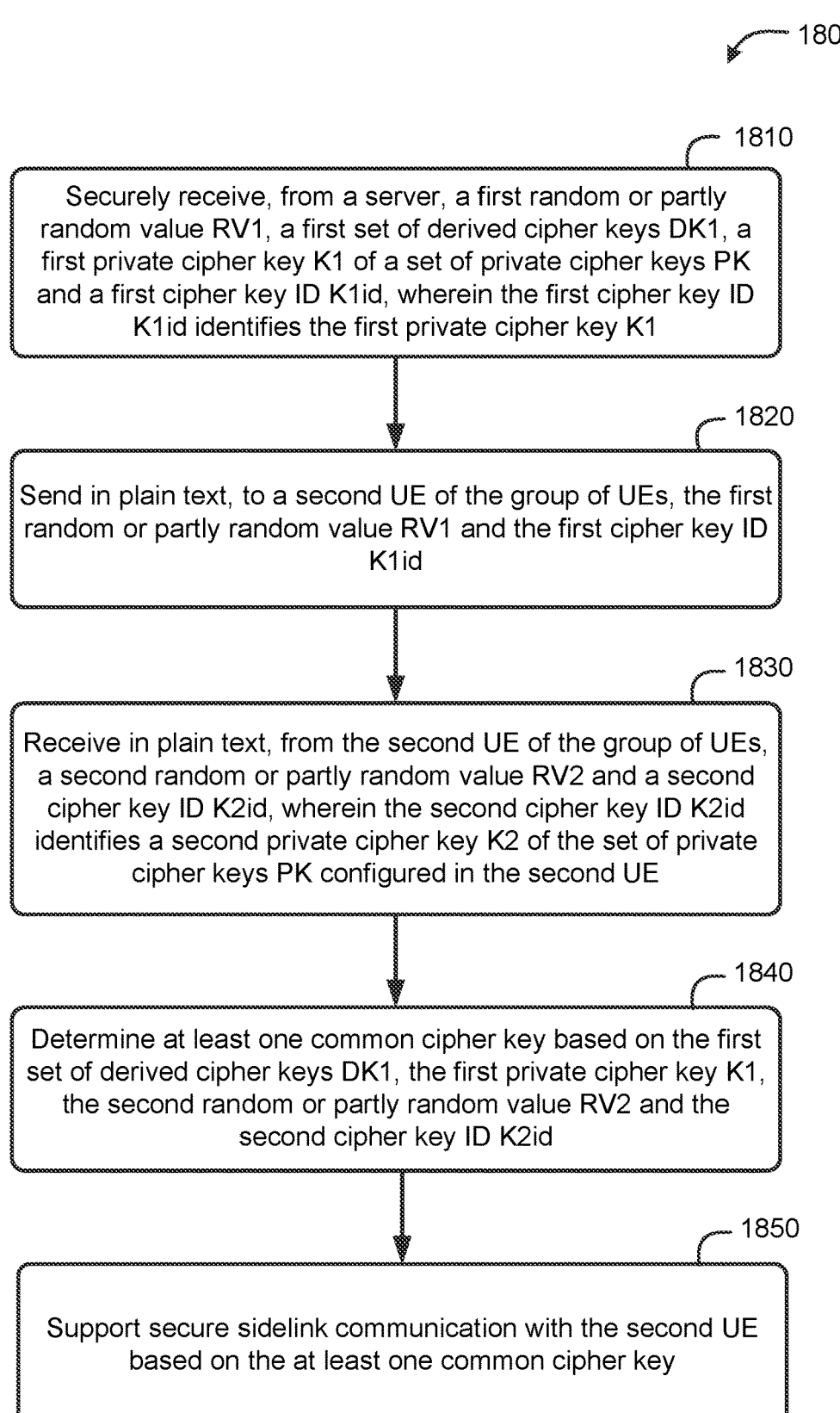

1800

1810

Securely receive, from a server, a first random or partly random value RV1, a first set of derived cipher keys DK1, a first private cipher key K1 of a set of private cipher keys PK and a first cipher key ID K1id, wherein the first cipher key ID K1id identifies the first private cipher key K1

1820

Send in plain text, to a second UE of the group of UEs, the first random or partly random value RV1 and the first cipher key ID K1id

1830

Receive in plain text, from the second UE of the group of UEs, a second random or partly random value RV2 and a second cipher key ID K2id, wherein the second cipher key ID K2id identifies a second private cipher key K2 of the set of private cipher keys PK configured in the second UE

1840

Determine at least one common cipher key based on the first set of derived cipher keys DK1, the first private cipher key K1, the second random or partly random value RV2 and the second cipher key ID K2id

1850

Support secure sidelink communication with the second UE based on the at least one common cipher key

FIG. 18

SYSTEMS AND METHODS FOR SUPPORT OF SECURITY FOR SIDELINK COMMUNICATION AND POSITIONING

1. CROSS-REFERENCE TO RELATED APPLICATIONS

This application claims the benefit of U.S. Provisional Application No. 63/488,963, filed Mar. 7, 2023, entitled "SECURITY FOR SIDELINK POSITIONING" which is incorporated herein by reference in its entirety.

2. FIELD OF DISCLOSURE

The present disclosure relates generally to the field of wireless communications, and more specifically to secure communication and positioning for one or more User Equipments (UEs) using sidelink signaling.

3. DESCRIPTION OF RELATED ART

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems.

In a mobile/cellular broadband network, a receiving UE is used to receive radio frequency (RF) signals for positioning. In some cases, these RF signals, or "reference signals," are sent from other UEs using sidelink (SL) communications. Coordination and control for the transmission and measurement of reference signals and measurement of other signals may also be sent using SL signaling. The messages and signaling used for the coordination and control may be susceptible to interception and/or spoofing by unauthorized entities. Means to securely protect against such interception and/or spoofing may thus be desirable.

BRIEF SUMMARY

Techniques are described for supporting secure sidelink communication and secure sidelink positioning for user equipments (UEs). A server may configure each UE with a private cipher key, a random value and derived cipher keys. Two UEs may exchange their random values and may each use their private cipher key and a received random value to determine a derived cipher key already configured in the other UE. The two derived cipher keys now known to both UEs can enable secure communication and positioning. In a degenerate case, a Type B UE is configured with a random value and a derived cipher key which can be determined by a Type A UE configured with a private cipher key using the random value. The technique can be extended to secure communication and positioning for a group of UEs.

An example method of enabling secure sidelink communication between a group of user equipments (UEs), performed by a server, the method may comprise determining a set of private cipher keys PK and a set of corresponding cipher key IDs Kid. The method may also comprise determining a random or partly random value RV for each UE of the group of UEs. The method may further comprise determining a set of derived cipher keys DK for each UE of the group of UEs based on the random or partly random value RV for the each UE and the set of private cipher keys PK and securely configuring each UE of the group of UEs with the random or partly random value RV for the each UE, the set of derived cipher keys DK for the each UE, one private cipher key of the set of private cipher keys PK and one cipher key ID of the set of corresponding cipher key IDs Kid, wherein the one cipher key ID corresponds to the one private cipher key.

An example method of supporting secure sidelink communication between a group of user equipments (UEs), performed by a first UE of the group of UEs, the method may comprise securely receiving, from a server, a first random or partly random value RV1, a first set of derived cipher keys DK1, a first private cipher key K1 of a set of private cipher keys PK and a first cipher key ID K1id, wherein the first cipher key ID K1id identifies the first private cipher key K1 and sending in plain text, to a second UE of the group of UEs, the first random or partly random value RV1 and the first cipher key ID K1id. The method may also comprise receiving in plain text, from the second UE of the group of UEs, a second random or partly random value RV2 and a second cipher key ID K2id, wherein the second cipher key ID K2id identifies a second private cipher key K2 of the set of private cipher keys PK configured in the second UE, determining at least one common cipher key based on the first set of derived cipher keys DK1, the first private cipher key K1, the second random or partly random value RV2 and the second cipher key ID K2id, and supporting secure sidelink communication with the second UE based on the at least one common cipher key.

An example apparatus for enabling secure sidelink communication between a group of user equipments (UEs), the apparatus may comprise means for determining a set of private cipher keys PK and a set of corresponding cipher key IDs Kid; means for determining a random or partly random value RV for each UE of the group of UEs; means for determining a set of derived cipher keys DK for each UE of the group of UEs based on the random or partly random value RV for the each UE and the set of private cipher keys PK; and means for securely configuring each UE of the group of UEs with the random or partly random value RV for the each UE, the set of derived cipher keys DK for the each UE, one private cipher key of the set of private cipher keys PK and one cipher key ID of the set of corresponding cipher key IDs Kid, wherein the one cipher key ID corresponds to the one private cipher key.

An example apparatus for supporting secure sidelink communication between a group of user equipments (UEs), performed by a first UE of the group of UEs, the apparatus may comprise: means for securely receiving, from a server, a first random or partly random value RV1, a first set of derived cipher keys DK1, a first private cipher key K1 of a set of private cipher keys PK and a first cipher key ID K1id, wherein the first cipher key ID K1id identifies the first private cipher key K1; means for sending in plain text, to a second UE of the group of UEs, the first random or partly random value RV1 and the first cipher key ID K1id; means for receiving in plain text, from the second UE of the group of UEs, a second random or partly random value RV2 and a second cipher key ID K2id, wherein the second cipher key ID K2id identifies a second private cipher key K2 of the set of private cipher keys PK configured in the second UE; means for determining at least one common cipher key based on the first set of derived cipher keys DK1, the first private cipher key K1, the second random or partly random value RV2 and the second cipher key ID K2id; and means for supporting secure sidelink communication with the second UE based on the at least one common cipher key.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 11 is a flow diagram of a method of secure sidelink communication performed by a UE, according to an embodiment.

FIG. 15 is a flow diagram of a method of secured communication between a first UE and a second UE, performed by the first UE, according to an embodiment.

FIG. 16 is a flow diagram of a method of secure sidelink communication between a first UE and a second UE, performed by the second UE, according to an embodiment.

FIG. 17 is a flow diagram of a method of enabling secure sidelink communication between a group of UEs, performed by a server, according to an embodiment.

FIG. 18 is a flow diagram of a method of supporting secure sidelink communication between a group of UEs, performed by a first UE of the group of UEs, according to an embodiment.

Figure 1:
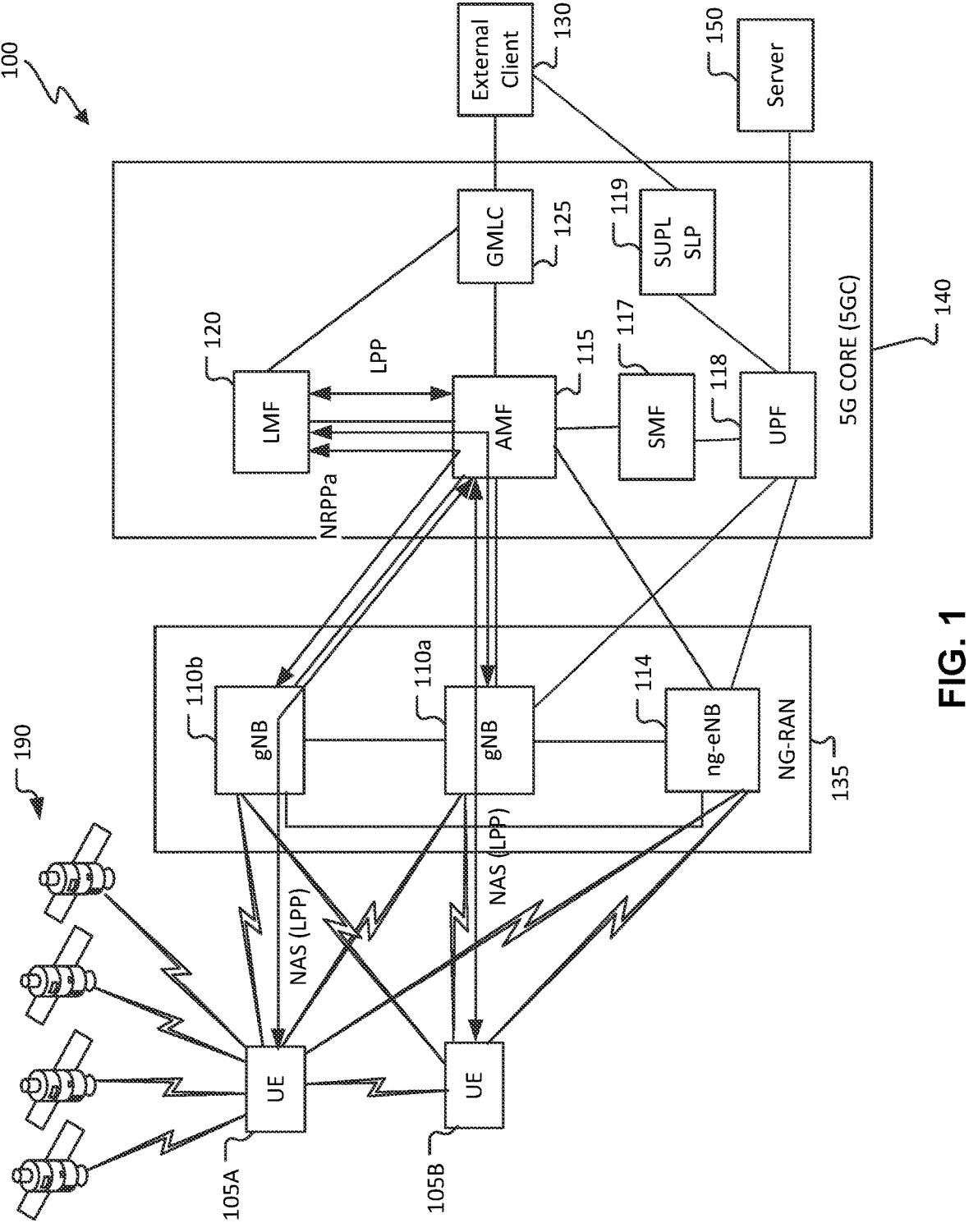
FIG. 1 shows an architecture of a communication system including a number of UEs, a Radio Access Network (RAN), and a 5G Core Network (5GC).

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Techniques and apparatus are discussed herein for supporting secure communication and positioning for UEs using sidelink signaling. The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi®) technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), New Radio (NR), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may refer to absolute location determination, relative location determination, ranging, or a combination thereof. Such positioning may include and/or be based on timing, angular, phase, or power measurements, or a combination thereof (which may include RF sensing measurements) for the purpose of location or sensing services.

The field of vehicle-to-everything (V2X) communication is rapidly expanding, with a growing number of connected vehicles and infrastructure components communicating with each other. Sidelink positioning of UEs is supported by sending and receiving sidelink positioning messages from one or more UEs that includes sidelink positioning capabilities and sidelink positioning resources for each UE, and exchanging additional sidelink positioning messages, which are used for determining locations, based on the sidelink positioning capabilities and sidelink positioning resources for each UE. In some embodiments, the UEs may be associated with vehicles and may be used for positioning the vehicles.

Sidelink positioning protocols may be used to support various forms of positioning, such as pairwise positioning, group operations, and network-supported sidelink positioning. For example, sidelink positioning can be accomplished by sending sidelink positioning messages between UEs and/or between UEs and one or more location servers according to a Sidelink Positioning Protocol (SLPP), a Long Term Evolution (LTE) Positioning Protocol (LPP), a Secure User Plane Location (SUPL), or some combination of these protocols.

When using a sidelink positioning protocol, there can be concerns regarding the security of sidelink communication. For example, for V2X, even with a robust security solution in place, an attacker who owns a vehicle associated with a V2X UE could potentially hack the mobile equipment component (e.g., the V2X UE without the subscriber identity module (SIM) card) of the V2X UE to obtain or spoof location data for other vehicles. Furthermore, location data can also be collected visually, such as through photos and videos, and through vehicle number plate information (e.g., can be used to identify specific vehicles and their users). As a result, it may be important to address these security concerns and implement appropriate safeguards to ensure the privacy and security of V2X communication and location data.

While sidelink positioning protocol location data may sometimes be less sensitive and may not require the same level of protection as other types of V2X communication data, there can still be significant benefits to supporting security for a sidelink positioning protocol and V2X communication. Firstly, for example, implementing security measures for V2X can allow for more secure transfer of other sensitive data such as messages between drivers, user and vehicle global identities, vehicle and vehicle load description, and/or planned vehicle routes. Furthermore, supporting security may improve the overall integrity of V2X communication by making it harder for an attacker to inject false sidelink positioning protocol location data or other misleading information into a sidelink positioning protocol session or other V2X sessions. As a result, supporting security may increase the trustworthiness of sidelink positioning protocol location data when compared to scenarios where no security measures are implemented. Therefore, it can be beneficial to develop technical solutions that enhance the security of V2X communication and a sidelink positioning protocol.

It is noted that while V2X is frequently used herein as an example of an application of sidelink communication and positioning, the techniques described herein for supporting secure sidelink communication and positioning can be used for other applications such as IIoT or UEs communicating in peer to peer mode.

Current security solutions in V2X communication, such as public key/certificate-based authentication/ciphering and common private key-based authentication/ciphering among UEs have limitations when applied to securing a sidelink positioning protocol. For example, public key/certificate-based authentication/ciphering could allow authentication of roadside units (RSUs) and special UEs (e.g., UEs associated with vehicles such as buses, trucks, taxis) without relying on network support or SIM cards. However, this method may have several drawbacks including an inability to authenticate other normal UEs (e.g., UEs associated with vehicles other than those special vehicles), high processing/latency requirements, scalability issues, dependence on permanent private keys in RSUs and special UEs which may not be secure, and support for unicast sidelink signaling but not groupcast sidelink signaling. These limitations may make the method less suitable for securing V2X communication and/or a sidelink positioning protocol.

On the other hand, a common private key-based solution may offer several advantages such as supporting authentication/ciphering for all UEs, enabling groupcast/broadcast sidelink signaling, and reducing processing/latency compared to public/private keys. This type of solution also may not rely on a network or SIM card. However, there could be a risk of rogue UEs posing as authorized UEs and obtaining the keys. This could lead to legitimate UEs unintentionally allowing an attacker to access key information, which could make a common private key-based solution less suitable for securing V2X communication and/or a sidelink positioning protocol as well.

Various aspects herein relate generally to the field of wireless communications. Some aspects more specifically relate to secure sidelink communication for positioning of a UE. In some examples, UEs may be partitioned into two types, referred to herein as "Type A" and "Type B" as described later herein. When performing secure sidelink communication, a server may provide a first set of key information to a type B UE and a second set of key information to a type A UE. The type B UE may share/transmit a portion of the first set of key information received from the server for ciphering/authentication with the type A UE. The type A UE may perform the ciphering/authentication with the type B UE based on the second set of key information received from the server and the portion of the first set of key information received from the type B UE. Based on the ciphering/authentication (e.g., both the type B UE and the type A UE determine a common cipher key respectively), the type B UE and the type A UE may perform the sidelink communication in a secure mode.

The technical solution disclosed herein addresses the above-mentioned challenges and limitations of existing solutions by providing security solutions that may support all coverage scenarios, authenticate UEs, cipher all sidelink positioning messages and potentially other V2X messages, have low latency for authentication and ciphering operations, have high capacity with scalability to potentially support thousands of UEs in a small area, and prevent critical security key data from being obtained by an attacker.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, Industrial IoT (IIoT), in vehicle UE, UE in a drone or airplane etc.) used to communicate over a wireless communications network and/or using sidelink signaling. A UE may be mobile or may (e.g., at certain times) be stationary, and may communicate with a Radio Access Network (RAN). For example, as used herein, a UE may be an infrastructure node, such as a RSU, Positioning Reference Unit (PRU), etc. As used herein, the term "UE" may be referred to interchangeably as an "access terminal" or "AT," a "mobile device", a "client device," a "wireless device," a "subscriber device," a "subscriber terminal," a "subscriber station," a "user terminal" or UT, a "mobile terminal," a "mobile station," RSU, PRU, or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B, a gNodeB (gNB), etc. In addition, in some systems, a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a sidelink channel. As used herein the term traffic channel (TCH) can refer to either an uplink/reverse or downlink/forward or sidelink traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Standardization of cellular systems, such as the Fifth Generation (5G) or New Radio (NR) network system, is ongoing in the 3rd Generation Partnership Project (3GPP). By way of example, RAT-dependent positioning systems that have been undergoing standardization include Enhanced Cell ID (E-CID) (using Received Signal Strength (RSS) and Round-Trip Time (RTT) and optionally using Angle of Arrival (AoA)), downlink (DL) positioning, such as Observed Time Difference of Arrival (OTDOA) and DL Time Difference of Arrival (DL-TDOA), uplink (UL) positioning, such as Uplink Time Difference of Arrival (UL-TDOA) and Uplink Angle of Arrival (UL-AoA). RAT-independent positioning systems that have been undergoing standardization include Assisted Global Navigation Satellite System (A-GNSS), and other technologies such as Wireless Local Area Network (WLAN), Bluetooth®, Terrestrial Beacon System (TBS), and sensor-based positioning including barometric sensor and motion sensor. Additionally, Hybrid positioning has undergone standardization, which includes the use of multiple methods for positioning, e.g., A-GNSS+OTDOA hybrid positioning.

Standardization of sidelink (SL) positioning (SLP) will require new solutions to define various aspects. For example, standardization of SLP may require defining an SLP protocol (SLPP) to be used between UEs and between an RSU and UEs. Note that SLPP messages are also referred to herein as sidelink Positioning messages. Additionally, it may be necessary to define support by location servers, e.g., location management functions (LMFs) and Secure User Plane Location (SUPL) Location Platforms (SUPL SLPs). It is noted that the term SLP is used here for Sidelink positioning whereas the term SUPL SLP is used here for a SUPL Location Platform. Standardization of SL positioning may further require defining a means to optimize SL group formation and modification, e.g., for V2X (e.g., V2P (Vehicle-to-Pedestrian), V2I (Vehicle-to-Infrastructure), V2V (Vehicle-to-Vehicle), etc.) to ensure that vehicles in an SL group are generally traveling in the same direction and are close to one another. Additionally, standardization of SL positioning may further require defining suitable procedures and message types for an SLPP that will allow the addition of new position methods and new access types later and support by a network or relays for UEs that cannot exchange direct SL signaling.

FIG. 1 shows an example of a communication system 100 that includes a first UE 105A, a second UE 105B, a Radio Access Network (RAN) 135, here a Fifth Generation (5G) Next Generation (NG) RAN (NG-RAN), and a 5G Core Network (5GC) 140. The 5GC 140 and the NG-RAN 135, for example, may comprise a public land mobile network (PLMN). The UE 105A and UE 105B may be sometimes referred to herein as UE 105 individually or UEs 105 collectively. The UE 105 may be, e.g., an IoT device, a location tracker device, a cellular telephone, an in-vehicle UE, an On-Board Unit (OBU), or other similar type of device. The UE 105 may additionally be considered to function as an RSU or PRU. A 5G network may also be referred to as a New Radio (NR) network; NG-RAN 135 may be referred to as a 5G RAN or as an NR RAN; and 5GC 140 may be referred to as an NG Core network (NGC). The RAN 135 may be another type of RAN, e.g., a 3G RAN, a 4G Long Term Evolution (LTE) RAN, etc. The UE 105B may be configured and coupled similarly to the UE 105A to send and/or receive signals to/from similar other entities in the communication system 100. The communication system 100 may utilize information from a constellation of satellite vehicles (SVs) 190 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125, a User Plane Function (UPF) 118, and a Secure User Plane Location (SUPL) Location Platform (SUPL SLP) 119. The gNBs 110*a*, 110*b* and the ng-eNB 114 are communicatively coupled to each other, are each configured to wirelessly communicate bi-directionally with the UEs 105, and are each communicatively coupled to, and configured to bi-directionally communicate with the AMF 115 and the UPF 118. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC 125 is communicatively coupled to an external client 130. The AMF 115, the SMF 117, the UPF 118, and the SUPL SLP 119 are communicatively coupled to each other, and the SUPL SLP 119 is communicatively coupled to the external client 130. The SMF 117 may further serve as an initial contact point of a Service Control Function (SCF) (not shown) to create, control, and delete media sessions. The base stations 110*a*, 110*b*, 114 may each support a macro cell (e.g., a high-power cellular base station), or a small cell (e.g., a low-power cellular base station), or may each be an access point (e.g., a short-range base station configured to communicate with short-range technology such as WiFi, WiFi-Direct (WiFi-D), Bluetooth, Bluetooth-low energy (BLE), Zigbee, etc.). One or more of the base stations 110*a*, 110*b*, 114 may be configured to communicate with the UEs 105 via multiple carriers. Each of the base stations 110*a*, 110*b*, 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted, as necessary. Specifically, although only two UEs 105 are illustrated, many UEs (e.g., hundreds, thousands, millions, etc.) may be utilized in the communication system 100. Similarly, the communication system 100 may include a larger (or smaller) number of SVs (i.e., more or fewer than the four SVs 190 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), future 6G, etc. Implementations described herein (be they for 5G technology and/or for one or more other communication technologies and/or protocols) may be used to transmit (or broadcast) directional synchronization signals, receive and measure directional signals at UEs (e.g., the UEs 105) or at base stations 110*a*, 110*b*, 114 and/or provide location assistance to the UEs 105 (via the LMF 120 or SUPL SLP 119 or other location server) and/or compute a location for one or both of the UEs 105 at a location-capable device such as the UEs 105, the base stations 110*a*, 110*b*, the LMF 120, or SUPL SLP 119 based on measurement quantities received at the UEs 105 or the base stations 110*a*, 110*b*, 114 for such directionally-transmitted signals. The GMLC 125, the LMF 120, the AMF 115, the SMF 117, the UPF 118, the SUPL SLP 119, the ng-eNB (eNodeB) 114 and the gNBs (gNodeBs) 110*a*, 110*b* are examples and may, in various embodiments, be replaced by or include various other entities, including location server functionality and/or base station functionality.

The system 100 is capable of wireless communication in that components of the system 100 can communicate with one another (at least sometimes using wireless connections) directly or indirectly, e.g., via the base stations 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UEs 105 may include multiple UEs and may be a mobile wireless communication device but may communicate wirelessly and via wired connections. The UEs 105 may be any of a variety of devices, e.g., a smartphone, a tablet computer, a vehicle-based device, etc., but these are examples only as the UEs 105 are not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UEs 105, the base stations 110*a*, 110*b*, 114, the core network 140, and/or the external client 130. For example, such other devices may include IoT or IIOT devices, medical devices, home entertainment and/or automation devices, etc. The core network 140 may communicate with the external client 130 (e.g., a computer system), e.g., to allow the external client 130 to request and/or receive location information regarding the UEs 105 (e.g., via the GMLC 125 or SUPL SLP 119).

The UEs 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105 may communicate with each other through UE-to-UE sidelink (SL) communications by transmitting over one or more sidelink channels, such as a physical sidelink synchronization channel (PSSCH), a physical sidelink broadcast channel (PSBCH), a physical sidelink control channel (PSCCH), Synchronization Signal Block (SSB), sidelink channel state information reference signal (SL-CSIRS), physical sidelink feedback channel (PSFCH), or sidelink sounding reference signals (SL-SRS).

The UEs 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UEs 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UEs 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth (BT), Worldwide Interoperability for Microwave Access (WiMAX), 5G new radio (NR) (e.g., using the NG-RAN 135 and the 5GC 140), etc. The UEs 105 may support wireless communication using a Wireless Local Area Network (WLAN) which may connect to other networks (e.g., the Internet) using a Digital Subscriber Line (DSL) or packet cable, for example. The use of one or more of these RATs may allow the UEs 105 to communicate with the external client 130 (e.g., via elements of the 5GC 140 not shown in FIG. 1, or possibly via the GMLC 125) and/or allow the external client 130 to receive location information regarding the UEs 105 (e.g., via the GMLC 125 or SUPL SLP 119).

Each of the UEs 105 may include a single entity or may include multiple entities such as in a personal area network where a user may employ audio, video and/or data I/O (input/output) devices and/or body sensors and a separate wireline or wireless modem. An estimate of a location of a UE, e.g., UE 105, may be referred to as a location, location estimate, location fix, fix, position, position estimate, or position fix, and may be geographic, thus providing location coordinates for the UE (e.g., latitude and longitude) which may or may not include an altitude component (e.g., height above sea level, height above or depth below ground level, floor level, or basement level). Alternatively, a location of the UE may be expressed as a civic location (e.g., as a postal address or the designation of some point or small area in a building such as a particular room or floor). A location of the UE may be expressed as an area or volume (defined either geodetically or in civic form) within which the UE is expected to be located with some probability or confidence level (e.g., 67%, 95%, etc.). A location of the UE may be expressed as a relative location comprising, for example, a distance and direction from a known location. The relative location may be expressed as relative coordinates (e.g., X, Y (and Z) coordinates) defined relative to some origin at a known location which may be defined, e.g., geodetically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

When sidelink positioning is used, an absolute (e.g. global) or relative location of a UE may not always be obtained. Instead, location results may be obtained for a UE which may include a range or distance between the UE and each of one or more other UEs, a direction from the UE to each of one or more other UEs, a location of the UE relative to the location of some other UE, a location of one or more other UEs relative to the location of the UE, a velocity of the UE, and/or a velocity of each of one or more other UEs. A velocity of a UE may be absolute (e.g. relative to the Earth) or may be relative to some other UE, and may then be referred to as a "relative velocity". A relative velocity of a UE B relative to another UE A may include a "radial velocity" component, which may be equal to a rate of change of a range from the UE A to the UE B, and a "transverse velocity" component which may be at right angles to the radial velocity component as seen by the UE A and may be equal to a rate of angular change of a direction to the UE B from the UE A multiplied by the range from the UE A to the UE B. In the description contained herein, the use of the term "location result" or "location results" for sidelink positioning of a UE or a group of UEs may comprise any of these variants unless indicated otherwise.

The UEs 105 may be configured to communicate with other entities using one or more of a variety of technologies. The UEs 105 may be configured to connect indirectly to one or more communication networks via one or more device-to-device (D2D) peer-to-peer (P2P) links, which may be supported using sidelink signaling. The D2D P2P links may be supported with any appropriate D2D radio access technology (RAT), such as LTE Direct (LTE-D), WiFi Direct (WiFi-D), Bluetooth, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas or be otherwise unable to receive transmissions from a base station. Groups of UEs communicating via D2D communications (e.g. using sidelink signaling) may utilize a one-to-many (1:M) system in which each UE may transmit to other UEs in the group. A TRP may facilitate scheduling of resources for D2D communications (and sidelink signaling). In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UEs 105 via wireless communication between the UEs and one or more of the gNBs 110a, 110b, which may provide wireless communications access to the 5GC 140 on behalf of the UE using 5G. In FIG. 1, the serving gNB for the UE 105A is assumed to be the gNB 110b, while the serving gNB for the UE 105B is assumed to be the gNB 110a, although another gNB may act as a serving gNB if the UEs 105 move to another location or may act as a secondary gNB to provide additional throughput and bandwidth to the UEs 105 and the UEs 105 may share the same serving gNB.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UEs 105. One or more of the gNBs 110a, 110b and/or the ng-eNB 114 may be configured to function as positioning-only beacons which may transmit signals to assist with determining the position of the UEs 105 but may not receive signals from the UEs 105 or from other UEs.

The base stations 110a, 110b, 114 may each comprise one or more TRPs. For example, each sector within a cell of a base station may be supported by a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by UEs with service subscription. A pico TRP may cover a relatively small geographic area (e.g., a pico cell) and may allow unrestricted access by UEs with service subscription. A femto or home TRP may cover a relatively small geographic area (e.g., a femto cell that may have a 20 to 50 meter radius) and may allow restricted access by UEs having association with the femto cell (e.g., UEs for users in a home or office).

Communications system 100 may support NR and support communications between the one or more base stations 110a, 110b, 114 and supported UEs 105. The UEs may be dispersed throughout the wireless communications system 100, and each UE may be stationary or mobile. As part of the communication, each of the base stations 110a, 110b, 114 and UEs 105 may support reference signal transmission for operations, including channel estimation, beam management and scheduling, and wireless device positioning within the coverage areas of one or more base stations.

For example, the base stations 110a, 110b, 114 may transmit one or more downlink reference signals for NR communications, including channel state information reference signal (CSI-RS) transmission. Each of the CSI-RS transmissions may be configured for a specific UE 105 to estimate the channel and report channel quality information. The reported channel quality information may be used for scheduling or link adaptation at the base stations 110a, 110b, 114 or as part of a mobility or beam management procedure for directional transmission associated with the enhanced channel resources. Similarly, the UEs 105 may be configured to transmit uplink signals to one or more base stations 110a, 110b, 114 and sidelink transmissions between UEs 105.

The base stations 110a, 110b, 114 may transmit one or more additional downlink reference signals, including a positioning reference signal (PRS) transmission. The PRS transmission may be configured for specific UEs 105 to measure and report one or more report parameters (for example, report quantities) associated with positioning and location information. The PRS transmission and report parameter feedback may support various location services (for example, navigation systems and emergency communications). In some examples, the report parameters supplement one or more additional location systems supported by a UE 105 (such as global positioning system (GPS) technology).

A base station 110a, 110b, 114 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 110a, 110b, 114. The structure of the one or more PRS resources, PRS resource sets, and PRS resource settings within a PRS transmission may be referred to as a multi-level resource setting. For example, multi-level PRS resource setting of the base station 110a, 110b, 114 may include multiple PRS resource sets and each PRS resource set may contain a set of PRS resources (such as a set of 4 PRS resources).

The UEs 105 may receive the PRS transmission over the one or more PRS resources of the slot. The UEs 105 may determine a report parameter for at least some of the PRS resources included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission time difference (UE Rx-Tx), a signal-to-noise ratio (SNR), or a reference signal receive quality (RSRQ).

Similarly, the UEs 105 may be configured to transmit one or more additional uplink reference signals that may be received by base stations 110a, 110b, 114 and used for positioning. For example, UEs 105 may transmit sounding reference signal (SRS) for positioning. Base stations 110a, 110b, 114 that receive uplink reference signals from a UE 105 may perform positioning measurements, such as one or more of a time of arrival (TOA), gNB or ng-eNB reception to transmission time difference (Rx-Tx).

Aspects of wireless communications system 100 may include use of downlink PRS transmissions by the base station 110*a*, 110*b*, 114 or uplink SRS transmissions by a UE, e.g., UE 105A or UE 105B, for UE location determination. For downlink-based UE location determination, a location server, e.g., LMF 120 in a 5GC, or an enhanced serving mobile location center (E-SMLC) (sometimes referred to as location server 120) in an EPC, may be used to provide positioning assistance, such as PRS assistance data (AD) to the UE. For uplink-based UE location determination, a location server 120 and/or a serving base station, e.g., gNB 110*a*, may be used to provide positioning assistance, such as SRS assistance data, to receiving entities, such as base stations (e.g., gNBs 110*a*, 110*b*, and other UE(s)). The SRS assistance data, for example, may include the SRS transmission occasion and other parameters, e.g., such as the reference signal pattern, power if different from nominal, the number of repetitions, etc.

A position estimation of a UE may be determined using measurements of reference signals, such as PRS signals or SRS for positioning signals, or other reference signals, from one or more base stations 110*a*, 110*b*, 114 or the UE. Positioning methods, such as Time Difference of Arrival (TDOA), DL Time Difference of Arrival (DL-TDOA), DL Angle of Departure (DL AoD), Enhanced Cell ID (ECID) are position methods that may be used to estimate the position of the UE using reference signals from base stations. DL-TDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)—e.g., as defined in 3GPP Technical Specification (TS) 36.211 and TS 38.211.

Other positioning methods may use reference signals transmitted by the UE including uplink-based positioning methods and downlink and uplink-based positioning methods. For example, uplink-based positioning methods include, e.g., UL Time Difference of Arrival (UL-TDOA), UL Angle of Arrival (UL AoA), UL Relative Time of Arrival (UL-RTOA) and downlink and uplink-based positioning methods include, e.g., Round-trip time (RTT) with one or more neighboring base stations.

Additionally, sidelink based positioning may be used in which UEs transmit and/or receive sidelink positioning reference signals that are measured and used for positioning. For example, UEs 105 may communicate with each other through UE-to-UE sidelink (SL) communications by transmitting over one or more sidelink channels, such as a physical sidelink synchronization channel (PSSCH), a physical sidelink broadcast channel (PSBCH), a physical sidelink control channel (PSCCH), a physical sidelink feedback channel (PSFCH). Sidelink signals may include a sidelink channel state information reference signal (SL-CSIRS), a sidelink positioning reference signals (SL PRS) and a sidelink sounding reference signal (SL-SRS).

As noted, while FIG. 1 depicts nodes configured to communicate according to 5G communication/protocols, nodes configured to communicate according to other communication protocols, such as, for example, an LTE protocol or IEEE 802.11x protocol, may be used. For example, in an Evolved Packet System (EPS) providing LTE wireless access to the UEs 105, a RAN may comprise an Evolved Universal Mobile Telecommunications System (UMTS) Terrestrial Radio Access Network (E-UTRAN) which may comprise base stations comprising evolved Node Bs (eNBs).

A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UEs 105, including cell change and handover and may participate in supporting a signaling connection to the UEs 105 and possibly data and voice bearers for the UEs 105. The LMF 120 may communicate directly or indirectly with the UEs 105, e.g., through wireless communications, or directly or indirectly with the base stations 110*a*, 110*b*, 114. The LMF 120 may support positioning of the UEs 105 when the UEs 105 accesses the NG-RAN 135 and may support position procedures/methods such as Assisted GNSS (A-GNSS), Time Difference of Arrival (TDOA) (e.g., Downlink (DL) TDOA or Uplink (UL) TDOA), Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UEs 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SUPL SLP). At least part of the positioning functionality (including derivation of the location of the UE) may be performed at the UE (e.g., using signal measurements obtained by the UE for signals transmitted by wireless nodes such as the gNBs 110*a*, 110*b* and/or the ng-eNB 114, and/or assistance data provided to the UE, e.g., by the LMF 120). At least part of the positioning functionality (including derivation of the location of the UE) alternatively may be performed at the LMF 120 (e.g., using signal measurements obtained by the gNBs 110*a*, 110*b* and/or the ng-eNB 114. The AMF 115 may serve as a control node that processes signaling between the UEs 105 and the core network 140, and provides QOS (Quality of Service) flow and session management. The AMF 115 may support mobility of the UEs 105 including cell change and handover and may participate in supporting signaling connection to the UEs 105.

The GMLC 125 may support a location request for the UEs 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UEs 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

A User Plane Function (UPF) 118 may support voice and data bearers for UE 105 and may enable UE 105 voice and data access to other networks such as the Internet. The UPF 118 may be connected to gNBs 110 and ng-eNB 114. UPF 118 functions may include: external Protocol Data Unit (PDU) session point of interconnect to a Data Network, packet (e.g., Internet Protocol (IP)) routing and forwarding, packet inspection and user plane part of policy rule enforcement, Quality of Service (QOS) handling for user plane, downlink packet buffering and downlink data notification triggering. UPF 118 may be connected to the SUPL SLP 119 to enable support of positioning of UE 105 using SUPL. SUPL SLP 119 may be further connected to or accessible from external client 130.

As illustrated, a Session Management Function (SMF) 117 connects to the AMF 115 and the UPF 118. The SMF 117 may have the capability to control both a local and a central UPF within a PDU session. SMF 117 may manage the establishment, modification, and release of PDU sessions for UE 105, perform IP address allocation and management for UE 105, act as a Dynamic Host Configuration Protocol (DHCP) server for UE 105, and select and control a UPF 118 on behalf of UE 105.

As further illustrated in FIG. 1, the LMF 120 may communicate with the gNBs 110a, 110b and/or the ng-eNB 114 using a New Radio Position Protocol A (NRPPa), which may be defined in 3GPP Technical Specification (TS) 38.455. NRPPa messages may be transferred between the gNB 110a (or the gNB 110b) and the LMF 120, and/or between the ng-eNB 114 and the LMF 120, via the AMF 115. As further illustrated in FIG. 1, the LMF 120 and the UEs 105 may communicate using an LTE Positioning Protocol (LPP), which may be defined in 3GPP TS 37.355. Here, LPP messages may be transferred between the UEs 105 and the LMF 120 via the AMF 115 and the serving gNB 110a, 110b or the serving ng-eNB 114 for the UEs 105. For example, LPP messages may be transferred between the LMF 120 and the AMF 115 using a 5G service based protocol and may be transferred between the AMF 115 and the UEs 105 using a 5G Non-Access Stratum (NAS) protocol.

The LPP protocol may be used to support positioning of the UEs 105 using UE-assisted and/or UE-based position methods such as A-GNSS, RTK, TDOA, AoA, AoD, and/or E-CID. The NRPPa protocol may be used to support positioning of the UEs 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional Synchronization Signal (SS) transmissions from the gNBs 110a, 110b, and/or the ng-cNB 114. The LMF 120 is illustrated in FIG. 1 as being located in the core network 140, but may be external to the core network 140, e.g., in an NG-RAN. For example, the LMF 120 may be co-located or integrated with a gNB or a TRP, or may be disposed remote from the gNB and/or the TRP and configured to communicate directly or indirectly with the gNB and/or the TRP.

With a UE-assisted position method, the UE, e.g., UE 105A or UE 105B may obtain location measurements and send the measurements to a location server (e.g., the LMF 120) for computation of a location estimate for the UE. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), AoA, AoD, for the gNBs 110a, 110b, the ng-eNB 114, and/or a WLAN AP. The location measurements may also or instead include measurements of GNSS pseudorange, code phase, and/or carrier phase for the SVs 190.

With a UE-based position method, the UE, e.g., UE 105A or UE 105B, may obtain location measurements (e.g., which may be the same as or similar to location measurements for a UE-assisted position method) and may compute a location of the UE (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114), sidelink UEs, or APs may obtain location measurements (e.g., measurements of RSSI, RTT, RSRP, RSRQ, AOA, AOD, or Time of Arrival (ToA) for signals transmitted by the UE, e.g., UE 105A or UE 105B) and/or may receive measurements obtained by the UE. The one or more base stations or APs may send the measurements to a location server (e.g., the LMF 120) for computation of a location estimate for the UE.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UEs 105 as assistance data in an LPP message via the NG-RAN 135 and the 5GC 140.

An LPP message sent from the LMF 120 to the UEs 105 may instruct the UEs 105 to do any of a variety of things depending on desired functionality. For example, the LPP message could contain an instruction for the UEs 105 to obtain measurements for GNSS (or A-GNSS), WLAN, E-CID, and/or TDOA (or some other position method). In the case of E-CID, the LPP message may instruct the UEs 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UEs 105 may send the measurement quantities back to the LMF 120 in an LPP message (e.g., inside a 5G NAS message) via the serving gNB 110a (or the serving ng-eNB 114) and the AMF 115.

Positioning for UEs in a radio network, such as communication system 100 shown in FIG. 1, typically uses Uu interfaces, i.e., radio interface between the UE and the radio access network, for DL PRS and/or UL SRS. Positioning for UEs may use sidelink PRS (SL PRS), which may be a specific sidelink defined reference signal for positioning or may reuse Uu SRS, e.g., UL SRS, sometimes referred to as Sounding Reference Signal for positioning (SRSPos), or other reference signals may be transmitted in the sidelink channel. Sidelink positioning may enhance UE positioning by providing an additional transmission (or reception) node. A sidelink UE, such as UE 105B, with a known position may be used to support position determination of a target UE, such as UE 105, where the sidelink UE is sometimes referred to as an anchor node.

With a sidelink positioning method, a UE 105A for example may transmit a sidelink PRS or sidelink SRS signal which is received and measured by UE 105B. In addition or instead, the UE 105B, for example, may transmit a sidelink PRS or sidelink SRS signal which is received and measured by the UE 105A. Measurements of SL PRS or SL SRS signals may include Rx-Tx, TDOA, TOA, RSRP, RSRQ, AoA. SL position methods may include SL RTT (also referred to as ranging), SL AoA and SL AoD. In some scenarios, a group of UEs (not shown in FIG. 1) may support SL positioning. In this case, one UE in the group may transmit an SL PRS or SL SRS signal which may be measured by some or all other UEs in the group. Some or all other UEs in the group may also transmit an SL PRS or SL SRS signal (e.g., with each UE transmitting SL SRS or SL PRS at a different time or times than times at which other UEs in the group transmit SL PRS or SL SRS) which may be measured by some or all other UEs in the group different to the UE transmitting the UL PRS or ULS SRS. Measurements made by UEs applicable to transmission of SL PRS or SL SRS by a group of UEs may include Rx-Tx, TDOA, TOA, RSTD, AoA, RSRP, RSRQ. Position methods supported by these measurements may include sidelink RTT (e.g., ranging), sidelink AoA, sidelink AoD, sidelink TDOA (SL-TDOA). Based on the measurements and the position methods(s), each UE may determine a relative location and/or relative velocity of itself and/or of other UEs or absolute locations and/or absolute velocities. For example, a relative location of a UE may comprise a location of the UE relative to one or more other UEs in the group.

Sidelink positioning may be used for positioning of UEs independently of a core network (e.g. 5GC 140) or a serving PLMN. One example implementation of sidelink positioning may be found in vehicular communication systems, such as V2X, which may be used for safety related applications, such as safety warnings, traffic congestion (e.g., automated traffic control), and coordinated or automated vehicle maneuvering. One aspect of sidelink positioning that may require a solution for standardization is a sidelink positioning protocol (SLPP) that can be used between UEs, including between an RSU and UEs, and location servers. The SLPP, for example, may support sidelink positioning between UEs, RSUs, and PRUs with network access independence. The SLPP may provide support for sidelink positioning for a pair of UEs (e.g., ranging), groups of UEs (V2X), and for UEs that are members of multiple different groups. By way of example, SLPP may provide support for various position techniques currently standardized for UE-based and UE-assisted support by a location server (e.g. LMF 120) such as PRS RTT, AoA, Differential AOA (DAOA), AOD, Differential AoD (DAOD), but may also enable the support of other PRS and SRS based position methods and non-PRS methods such as RTK at a later time. By enabling the addition of new capabilities and methods at a later time, the SLPP may avoid the need to define separate new positioning protocols different to SLPP. By way of example, additional position methods that may be included in SLPP at a later time may include RTK, Wi-Fi, Ultra-Wideband (UWB), BT positioning methods.

The SLPP may enable direct sidelink operation initially (where UEs communicate and coordinate positioning by exchanging SLPP messages using sidelink signaling), and may be extended later to sidelink operation via relays and operation via a network, where UEs may exchange SLPP messages via a network or via intermediate relay UEs. For example, this might be used to coordinate positioning of two vehicles on a collision course at a corner where direct SL signaling between the two vehicles is not possible. Thus, SLPP may define support for SL PRS based positioning initially in a generic manner to simplify extension to support of other position methods later. For example, SLPP may define generic SLPP messages similar to generic LPP messages defined for LPP in 3GPP TS 37.355. SLPP may support separate position methods (e.g. SL PRS RTT, SL PRS AoA, SL PRS AoD) using common procedures and common parameters where feasible. SLPP may define procedures that can be reused for multiple position methods and are not limited to just one or a few position methods. SLPP messages may be enabled to be transferred and used by various entities, such as UEs, RSUs, PRUs, and location servers, such as LMFs and SUPL SLPs. The location server (e.g., LMF and SUPL SLP) usage may transfer SLPP messages inside LPP messages to enable UE-assisted positioning by an LMF or SUPL SLP. Alternatively, the location server (e.g., LMF and SUPL SLP) usage may transfer SLPP messages not in association with LPP messages to enable UE-assisted positioning by an LMF or SUPL SLP. SLPP may further support relative (local) and global positioning.

As illustrated in FIG. 1, a server 150 connects to UPF 118 (e.g., through the Internet). As will be disclosed in detail below, server 150 may have the capability to determine and provide security information for UEs 105 to perform secure sidelink communication. In some embodiments, server 150 may be configured to provide common security data and coordinate the secure sidelink communication among UEs 105.

Figure 2:
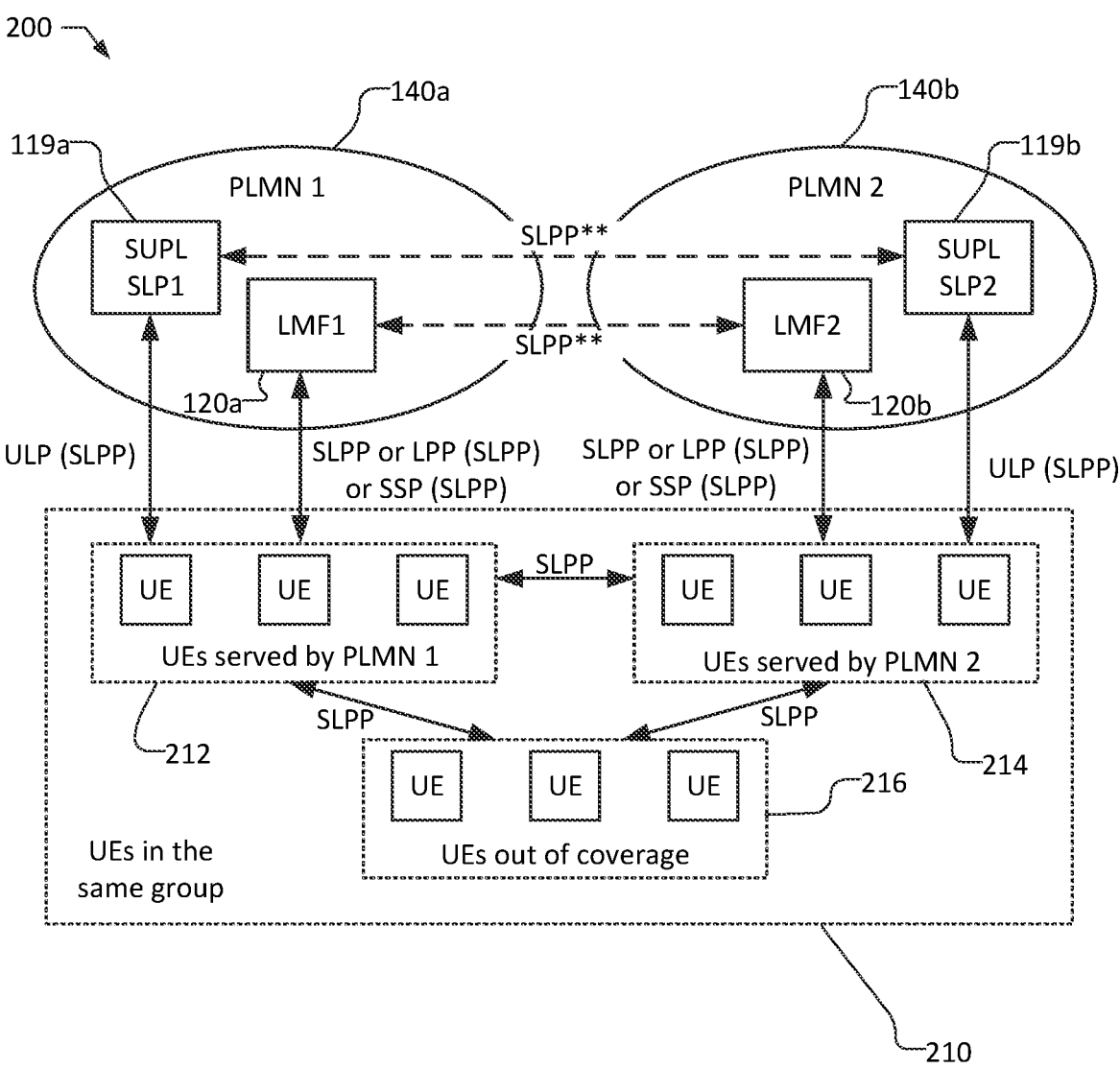
FIG. 2 shows an architecture of a communication system for sidelink positioning.

FIG. 2, by way of example, shows an architecture of a communication system 200 capable of network supported and network unsupported sidelink positioning. As illustrated in FIG. 2, a number of UEs (e.g. UEs 105) may be combined within a same group 210 for sidelink positioning. Within the group 210, various subgroups of UEs may be present. For example, the group 210 of UEs may include a first subgroup 212 of UEs that is served by a first network (PLMN1 140a), while a second subgroup 214 of UEs is served by a second (different) network (PLMN2 140b), and a third subgroup 216 of UEs is out of coverage of, and is not served by, either network. One or more of the UEs served by a network, e.g., the UEs in subgroup 212 served by PLMN1 140a, or the UEs in subgroup 214 served by PLMN2 140b, may include RSUs.

A location server in a serving network, e.g., LMF1 120a or SUPL SLP1 119a in the serving PLMN1 140a and LMF2 120b or SUPL SLP2 119b in the serving PLMN2 140b, may assist all UEs in a group that are served by the network (PLMN), e.g., subgroups 212 and 214, respectively. As illustrated, the location servers may support UEs by sending and receiving SLPP messages to and from the UEs, where the SLPP messages may be sent and received alone or may each be sent and received embedded in a message for another protocol such as LPP, the SUPL UserPlane Location Protocol (ULP) or a supplementary services protocol (SSP). For example, LMF1 120a and LMF2 120b may each embed an SLPP message in an LPP message or an SSP message or may each transfer the SLPP message not embedded while supporting UEs in subgroups 212 and 214, respectively, and SUPL SLP1 119a and SUPL SLP2 119b may each embed an SLPP message in a ULP message 1 while supporting UEs in subgroups 212 and 214, respectively. Additionally, the UEs within each subgroup, and UEs in different subgroups signal each other using non-embedded SLPP messages.

The location server (e.g., LMF/SUPL SLP) support for UEs may not be visible to other UEs in the group. For example, the location server support from the PLMN1 140a for UEs in subgroup 212 may not be visible to UEs in subgroup 214 and may not be visible to the out of coverage UEs in subgroup 216. The support provided by a location server to the UEs may include determination or verification of PRS configurations and calculation of location results for UEs, including UEs within the supported subgroup as well as UEs within unsupported subgroups, e.g., if position information for UEs in unsupported subgroups is proved to the location server. For example, in some implementations, signaling between location servers in separate networks may be used to provide more complete network support. As illustrated, LMF-LMF or SUPL SLP-SUPL SLP signaling may use SLPP or an extension of SLPP (SLPP**) to enable more complete network support.

The SLPP message types may align with LPP to enable LPP messages to contain SLPP messages, such as illustrated by signaling between LMF1 120*a* and the UEs of subgroup 212 and signaling between LMF2 120*b* and the UEs of subgroup 214. For example, SLPP may include messages that are analogous to an LPP Request Capabilities and Provide Capabilities, which, for example, in SLPP may be called Request Capabilities and Resources and Provide Capabilities and Resources. The Request/Provide Capabilities and Resources in SLPP may be restricted to NR PRS or may be extended to LTE PRS, RTK, WiFi, BT, etc.

In another example, SLPP may include a message that is analogous to an LPP Provide Assistance Data, which, for example, in SLPP may be called Provide Positioning Signal Configuration. The Provide Positioning Signal Configuration in SLPP may include one or more of, e.g., the PRS Configuration to be transmitted by each UE and measured by other UEs, a start time, duration, and conditions for termination, and the types of measurements requested, such as Rx-Tx, AoA, RSRP, TDOA. In some implementations, the Provide Positioning Signal Configuration in SLPP may be extended to define other types of signals, such as RTK signals to be measured, WiFi signal to be transmitted and measured etc. The Provide Positioning Signal Configuration in SLPP may include additional information, for example, to assist UEs in acquiring and measuring signals and to determine times of transmission.

In another example, SLPP may include a message such as Confirm Positioning Signal Configuration, which does not have an analogous LPP message. The Confirm Positioning Signal Configuration in SLPP, for example, may confirm whether a Provide Positioning Signal Configuration is agreeable. If the Provide Positioning Signal Configuration is (partly) not agreeable, a different configuration may be provided as a Provide Positioning Signal Configuration. Because LPP does not have an analogous message, a new LPP message type may be added to carry the Confirm Positioning Signal Configuration SLPP message when this is embedded in an LPP message.

In another example, SLPP may include a message that is analogous to an LPP Provide Location Information, which, for example, in SLPP may be called Provide Location Information. The Provide Location Information in SLPP may provide PRS measurements of other UEs and/or location results to other UEs. The Provide Location Information in SLPP may be extended to other measurements, such as measurements of RTK, WiFi, BT etc.

In another example, SLPP messages may include exactly the same SLPP message types that have been defined for LPP—e.g. an SLPP Request Capabilities, SLPP Provide Capabilities, SLPP Request Assistance Data, SLPP Provide Assistance Data, SLPP Request Location Information, SLPP Provide Location Information, SLPP Error and SLPP Abort.

As illustrated in FIG. 2, UEs within each subgroup and UEs in different subgroups may signal each other using SLPP. Additionally, location servers (e.g., LMF or SUPL SLP) may serve UEs using SLPP, e.g., embedded in LPP or SSP or sent not embedded. Accordingly, a first UE may receive a first SLPP message from a second UE and may send the first SLPP message to a location server that supports the first UE. The first UE may receive a second SLPP message from the location server in response to the first SLPP message and may send the second SLPP message to the second UE.

Figure 3:
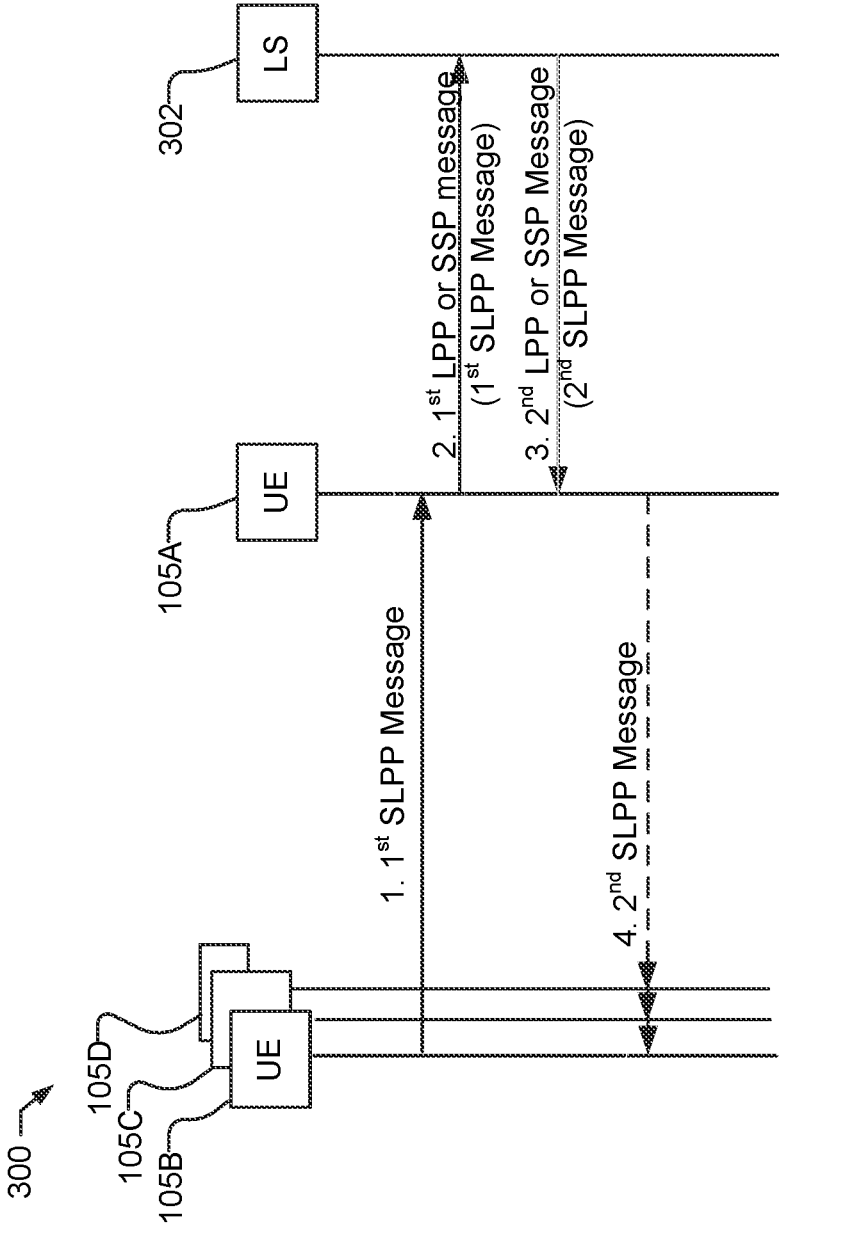
FIG. 3 is a signal flow illustrating signaling between UEs and a location server for network supported sidelink positioning.

FIG. 3, by way of example, is a signal flow 300 illustrating the signaling between UE 105A and UEs 105B, 105C, and 105D and a location server 302 for network supported sidelink positioning, as discussed herein. The UE 105A, 105B, 105C, and 105D, may belong to the same group, and may be, e.g., the UEs illustrated in FIG. 1 and any of the UEs illustrated within network supported subgroups 212 and 214 in FIG. 2. The location server 302 may be the LMF 120 or SUPL SLP 119 shown in FIG. 1 or the LMF1 120*a* or SUPL SLP1 119*a* shown in FIG. 2.

As shown in FIG. 3, in stage 1, the UE 105A receives a first SLPP message from the UE 105B. The first SLPP message, for example, may be any of the message types discussed above. The first SLPP message may be sent based on SL multicasting if the group contains more than two UEs, e.g., as illustrated in FIG. 3.

In stage 2, the UE 105A sends the first SLPP message to the location server 302 either not embedded or embedded in an LPP or SSP message.

In stage 3, the UE 105A receives a second SLPP message from the location server 302 in response to the first SLPP message in stage 2 and that is either not embedded or embedded in an LPP or SSP message. The second SLPP message may include a location result or results for at least one UE in the group. The location result, if present, may be a location result for the UE 105A or a location result for another UE in the group.

In stage 4, the UE 105A may send the second SLPP message to one or more of the UEs 105B, 105C, and 105D. The second SLPP message may be sent based on SL multicasting if the group contains more than two UEs, e.g., as illustrated in FIG. 3.

Figure 4:
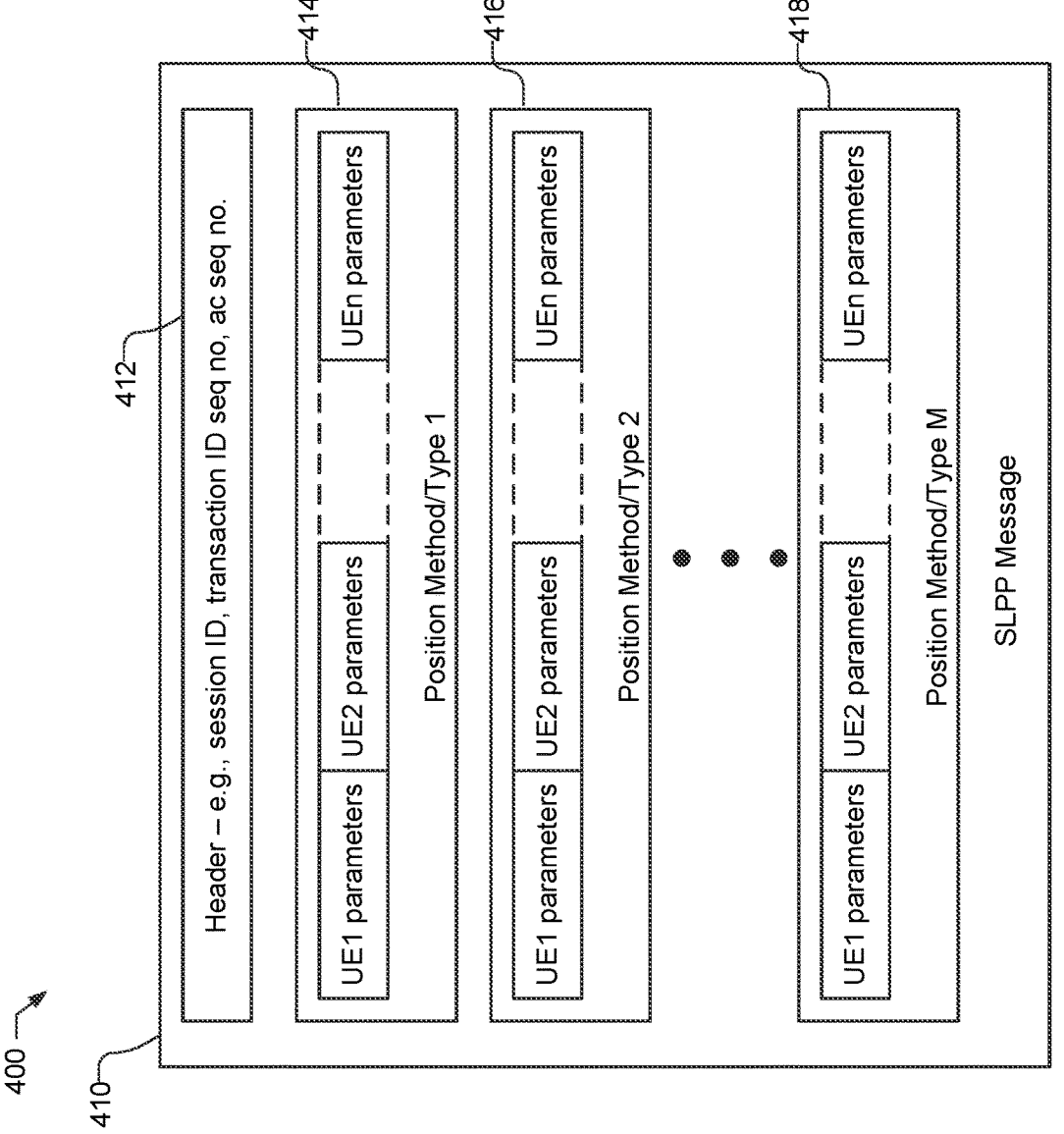
FIG. 4 is a block diagram illustrating an implementation of the structure of a sidelink positioning protocol message.

FIG. 4, by way of example, is a block diagram 400 illustrating one implementation of the structure of an SLPP message 410. As illustrated, the SLPP message 410 includes a header 412, which may include a session ID, transaction ID, sequence number (seq no), acknowledge sequence number (ack seq no), etc. The SLPP message 410 allows for one or more position methods or types. For example, the SLPP message 410 includes entries for a position method/type 1 414, a position method/type 2 416, and a position method/type M 418. A position method, for example, may use a specific signal type or types (e.g., PRS, WiFi, GPS L1-L5) and may support one method of determining location (e.g., PRS RTT). A position type, on the other hand, may use a specific signal type or types and may support multiple position methods (e.g., PRS RTT, AoA, AOD, TDOA). The SLPP message 410 may be configured to support position methods or position types, or both position methods and position types. As illustrated, each position method/type 414, 416, and 418 in the SLPP message 410 includes parameters for each UEs in a group, which are illustrated as being identified by members IDs, e.g., UE1, UE2, . . . . UEn. It is possible that not all UEs in a group support the same position methods/types. Support for multiple position methods or types in the SLPP message 410 may be advantageous as some UEs may support positioning using RTK and PRS, while other UEs may support only RTK. In some implementations, however, the SLPP message 410 may support only one position method or type (e.g., NR PRS).

As noted above, a solution that addresses the security concerns of SLPP and/or V2X communications and limitations of existing solutions may be desired. As will be disclosed in detail below, the solution disclosed herein provides a security solution that may support all coverage scenarios, authenticates UEs, ciphers SLPP messages and potentially other V2X messages, has low latency for authentication and ciphering operations, has high capacity with scalability to potentially support thousands of UEs in a small area, and may prevent critical security key data from being obtained by an attacker.

Figure 5:
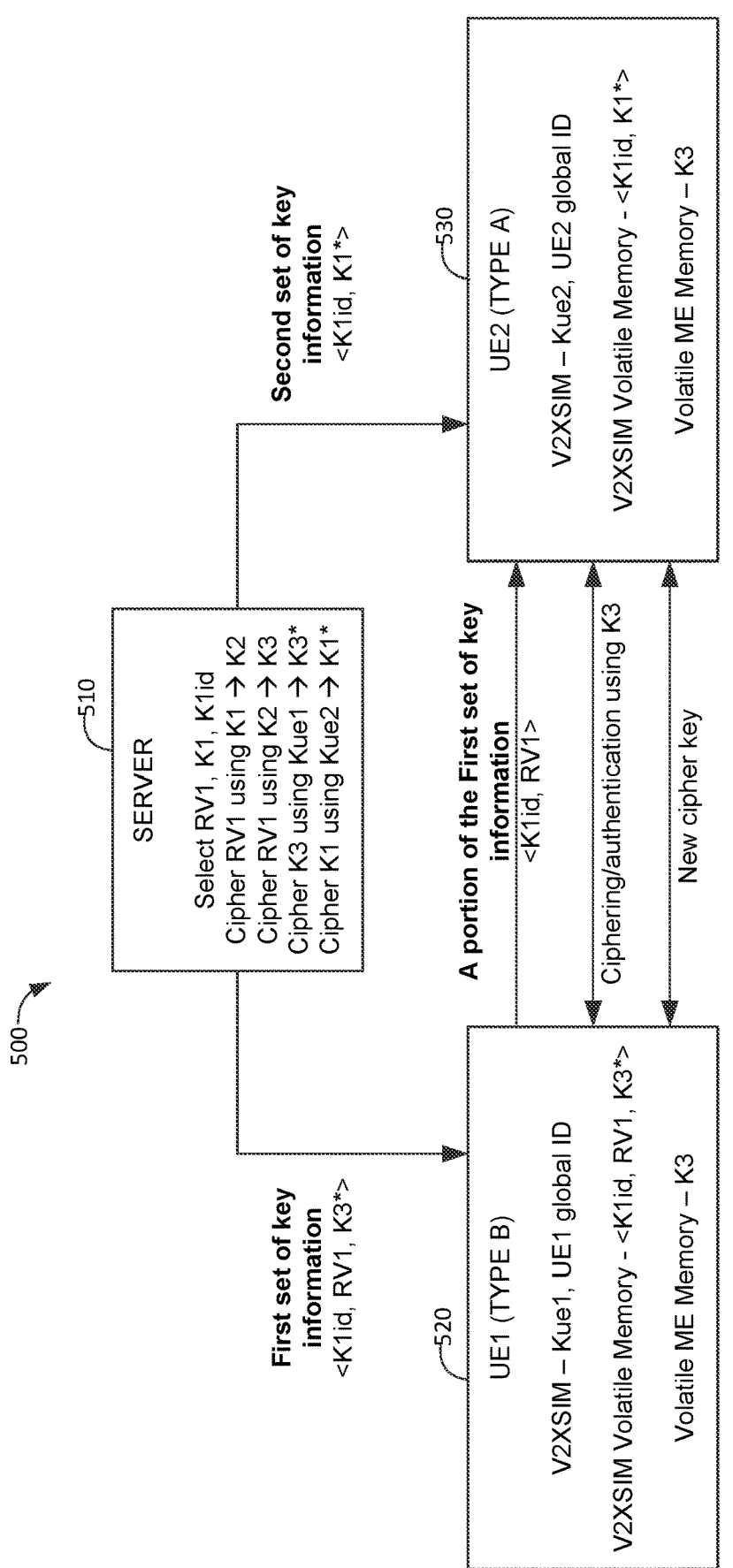
FIG. 5 is a block diagram illustrating an implementation of secure sidelink communication, according to an embodiment.

FIG. 5 is a block diagram illustrating an implementation of secure sidelink communication 500 for V2X or other applications, according to an embodiment. As shown in FIG. 5, secure sidelink communication 500 may be performed by a server 510 (e.g. a server 150), a type B UE 520 (e.g. a UE 105B), and a type A UE 530 (e.g. a UE 105A). In some embodiments, secure sidelink communication 500 may be configured for performing secure sidelink positioning between type B UE 520 and type A UE 530 (e.g., ciphering sidelink positioning messages for performing the sidelink positioning).

In some embodiments, server 510 may correspond to server 150 in FIG. 1. For example, server 510 may be a server owned and managed by a national organization (e.g., American Automobile Association), a government department, or a mobile network operator. In some embodiments, server 510 may be a server in a unified data management (UDM), a server in a home subscriber service (HSS), or a separate entity associated with a UDM or HSS. In some embodiments, server 510 may have the capability to determine and provide security information for type B UE 520 and type A UE 530 to perform the secure sidelink communication. As will be disclosed in detail below, server 510 may be configured to provide common security data and coordinate the secure sidelink communication among type B UE 520 and type A UE 530.

It is noted that type A UE 530 and type B UE 520 may be examples of the UEs 105 in FIGS. 1 and 3 and the UEs shown in FIG. 2. In some embodiments, the type A UE 530 and type B UE 520 may have different functions and capabilities. For example, the type A UE 530 may be more secure (e.g. more resilient to security attacks such as an attempt to extract cipher key information from UE memory) than the type B UE 520. For example, for support of V2X, the type A UE 530 could correspond to a roadside unit (RSU) and/or a special vehicle (e.g., a bus, truck or taxi) that coordinates the positioning of type B UEs such as the type B UE 520, whereas the type B UE 520 could correspond to a UE located in or attached to a vehicle that does not normally coordinate the positioning of other UEs. In other embodiments, the type A UE 530 and type B UE 520 may just be examples of the same type of UE (e.g. may both be RSUs or may both be UEs located in or attached to a vehicle). In some embodiments, both type B UE 520 and type A UE 530 have 4G and/or 5G access with an home public land mobile network (HPLMN).

In some embodiments, each of type B UE 520 and type A UE 530 includes a mobile equipment (ME) that supports functions of a user equipment including wireless communication with networks and other UEs and a V2X subscriber identity module (V2XSIM) integrated with the mobile equipment. In some embodiments, the V2XSIM (e.g., a universal SIM (USIM) or a dual USIM) may store a unique global identification (ID) and a unique private cipher key $K_{ue}$. The V2XSIM internal software and hardware security (e.g. concerning resilience to an unauthorized attempt to extract sensitive data from memory) may equal or surpass that in a normal USIM. If the V2XSIM includes a USIM, the unique global ID may be an international mobile subscriber identity (IMSI) and the unique private cipher key $K_{ue}$ may be a 3GPP key. In some embodiments, the global ID may indicate the server (e.g., server 510) the UE is associated with.

In some embodiments, the V2XSIM may be integrated into the UE and may not be removable. For example, the V2XSIM may be a soft SIM. Additionally or alternatively, if the V2XSIM is removable, the V2XSIM or the UE may be considered to have been tampered with when the V2XSIM is removed or inserted.

In some embodiments, when performing secure sidelink communication 500, type A UE 530 and/or type B UE 520 may periodically obtain V2X security data from server 510. For example, if server 510 is a UDM server or an HSS server, and the V2XSIM in type A UE 530 and/or type B UE 520 is a USIM, secure sidelink communication 500 (or a portion of secure sidelink communication 500) may be used to update security data on the V2XSIM of type A UE 530 and/or type B UE 520.

Additionally or alternatively, if server 510 is a non-3GPP server, mutual authentication and ciphering may be employed when type A UE 530 and/or type B UE 520 accesses server 510. Access to and authentication of server 510 can use transport layer security (TLS) with a public/private server key and a certificate. For example, authentication of the type A UE 530 and/or type B UE 520 and optionally of server 510 may use the UE's unique private cipher key $K_{ue}$ (e.g., using pre-shared key (PSK)).

In some embodiments, server 510 may perform security checks on type A UE 530 and/or type B UE 520's V2XSIM memory using cyclic redundancy check (CRC) stored in server 510 to determine/verify if the UE has been tampered with. Based on the determination, server 510 may be configured to deactivate and reactivate support of V2X security by the UE. In some embodiments, a type A UE 530 and/or type B UE 520 with V2X security deactivated is not able to use a sidelink positioning protocol in the secure mode disclosed herein.

As shown in FIG. 5, when performing secure sidelink communication 500, server 510 may provide a first set of key information to type B UE 520 and a second set of key information to type A UE 530. Type B UE 520 may share/transmit a portion of the first set of key information received from server 510 for ciphering/authentication with type A UE 530. Type A UE 530 may then perform the ciphering/authentication with type B UE 520 based on the second set of key information received from server 510 and the portion of the first set of key information received from type B UE 520. Based on the ciphering/authentication (e.g., both type B UE 520 and type A UE 530 determine a common cipher key), type B UE 520 and type A UE 530 may then perform the sidelink communication in the secure mode.

On one hand, server 510 may determine the first set of key information and securely transmit the first set of key information to type B UE 520. For example, server 510 may select a random or partly random value $RV_1$ (e.g. where $RV_1$ could be a bit string containing 128, 256 or more bits), a private cipher key $K_1$ (e.g. where $K_1$ may be a bit string containing 128 or 256 bits), and a cipher key identifier $K_{1id}$ (e.g. a numeric or alphanumeric value) for the private cipher key $K_1$. Server 510 may then cipher $RV_1$ using the private cipher key $K_1$ to generate a new cipher key $K_3$, which may be referred to as a derived cipher key (e.g. where $K_3$ may be a bit string containing 128 or 256 bits). Additionally or alternatively, prior to determining $K_3$, server 510 may determine an intermediate cipher key $K_2$ by ciphering the $RV_1$ using the cipher key $K_1$, and $K_3$ may be determined by ciphering the $RV_1$ using the intermediate cipher key $K_2$.

Server 510 may then cipher $K_3$ using a private cipher key $K_{ue1}$ known to both server 510 and type B UE 520 (e.g., the private cipher key stored in the V2XSIM of type B UE 520 along with the global ID of type B UE 520) to generate a key $K_3^*$. Additionally or alternatively, $K_{ue1}$ may also be some other data known to both server 510 and type B UE 520. In some embodiments, on server 510, $K_{1id}$ and $RV_1$ may be stored for later use if and when the security of type B UE 520 has been detected later as compromised.

In some embodiments, the first set of key information transmitted to type B UE 520 may include $K_{1id}$, $RV_1$, and $K_3^*$. For example, the first set of key information may be securely transmitted to type B UE 520, e.g., based on a secure connection between type B UE 520 and server 510 established using a public-private key pair of server 510.

In some embodiments, the ciphering process disclosed herein may be performed based on a 128-bit or 256-bit advanced encryption standard (AES) algorithm.

Upon receiving the first set of key information, the first set of key information may be stored in a volatile random-access memory (RAM) of type B UE 520 (e.g., a RAM of the V2XSIM or ME of type B UE 520). Type B UE 520 may determine $K_3$ based on $K_3^*$ included in the first set of key information and the $K_{ue1}$ that is already known to type B UE 520. In some embodiments, the determined $K_3$ may be stored in the RAM of type B UE 520 and may be used for supporting the sidelink positioning protocol security (as will be disclosed in detail below). In some embodiments, $K_3$ stored in type B UE 520 may be deleted once it is no longer needed (e.g., when an SL communication session that uses $K_3$ ends).

On the other hand, server 510 may determine the second set of key information and securely transmit the second set of key information to type A UE 530. For example, server 510 may cipher $K_1$ (e.g., the private cipher key known to server 510 and that is used for ciphering $RV_1$ to generate $K_3$) using a private cipher key $K_{ue2}$ known to both server 510 and type A UE 530 (e.g., the private cipher key stored in the V2XSIM of type A UE 530 along with the global ID of type A UE 530) to generate a key $K_1^*$. Additionally or alternatively, $K_{ue2}$ may also be some other data known to both server 510 and type A UE 530.

In some embodiments, the second set of key information may include the $K_{1id}$ and $K_1^*$. The second set of key information may be securely transmitted to type A UE 530, e.g., based on a secure connection established between type A UE 530 and server 510 using a public-private key pair of server 510.

Upon receiving the second set of key information, the second set of key information may be stored in a RAM of type A UE 530 (e.g., a RAM of the V2XSIM or ME of type A UE 530). Type A UE 530 may determine $K_1$ based on $K_1^*$ included in the second set of key information and $K_{ue2}$ known already to type A UE 530 e.g., using the processor of V2XSIM of type A UE 530. In some embodiments, the determined $K_1$ may be stored for a short period of time (e.g., a few microseconds during a later computation of $K_3$) and may only be stored for this short period in a V2XSIM processor.

In some embodiments, type B UE 520 may transmit in clear text a portion of the first set of key information including $K_{1id}$ and $RV_1$ to type A UE 530 for ciphering and/or authentication. Type A UE 530 may use $K_{1id}$ to determine use of $K_1$ for determining $K_3$ from $RV_1$ based on the same or similar mechanism to the one used by server 510 for determining $K_3$ (e.g., ciphering the $RV_1$ using $K_1$).

At this point, both type B UE 520 and type A UE 530 may possess and store $K_3$ (e.g., stored in a RAM memory of the mobile equipment of type B UE 520 and type A UE 530 respectively). The cipher key $K_3$ can enable secure ciphered communication using sidelink signaling (e.g. transfer of SLPP messages) between type B UE 520 and type A UE 530. A new cipher key for performing the sidelink communication in the secure mode between type B UE 520 and type A UE 530 (e.g., ciphering SLPP messages) may be determined and may be shared among type B UE 520 and type A UE 530 (e.g., may be determined by one of type B UE 520 or type A UE 530 and transmitted to the other type A UE 530 or type B UE 520 in ciphered form using $K_3$). After determining and transferring the new cipher key for performing the secure mode sidelink communication, $K_3$ may be deleted in both type B UE 520 and type A UE 530.

Additionally or alternatively, in some embodiments, $K_3$ may be used directly for performing the secure mode sidelink communication. For example, initially, Type B UE 520 may send an SLPP message ciphered using $K_3$ to type A UE 530 and include the associated $K_{1id}$ and $RV_1$ values not ciphered (i.e. in clear text) in a header of the SLPP message to allow the type A UE 530 to determine $K_3$ as described above.

Accordingly, the sidelink communication may be performed between type B UE 520 and type A UE 530 in the secure mode based on the new cipher key determined based on $K_3$ or using $K_3$ directly. In some embodiments, sidelink positioning of type B UE 520 (e.g., based on a sidelink positioning session) may be performed between type B UE 520 and type A UE 530 based on the secure mode sidelink communication.

The support of secure sidelink communication between type B UE 520 and type A UE 530 has so far been described for just one type B UE 520 and one type A UE 530. However, there may be many type B UEs 520 and many type A UEs 530. In such a case, each type B UE 520 may have a unique private cipher key $K_{ue1}$ known only to the server 510 and that type B UE 520, and may be assigned another unique cipher key $K_3$ by the server 510 by selecting (by the server 510) a unique random value $RV_1$ for that type B UE 520 that is used to determine the unique cipher key $K_3$ by the server 510 as described above. Similarly, each type A UE 530 may have a unique private cipher key $K_{ue2}$ known only to the server 510 and that type A UE 530. However, the private cipher key $K_1$ and associated key identifier $K_{1id}$ may be common to some or all type A UEs 530.

In some embodiments, the secure mode sidelink communication may be performed among different associations of type B UEs 520 and/or type A UEs 530. For example, when the secure mode sidelink communication is performed between two type A UEs (e.g., between two type A UEs 530), one of the type A UEs may perform the role of a type B UE (e.g., type B UE 520) disclosed herein. For example, a type A UE that perform the role of a type B UE 530 with respect to the description of FIG. 5 may select a random or partly random $RV_1$ value and determine a $K_3$ value based on the $RV_1$ and $K_1$ in a mechanism the same as or similar to the one disclosed above. The two type A UEs can then establish secure sidelink communication as described above for a type B UE 520 and type A UE 530. It is noted that each time a type A UE determines a $K_3$, a different $RV_1$ (e.g., a different random or partial random value $RV_1$) may be used.

In some embodiments, the secure mode sidelink communication may be performed among a type A UE and multiple type B UEs (e.g., one type A UE being securely associated with multiple type B UEs using group cipher keys). When performing the secure mode sidelink communication, the type A UE may establish a UE group (e.g. for session oriented sidelink positioning) and may transfer a common group cipher key to each type B UE using the security association already established with each type B UE based on the method with respect to the description of FIG. 5. Sidelink positioning (e.g. SLPP) messages may then be groupcast (also referred to as multicast) by any UE in the group to all other UEs in the group and may be ciphered using the common group cipher key. If the group is modified (e.g., with one or more UEs joining or leaving the group) and if the type A UE remains in the group, the type A UE can transmit a new common group cipher key (e.g. as described above) to each type B UE that will be part of the new group. In some embodiments, the transmission of the common group cipher key to each type B UE may be based on unicasting. Alternatively or additionally, the common group cipher key can be transmitted to all type B UEs in a single groupcast message, where the common group cipher key may be included as a separate parameter for each type B UE and is ciphered using the unique cipher key (e.g. $K_3$ key) for that type B UE.

In some embodiments, the secure mode sidelink communication may be performed among an association that includes no type A UE (e.g., with only type B UEs). When performing the secure mode sidelink communication, one of the type B UEs may retain the role of a type B UE and establish a security association with the other type B UEs that now act as type A UEs based on the method with respect to the description of FIG. 5. For example, server 510 may provide the second set key information to all the type B UEs. In some embodiments, the key $K_1$ used by server 510 for determining the second set key information transmitted to the type B UEs may be different (e.g., considered less secure) than the key $K_1$ used for determining the second set of key information transmitted to Type A UEs. The type B UE that retains the role of a type B UE may then select a random or partly random $RV_1$ value and determine a $K_3$ key value based on the $RV_1$ and $K_1$ for type B UEs in a mechanism the same as or similar to the one disclosed above. The type B UE can then establish secure sidelink communication with each type B UE that acts as a type A UE as described above for a type B UE 520 and type A UE 530. In some embodiments, each time that a type B UE needs to determine a $K_3$ key for establishing a secure association with other type B UEs that act as type A UEs, a new $RV_1$ and thus new $K_3$ may be used.

In some embodiments, the secure mode sidelink communication may also be performed in a sessionless mode for sidelink positioning. For example, type A and type B UEs may each broadcast SLPP messages to all other nearby UEs. The $K_1$ keys assigned to type B UEs may be used for the broadcasting, where these $K_1$ keys assigned to type B UEs are also sent by server 510 (in ciphered form) to type A UEs. In that case, a type A UE or a type B UE that broadcasts an SLPP message may select a random or partly random $RV_1$ value, determine a $K_3$ key value based on the $RV_1$ and $K_1$ for type B UEs in a mechanism the same as or similar to the one disclosed above, cipher the SLPP message using the $K_3$ key and include the $RV_1$ and $K_{1id}$ values in plain text (i.e. not ciphered) in the SLPP message. Recipient UEs can then decipher the SLPP message by behaving as type A UEs that determine the $K_3$ key using the received $RV_1$ and $K_{1id}$ values as described above. In some embodiments, a UE may periodically (e.g. every few minutes or every few hours) determine a new $K_3$ key value based on a new $RV_1$ value and a $K_1$ key for type B UEs. The UE may then use the new $K_3$ key to cipher sidelink positioning messages being broadcast as just described. This can allow recipient UEs to decipher the broadcast SLPP messages and accordingly, each $K_3$ key may be effectively unique to one UE only.

In some embodiments, Type A UEs 530 may be configured by the server 510 with multiple private cipher keys $K_1$. In that case, a derived cipher key $K_3$, determined for any Type B UE 520 by the server 510, can be determined using any one of the multiple private cipher keys $K_1$. The cipher key identifier $K_{1id}$ is then configured in the Type B UE 520 by the server 510 so that, when transferred to a Type A UE 530 along with the random value $RV_1$ of the Type B UE 520, the Type A UE 530 will know which private cipher key $K_1$, configured in the Type A UE 530, to use to determine the derived cipher key $K_3$.

In some embodiments, a type A UE (e.g., type A UE 530) and/or a type B UE (e.g., type B UE 520) may employ any suitable existing internal ciphering method to protect volatile and non-volatile storage content from access by an attacker. A type A UE may be required to support a higher minimum level of memory protection than a type B UE. When a type A UE and/or a type B UE or a corresponding V2XSIM detects any form of tampering or non-allowed access, all security data received from the server (e.g., server 510) may be deleted. In some embodiments, absence of security data may result in deactivation of the support of V2X security in the UE. As noted above, only the server (e.g., server 510) can reactivate the support of V2X security in the UE by providing new security data to the UE. When a UE (e.g., type A UE 530 and/or type B UE 520) accesses a server (e.g., server 510) without previous existing security data, the server may run diagnostic routines to check internal UE and V2XSIM integrity.

In some embodiments, a UE (e.g., type A UE 530 or type B UE 520) may set an alarm indication in a non-erasable memory (e.g. PROM) when a possible tampering activity is detected. The non-erasable memory may be configured to have a capacity to include multiple indications. If a server (e.g., server 510) detects a new indication of a possible tampering activity not seen before, the UE and the associated vehicle may be required to be physically checked by an authorized service center.

In some embodiments, a key $K_3$ may be exposed internally within one or more UEs (e.g., type A UE 530 and/or type B UE 520) only while being used to cipher and decipher sidelink positioning messages and/or possibly other messages. The period of exposure may vary from less than one second (e.g., when $K_3$ is replaced by another key for secure association between two UEs) to possibly minutes or hours (e.g., when a $K_3$ key is used for a sessionless sidelink positioning mode by a UE). It is noted that each $K_3$ key can belong to or be assigned by one UE only. This may limit the loss of security if a $K_3$ key value is obtained by an attacker. When a server discovers possible tampering with a type B UE, the server may send the type B UE's $K_3$ value to all relevant type A UEs. The relevant type A UEs may then reject a secure association using this $K_3$ value with the type B UE.

In some embodiments, a $K_1$ key may not be exposed internally within a UE as it is only used during the computation of a $K_3$ key which may only take microseconds. On the other hand, an associated (ciphered) $K_1^*$ value may be exposed in a volatile memory (e.g., a RAM) and may be obtained by an attacker with physical access to the mobile equipment or V2XSIM of the corresponding UE. The V2XSIM may then detect abnormal conditions (e.g. V2XSIM removal/insertion, loss/addition of power) and may delete the $K_1*$ value when abnormal conditions are detected. If a $K_1*$ key is obtained from a UE, an attacker may still need the corresponding private key (e.g., $K_{ue1}$ and/or $K_{ue2}$) of the UE in order to determine the corresponding $K_1$ key, which may require reprogramming the V2XSIM of the UE to decipher $K_1*$ using the private key. To mitigate the possibility that an attacker may obtain a $K_1$ key from a $K_1*$ value, $K_1$ keys and associated $K_3$ keys may be changed/updated in UEs (e.g., type A UE 530 and type B UE 520) by a server (e.g., server 510) on at least a daily basis, depending on whether an attack is suspected.

In some embodiments, an attacker may pose as a legitimate UE owner and bypass security by hacking directly into the mobile equipment of the UE to read and/or modify sidelink positioning protocol location data. Or, in some embodiments, the sidelink positioning function in a type B UE may malfunction. Accordingly, to mitigate those situations, type A UEs may monitor location results from type B UEs and report those type B UEs that provide erroneous results (e.g., above some threshold) or have unexpected location results (e.g. a static location not on a highway) to a server (e.g., server 510). Those type B UEs may be identified and reported using their Key related IDs (e.g. $RV_1$). Servers may then decide when a type B UE poses a danger and report those type B UEs to all relevant type A UEs. The server may then deactivate the support of V2X security in the type B UE. The owner/user of those deactivated type B UEs may then be required to visit a service center to have the support of V2X security reactivated.

Figure 6:
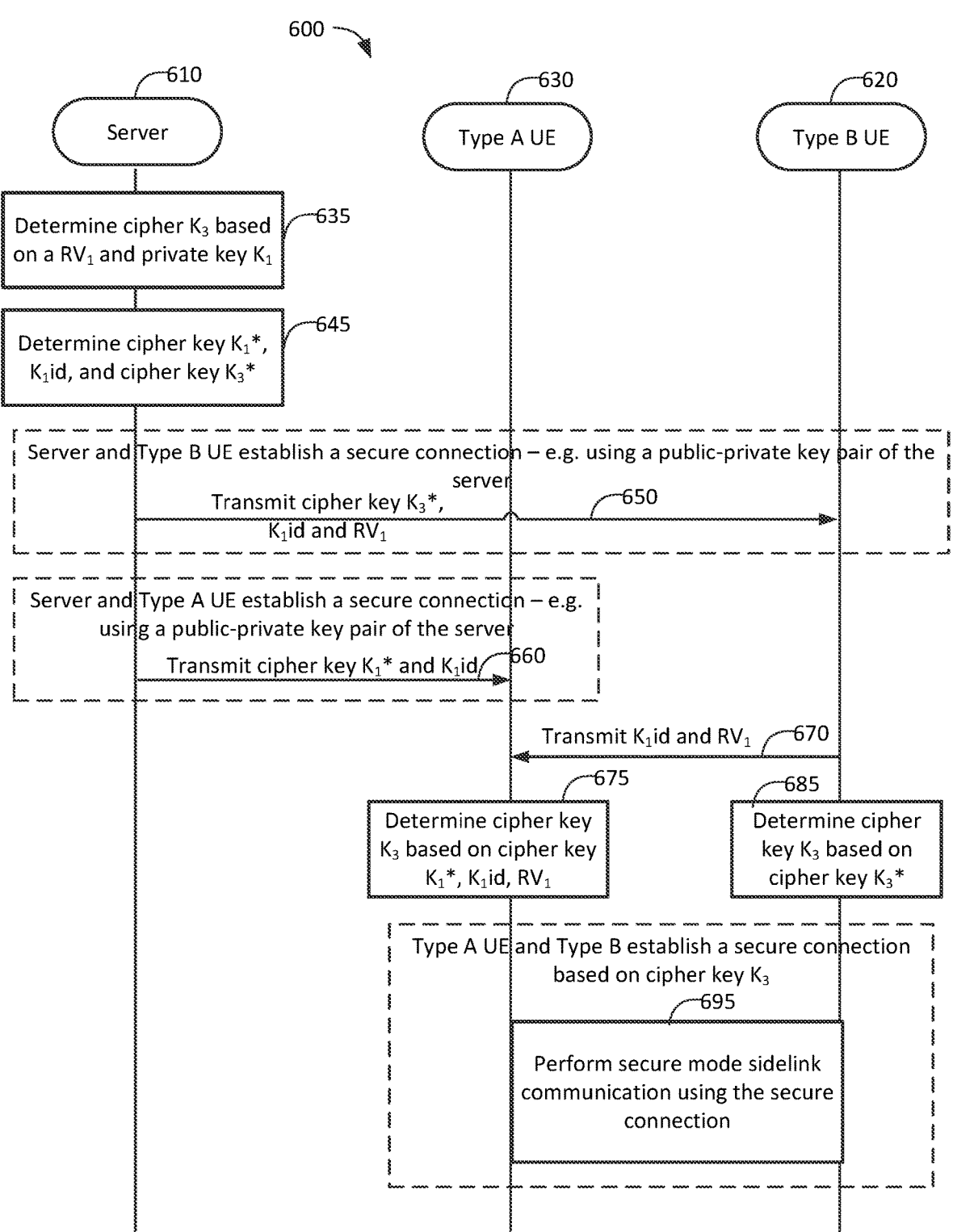
FIG. 6 is a signaling flow diagram illustrating how secure sidelink communication may be performed, according to an embodiment.

FIG. 6 is a signaling flow diagram illustrating how secure sidelink communication 600, similar to that described for FIG. 5, may be performed, according to an embodiment. As shown in FIG. 6, secure sidelink communication 600 may be performed by a server 610 (e.g., corresponding to server 510 in FIG. 5), a type B UE 620 (e.g., corresponding to type B UE 520 in FIG. 5), and a type A UE 630 (e.g., corresponding to type A UE 530 in FIG. 5).

Secure sidelink communication 600 may start at block 635 where server 610 may determine a cipher key $K_3$ based on a random or partly random value $RV_1$ and a private cipher key $K_1$ known to or selected by server 610. In some embodiments, server 610 may select or determine $RV_1$ as a random or partly random value and cipher $RV_1$ using $K_1$ to determine $K_3$. Additionally or alternatively, prior to determining $K_3$, server 610 may determine an intermediate cipher key $K_2$ by ciphering the $RV_1$ using the $K_1$, and $K_3$ may be determined by ciphering the $RV_1$ using the intermediate key $K_2$.

At block 645, server 610 may determine a key $K_1*$, a first key ID $K_{1id}$ corresponding to and identifying the key $K_1$, and a key $K_3*$. In some embodiments, server 610 may cipher $K_1$ using a private cipher key $K_{ue1}$ known to type A UE 630 (e.g., a private cipher key stored in the V2XSIM of type A UE 630 along with the global ID of type A UE 630) to generate the key $K_1*$. In some embodiments, server 610 may assign $K_{1id}$ to indicate $K_1$ and server 610. For example, $K_{1id}$ may include a pointer to or an indication of both $K_1$ and server 610. In some embodiments, on server 610, $K_{1id}$ and $RV_1$ may be stored for later use if the security of type B UE 620 has been detected as compromised. In some embodiments, server 610 may cipher $K_3$ using a private cipher key $K_{ue2}$ known to type B UE 620 (e.g., a private cipher key stored in the V2XSIM of type B UE 620 along with the global ID of type B UE 620) to generate the key $K_3*$.

At arrow 650, server 610 and type B UE 620 may establish a secure connection, e.g. using a public-private key pair of server 610, and server 610 transmits a first set of key information including $K_{1id}$, $RV_1$, and $K_3*$ to type B UE 620.

At arrow 660, server 610 and type A UE 630 may establish a secure connection, e.g. using a public-private key pair of server 610, and server 610 transmits a second set of key information including $K_{1id}$ and $K_1*$ to type A UE 630.

At arrow 670, type B UE 620 may transmit a portion of the first set of key information received from server 610, including $K_{1id}$ and $RV_1$ in clear text (also referred to as plain text) to type A UE 630.

At block 675, type A UE 630 may identify the cipher key $K_1$ (or key $K_1*$) based on receiving the cipher key identifier $K_{1id}$ at 660. Type A UE 630 may then determine $K_3$ based on $K_1*$ received from server 610 (e.g., included in the second set of key information at 660) and $RV_1$ received from type B UE 620 (e.g., included in the portion of the first set of key information at 670). For example, upon receiving the second set of key information, the second set of key information may be stored in a RAM of type A UE 630 (e.g., RAM of the V2XSIM or ME of type A UE 630). Type A UE 630 may determine $K_1$ based on $K_1*$ included in the second set of key information and $K_{ue2}$ known to type A UE 630 e.g., using the processor of V2XSIM of type A UE 630. In some embodiments, the determined $K_1$ may be stored for a short period of time (e.g., a few microseconds during the later computation of $K_3$) and may be stored for this short period of time only in a V2XSIM processor or ME processor. Type A UE 630 may then determine $K_3$ based on the $K_1$ determined earlier (and identified by $K_{1id}$ received from type B UE 620) and $RV_1$ received from type B UE 620 based on a mechanism similar to or the same as the one server 610 uses to determine $K_3$ at block 635 (e.g., ciphering the $RV_1$ using $K_1$).

At block 685, type B UE 620 may determine $K_3$ based on $K_3*$ received from server 610 (e.g., included in the first set of key information at 650). Upon receiving the first set of key information, the first set of key information may be stored in a volatile random-access memory (RAM) of type B UE 620 (e.g., RAM of the V2XSIM or ME of type B UE 620). Type B UE 620 may determine $K_3$ based on $K_3*$ included in the first set of key information and $K_{ue1}$ already known to type B UE 620. In some embodiments, the determined $K_3$ may be stored in the RAM of type B UE 620 and may be used for supporting the sidelink positioning protocol security (as will be disclosed in detail below). In some embodiments, $K_3$ stored in type B UE 620 may be deleted once it is no longer needed (e.g., when the SL communication session that uses $K_3$ ends).

At block 695, type A UE 630 and type B UE 620 establish a secure connection based on cipher key $K_3$ and may perform sidelink communication (e.g. by exchanging SLPP messages ciphered using cipher key $K_3$) using the security association between type A UE 630 and type B UE 620. At this point, both type B UE 620 and type A UE 630 may both possess and store $K_3$ (e.g., stored in a RAM memory of the mobile equipment of type B UE 620 and type A UE 630 respectively). A new cipher key or pair of keys for performing the sidelink communication in the secure mode (e.g., ciphering the sidelink positioning messages) may be determined based on $K_3$ (e.g., by ciphering using $K_3$ or by transferring the new cipher key(s) ciphered using $K_3$) and may be shared among type B UE 620 and type A UE 630 (e.g., determined by one of type B UE 620 or type A UE 630 and transmitted to the other type A UE 630 or type B UE 620). Upon determining the new cipher key for performing the secure mode sidelink communication, $K_3$ may be deleted in both type B UE 620 and type A UE 630. As part of block 695, type A UE 630 and type B UE 620 may exchange SLPP messages in order to obtain location results (e.g. relative locations, directions and/or ranges for type A UE 630 and type B UE 620) where each SLPP message is ciphered and optionally integrity protected using the new cipher key(s).

Additionally or alternatively, in some embodiments, $K_3$ may be used directly for performing the secure mode sidelink communication. Type B UE 620 may then send an SLPP message ciphered using $K_3$ to type A UE 630, including the associated $K_{1id}$ and $RV_1$ values not ciphered in a header of the SLPP message.

Accordingly, the sidelink communication may be performed between type B UE 620 and type A UE 630 in the secure mode based either on the new cipher key(s) determined based on $K_3$ or on $K_3$ directly. In some embodiments, sidelink positioning of type B UE 620 and/or type A UE 630 (e.g., based on a sidelink positioning session) may be performed between type B UE 620 and type A UE 630 based on the secure mode sidelink communication.

Security for sidelink positioning (e.g. SLPP) sessions may mean enabling UEs to exchange SLPP messages such that messages cannot be read, altered or spoofed by entities that are not part of the session. Such entities could include other UEs as well as devices that are not 3GPP compliant UEs. Another method to support this is described next and relies on use of common private cipher keys in participating UEs which can substantially reduce latency and processing in comparison to methods relying on public-private key pairs.

A method of derived cipher keys is described next for support of secure sidelink communication and positioning and is illustrated further down in FIGS. 7A, 7B and 8. For the method of derived cipher keys, each participating UE n is pre-configured (e.g. in a USIM or V2XSIM and by a server such as server 150) with a private cipher key $K_n$ (e.g. containing 128 or 256 bits) and a random or partly random value $RV_n$ (e.g. containing 128 to 1024 bits where some bits may indicate a date and time of creation and/or a validity period of usage). Each random value $RV_n$ can be unique to each UE n and could be authenticated to another UE m as belonging to the UE n using a public key based certificate that authenticates $RV_n$ as belonging to a UE with the global identity of UE n. Each private cipher key $K_n$ may be unique to each UE n or may be randomly chosen from a common set of M distinct private cipher keys $PK_1, PK_2, PK_3, \ldots$ $PK_M$ where M may (e.g.) be in the range of one thousand to one million. In that case, some UEs may share the same private cipher key. For example, if the number of participating UEs is N, the number of distinct private cipher keys is M (where N>M) and each private cipher key is assigned to each least one UE, the average number of UEs sharing the same private cipher key would be N/M. When each UE has a unique private cipher key, it may be assumed that M equals N and the set of M distinct private cipher keys $PK_1, PK_2, PK_3, PK_M$ can be such that $K_n$ equals $PK_n$ ($1 \leq n \leq N$).

Each UE n is further configured with a private cipher key ID $K_{IDn}$ indicating its private cipher key $K_n$—e.g. where $K_{IDn}$ is an index or pointer to the private cipher key $K_n$ in the fixed set of private cipher keys $PK_1, PK_2, PK_3, \ldots PK_M$. Each UE n is further configured with a set of M derived cipher keys $DK_{n1}, DK_{n2}, DK_{n3}, \ldots DK_{nM}$, that are determined by a server (e.g. a server 150, a computer system 1300, an Intelligent Transport System (ITS) server or a Sidelink Positioning Key Management Function (SLPKMF)) that knows the fixed set of private cipher keys $PK_1, PK_2, PK_3, \ldots PK_M$. The derived cipher keys may be determined by the server as follows:

$$DK_{nm} = \text{Cipher}_m(PK_m, RV_n) \quad (1 \leq n \leq N, 1 \leq m \leq M) \quad \text{(Eq 1)}$$

Here, $\text{Cipher}_m$ is any ciphering algorithm fixed for the private cipher key $PK_m$ that ciphers the random value $RV_n$ using the private cipher key $PK_m$. For example $\text{Cipher}_m$ may be an AES ciphering algorithm using one or more known parameter values (e.g. such as a known counter value). Any UE n that is configured with the private cipher key $PK_m$ is also configured to know the fixed ciphering algorithm $\text{Cipher}_m$. The derived cipher keys $DK_{n1}, DK_{n2}, DKn3, \ldots DK_{nM}$, may each contain the same number of bits (e.g. 128 bits). In some embodiments, the ciphering algorithm $\text{Cipher}_m$ is the same for all M private cipher keys $PK_m$.

Periodically (e.g. every day, every week or every month), the random value $RV_n$, the M derived cipher keys $DK_{n1}, DK_{n2}, DKn3, \ldots DK_{nM}$, and possibly the private cipher key $K_n$ and the private cipher key ID $K_{IDn}$, may be replaced in each UE$_n$ with a new set by the server—e.g. at night when network bandwidth is plentiful. Alternatively or additionally, the M derived cipher keys may be extended with additional derived cipher keys when additional private cipher keys are added to the current M private cipher keys.

The configuration of each UE$_n$ with the random or partly random value $RV_n$, the set of derived cipher keys $DK_{nm}$ for the UE$_n$, a private cipher key $K_n$ of the set of private cipher keys $PK_1, PK_2, PK_3, \ldots PK_M$, and a corresponding private cipher key ID $K_{IDn}$ may be performed by a server, e.g. server 150. The configuration may be secure. For example, the server may establish a secure connection to the UEn or the UE$_n$ may establish a secure connection to the server, where security is based on a public-private key pair of the server—e.g. using a Transport Layer Security (TLS) connection.

Pairs of UEs and groups of UEs can use the configured key information to establish secure sidelink (e.g. SLPP) sessions. For a pair of UEs 1 and 2 (e.g. where UEs 1 and 2 may be examples of UEs 105 or UE 1200), a procedure to enable a secure sidelink positioning session is shown in FIG. 7A and is as follows, where normal font in FIG. 7A shows plain (unciphered) text and italic bold font shows ciphered text.

Figure 7A:
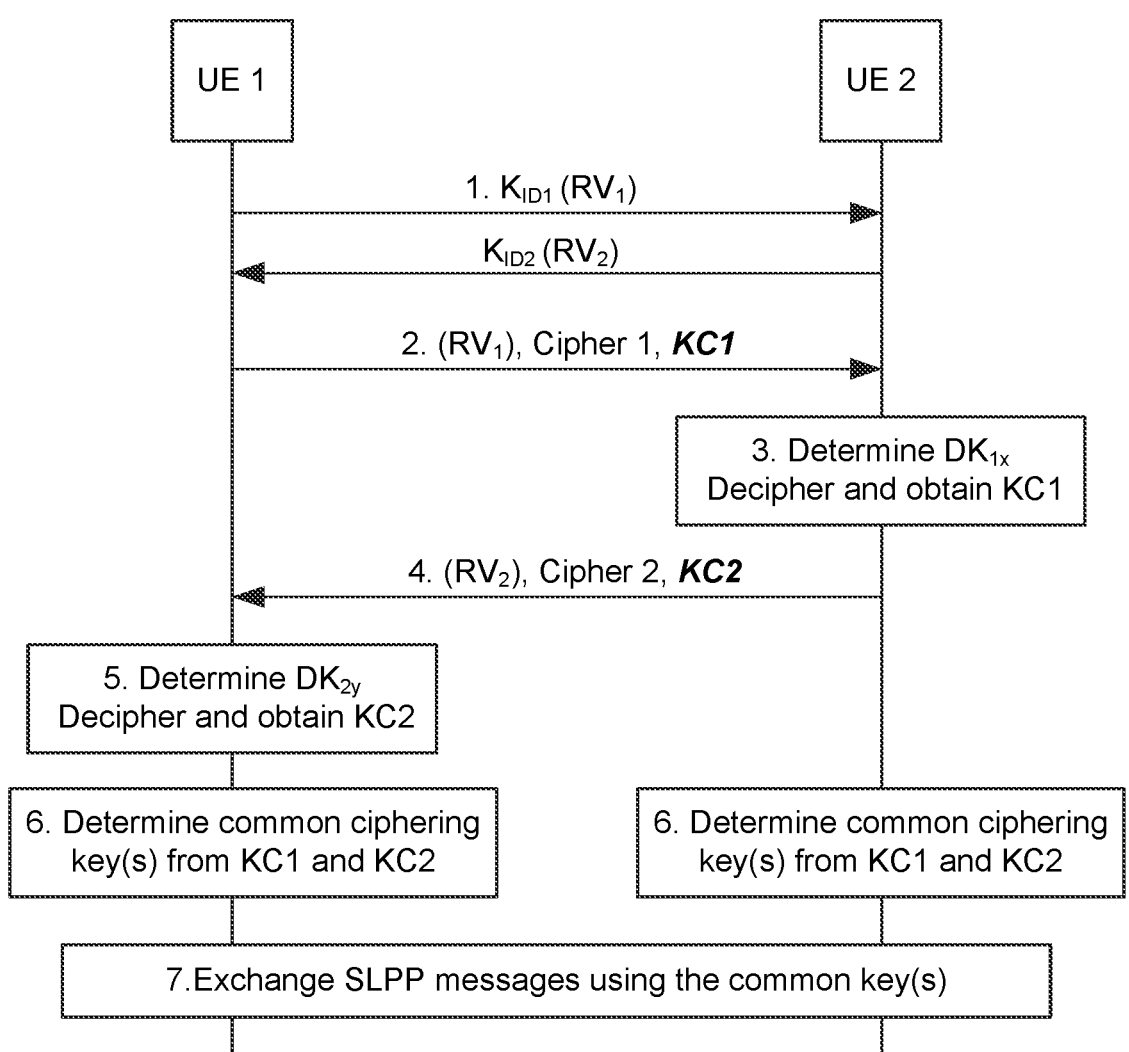
FIGS. 7A and 7B are signaling flow diagrams illustrating how secure sidelink communication may be performed for a pair of UEs, according to an embodiment.

At stage 1 in FIG. 7A, UE 1 and UE 2 exchange their private cipher key IDs $K_{ID1}$ and $K_{ID2}$ and optionally their random values $RV_1$ and $RV_2$ in plain text. One of the UEs (UE 1 here) takes the role of coordinator (e.g. based on some property or relationship of the private cipher key IDs $K_{ID1}$ and $K_{ID2}$ and/or the random values $RV_1$ and $RV_2$ or based on which of UEs 1 and 2 discovered, or was discovered by, the other UE).

At stage 2, UE 1 sends to UE 2 its random value $RV_1$ (if not exchanged at stage 1) and an indication of a cipher operation Cipher 1 (e.g. which may include indicating a cipher algorithm and/or a counter value and/or other value(s)) in plain text. UE 1 also sends a first key component KC1 in cipher text. KC1 may be a random bit string determined by UE 1 (e.g. containing 128 bits). The ciphering of KC1 uses the Cipher operation Cipher 1 with the derived cipher key $DK_{1x}$, that is configured in UE 1, when $K_{ID2}$ received at stage 1 indicates that the private cipher key of UE 2 is $PK_x$.

At stage 3, UE 2 determines the derived cipher key $DK_{1x}$ using the random value $RV_1$ from stage 1 or 2 and the private cipher key $PK_x$ of UE 2 according to equation 1 and then deciphers and obtains the first key component KC1 based on the cipher operation Cipher 1 and the derived cipher key $DK_{1x}$.

At stage 4, UE 2 returns to UE 1 its random value $RV_2$ (if not exchanged at stage 1) and an indication of a cipher operation Cipher 2 (e.g. which may include indicating a cipher algorithm and/or a counter value and/or other value(s)) in plain text. UE 2 also sends a second key component KC2 in cipher text. KC2 may be a random bit string determined by UE 2 (e.g. containing 128 bits). The ciphering of KC2 uses the Cipher operation Cipher 2 with the derived cipher key $DK_{2y}$, that is configured in UE 2, when $K_{ID1}$ received at stage 1 indicates that the private cipher key of UE 1 is $PK_y$.

At stage 5, UE 1 determines the derived cipher key DK2$y$ using the random value $RV_2$ from stage 1 or 4 and the private cipher key $PK_y$ of UE 1 according to equation 1 and then deciphers and obtains the second key component KC2 based on the cipher operation Cipher 2 with the derived cipher key $DK_2y$.

At stage 6, UEs 1 and 2 each determine a common ciphering key and optionally a common integrity protection key by combining the first and second key components KC1 and KC2. For example, KC1 and KC2 might be combined using one or more of concatenation, addition, exclusive OR, multiplication, interleaving, truncation.

At stage 7, UE 1 and UE 2 exchange sidelink (e.g. SLPP) messages to perform sidelink positioning using the common key(s) from stage 6 to cipher sidelink messages and optionally provide integrity protection of sidelink messages (e.g. using a digital signature).

Figure 12:
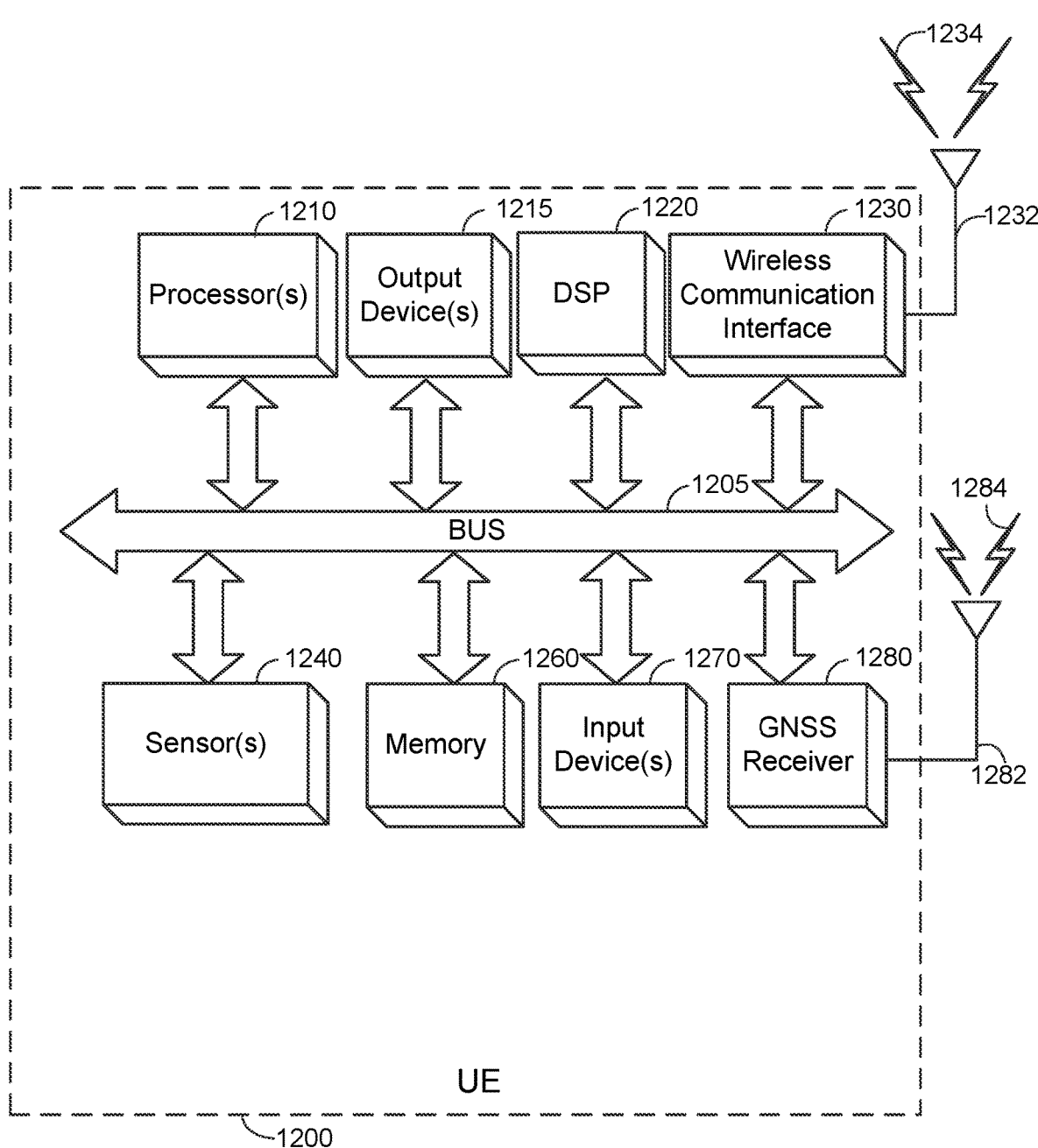
FIG. 12 is a block diagram of an embodiment of a UE, which can be utilized in embodiments as described herein.

The messages used to transfer key and ciphering related information at stages 1, 2 and 4 in FIG. 12 may be messages used for UE Discovery and/or to establish an SLPP session. For example, UE discovery messages may be used to exchange Key IDs and optionally random values at stage 1, and/or an SLPP Create Session Request and SLPP Create Session Accept may be used, respectively, at stages 2 and 4.

Any other UE (different to UE 1 and UE 2), that is able to receive and decode the messages sent at stages 1, 2 and 4, would not be able to decipher both the first key component KC1 sent at stage 2 and the second key component KC2 sent at stage 4 if the private cipher key IDs, $K_{ID1}$ and $K_{ID2}$, (and thus the associated private cipher keys $K_1$ and $K_2$) are different, because the other UE only has one private cipher key and not two private cipher keys. If the private cipher key IDs, $K_{ID1}$ and $K_{ID2}$ (and thus the associated private cipher keys $K_1$ and $K_2$), are the same and if the other UE also has the same private cipher key, the other UE would be able to decipher both the first key component KC1 and the second key component KC2 and could thereby determine the common ciphering key and optional common integrity protection key at stage 6, which would allow reading, alteration and/or spoofing of the sidelink messages exchanged at stage 7 by the other UE. For any given pair of UEs 1 and 2 and any given other UE, the probability of this (i.e. that all 3 private cipher keys match) would be $M^{-2}$ which is $10^{-6}$ when M=1000 and $10^{-12}$ when M=1,000,000, which is very low. However, to reduce the probability even further, each UE n may be pre-configured with a second private cipher key $K^*_n$, from the set of private cipher keys $PK_1$, $PK_2$, $PK_3$, . . . . $PK_M$ that is different to its normal private cipher key $K_n$, and an associated key ID $K^*_{IDn}$. In the procedure in FIG. 7A, and at stage 2, UE 1 may then include and send its second private cipher key ID $K^*_{ID1}$ in plain text to UE 2 based on the two private cipher key IDs exchanged at stage 1 being the same. At stage 4, UE 2 then ciphers the second key component KC2 using the Cipher operation Cipher 2 with the derived cipher key $DK_{2z}$, that is configured in UE 2, when $K^*_{ID1}$ received at stage 2 indicates that the second private cipher key of UE 1 is $PK_z$. At stage 5, UE 1 determines the derived cipher key $DK_{2z}$, using the random value $RV_2$ from stage 1 or stage 4 and the second private cipher key $PK_z$ of UE 1 according to equation 1 and then deciphers and obtains the second key component KC2 based on the cipher operation Cipher 2 with the derived cipher key $DK_{2z}$. This would reduce the probability that another UE could obtain the common key(s) determined at stage 6.

When each participating UE is configured with a first private cipher key and a second private cipher key as described above, then for any given pair of UEs 1 and 2 and any given other UE, that is able to receive and decode the messages sent at stages 1, 2 and 4 in FIG. 7A, the other UE would only be able to decipher both the first key component KC1 sent at stage 2 and the second key component KC2 sent at stage 4 if (A) the other UE is configured with the same private cipher keys $K^*_1$ and $K_2$ used by the UEs 1 and 2 and if (B) the UEs 1 and 2 have the same first private cipher key. The probability of condition (B) is $M^{-1}$. The probability of condition (A) is $(M^*(M-1)/2)^{-1}$. The probability of both conditions is then approximately $2^*M^{-3}$, which is $2^*10^{-9}$ when M=1000 and $2^*10^{-18}$ when M=1,000,000, which is extremely low.

The procedure shown in FIG. 7A can be simplified by removing the transfer of the first and second key components, KC1 and KC2, at stages 2 and 4. The simplified procedure is shown in FIG. 7B.

Figure 7B:
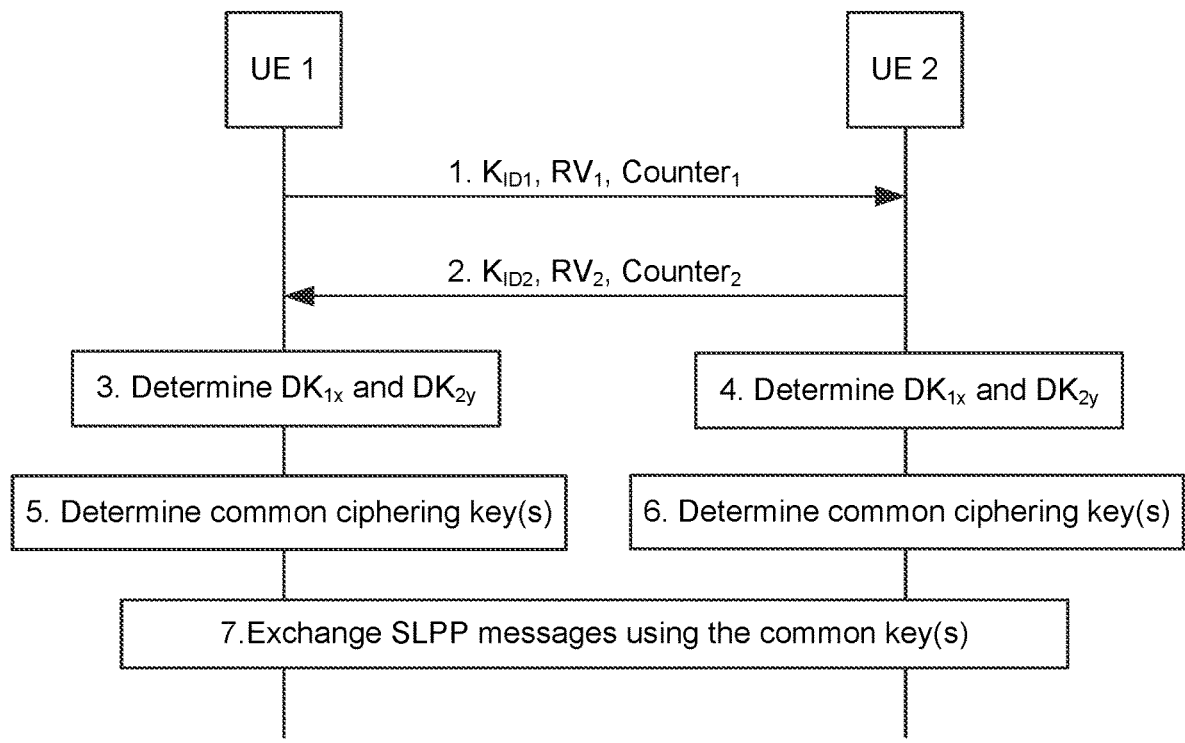

At stage 1 in FIG. 7B, UE 1 sends its private cipher key ID (or first private cipher key ID when UE 1 has two private cipher keys) $K_{ID1}$ and its random value $RV_1$ in plain text to UE 2. UE 1 also sends one or more counter and/or random values, denoted $Counter_1$, to UE 2 (also in plain text). The counter value(s) and/or random values may be used later to determine a unique common ciphering key or keys. For example, a counter value may be an integer value not used previously by UE 1 and a random value may be a random bit string with 64 to 256 bits.

At stage 2, UE 2 sends its private cipher key ID $K_{ID2}$ and its random value $RV_2$ in plain text to UE 1. UE 2 also sends one or more counter and/or random values, denoted $Counter_2$, to UE 1 (also in plain text). The counter value(s) and/or random values may be as described for UE 1 (though typically with different values). If UE 2 is configured with a first and second private cipher key as described above and if the private cipher key ID $K_{ID1}$ received from UE 1 at stage 1 is the same as the private cipher key ID $K_{ID2}$ for the first private cipher key of UE 2, then UE 2 sends the private cipher key ID $K^*_{ID2}$ for the second private cipher key of UE 2 to UE 1 at stage 2 and not the private cipher key ID $K_{ID2}$ for the first private cipher key of UE 2.

At stage 3, UE 1 determines derived cipher keys $DK_{1x}$ and $DK_{2y}$. $DK_{1x}$ is already configured in UE 1 and is identified from the private cipher key ID $K_{ID2}$ (or $K^*_{ID2}$) received from UE 2 at stage 2 when $K_{ID2}$ (or $K^*_{ID2}$) indicates that the private cipher key of UE 2 is $PK_x$. $DK_{2y}$ is calculated by UE 1 from the random value $RV_2$ received from UE 2 at stage 2 and the private cipher key $PK_y$ of UE 1 using equation (1), when the private cipher key of UE 1 is $PK_y$.

At stage 4, UE 2 similarly determines the derived cipher keys $DK_{1x}$ and $DK_{2y}$. $DK_{2y}$ is already configured in UE 2 and is identified from the private cipher key ID $K_{ID1}$ received from UE 1 at stage 1 when $K_{ID1}$ indicates that the private cipher key of UE 1 is $PK_y$. $DK_{1x}$ is calculated by UE 2 using equation (1) from the random value $RV_1$ received from UE 1 at stage 1 and the private cipher key $PK_x$ of UE 2 corresponding to the key ID $K_{ID2}$ or $K^*_{ID2}$ sent to UE 1 at stage 2.

At stage 5, UE 1 determines a common ciphering key and optionally a common integrity protection key by combining the derived cipher keys $DK_{1x}$ and $DK_{2y}$ (determined at stage 3) and the counter value(s) and/or random values Counter (sent at stage 1) and $Counter_2$ (received at stage 2). The combining may use one or more of ciphering, concatenation, addition, exclusive OR, multiplication, interleaving, truncation. As an example, if $Counter_1$ and $Counter_2$ each include one random value and one counter, the two random values may first be combined (e.g. by concatenation), then ciphered using $DK_{1x}$ and one of the counter values and then ciphered again using $DK_{2y}$ and the other counter value with the result possibly truncated to yield a key with 128 or 256 bits.

At stage 6, UE 2 determines the same common ciphering key and optionally the same common integrity protection key by combining the same derived cipher keys $DK_{1x}$ and $DK_{2y}$ (determined at stage 4) and the counter value(s) and/or random values $Counter_1$ (received at stage 1) and $Counter_2$ (sent at stage 2). The combining is the same as performed by UE 1 at stage 5.

At stage 7, UE 1 and UE 2 exchange sidelink (e.g. SLPP) messages to perform sidelink positioning using the common key(s) from stages 5 and 6 to cipher sidelink messages and optionally provide integrity protection of sidelink messages (e.g. using a digital signature).

The messages used to transfer key and ciphering related information at stages 1 and 2 in FIG. 7B may be messages used for UE Discovery and/or to establish an SLPP session. For example, an SLPP Create Session Request message and an SLPP Create Session Accept messages may be used, respectively, at stages 1 and 2.

Figure 8:
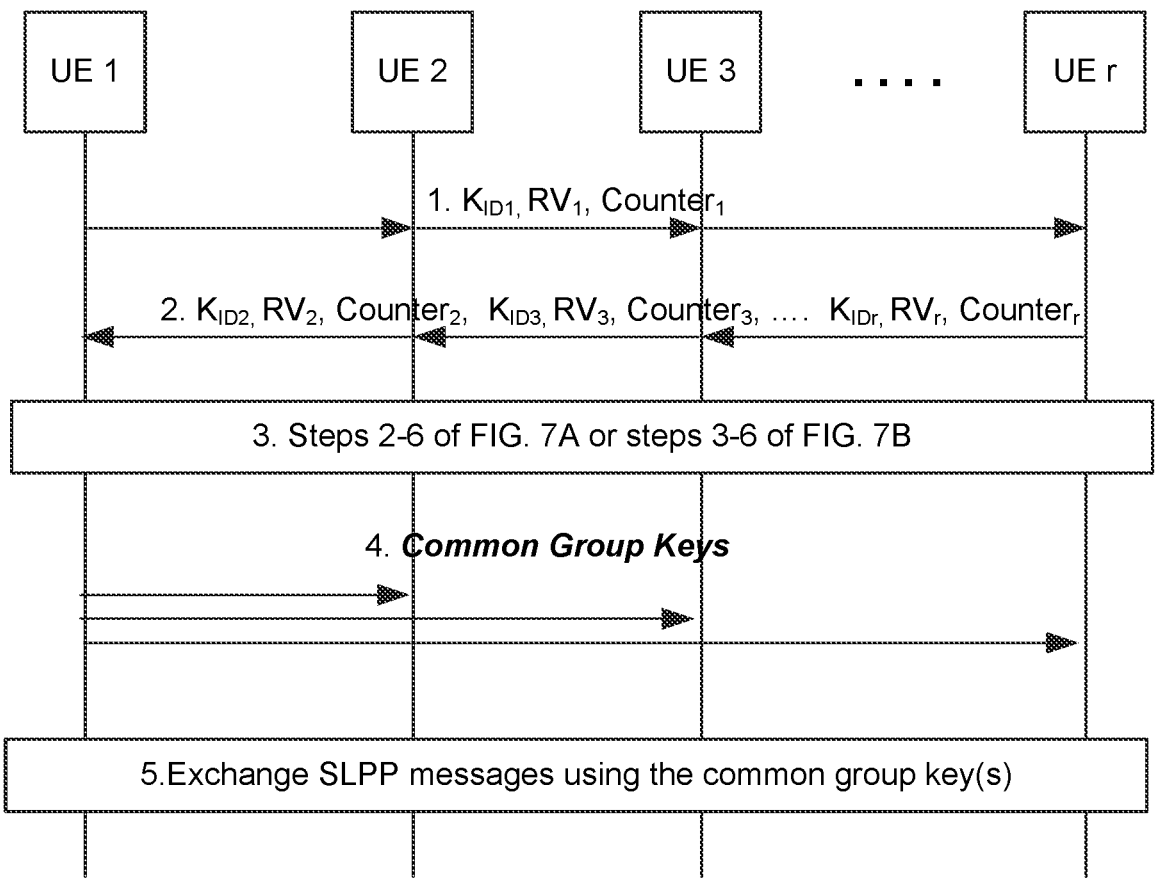
FIG. 8 is a signaling flow diagram illustrating how secure sidelink communication may be performed, for a group of UEs, according to an embodiment.

For a group of UEs 1, 2, 3, . . . r (r>2), the procedure shown in FIG. 8 can be used to support secure SL positioning for the group of UEs, where normal font in FIG. 8 shows plain (unciphered) text and italic bold font shows ciphered text. The UE pre-configuration assumptions described earlier for FIGS. 7A and 7B also apply to FIG. 8.

At stage 1 in FIG. 8, a coordinator UE 1 sends (e.g. via a single groupcast message or r–1 separate unicast messages) its private cipher key ID $K_{ID1}$, its random value $RV_1$ and optionally one or more counter and/or random values $Counter_1$ (e.g. when FIG. 7B is used at stage 3) in plain text to each of the other r–1 UEs.

At stage 2, each of the other r–1 UEs p ($2 \le p \le r$) sends its own private cipher key ID $K_{IDp}$, its random value $RV_p$ and optionally one or more counter and/or random values $Counter_p$ (e.g. when FIG. 7B is used at stage 3) in plain text to UE 1. If a UE p is configured with a first and second private cipher key as described above and if the private cipher key ID $K_{ID1}$ received from UE 1 at stage 1 is the same as the private cipher key ID $K_{IDp}$ for the first private cipher key of UE p, then UE p sends the private cipher key ID $K^*_{IDp}$ for the second private cipher key of UE p to UE 1 at stage 2 and not the private cipher key ID $K_{IDp}$ for the first private cipher key of UE p.

At stage 3, the coordinator UE 1 performs either stages 2 to 6 of FIG. 7A or stages 3 to 6 of FIG. 7B as described previously with each of the other r–1 UEs. For FIG. 7A, messages may be unicast as in FIG. 7A or the coordinator UE 1 may groupcast the message at stage 2 in FIG. 7A to all r–1 other UEs. For the groupcast case, the message sent at stage 2 in FIG. 7A may contain the random value $RV_1$ (if not sent at stage 1) and the indication of the cipher operation Cipher 1 in plain text and the first key component KC1 included q times, where each inclusion of KC1 is ciphered using the Cipher operation Cipher 1 with a different derived cipher key $DK_{1s}$, where at least one other UE indicated private cipher key $PK_s$ at stage 2 and q is the number of different private cipher key IDs indicated by the r–1 other UEs at stage 2. The inclusion of KC1 ciphered using the Cipher operation Cipher 1 with a derived cipher key $DK_{1s}$ can also be accompanied by the key ID for the private cipher key $PK_s$ in plain text so that any UE that is configured with the private cipher key $PK_s$ knows which ciphering of KC1 it needs to decipher.

At stage 4 in FIG. 8, the coordinator UE 1 uses the common key(s) determined for each of the other r–1 UEs at stage 3 to send (e.g. using groupcast or unicast) to each of the other r–1 UEs in ciphered form a common group key or pair of group keys that will be used by all r UEs. For each UE p ($2 \le p \le r$) to which the common group key(s) are sent, UE 1 ciphers the common group key(s) using the common key(s) determined by UE 1 and UE p for the UEs 1 and p as part of stage 3. UE 1 may send the common group key(s) to the other r–1 UEs by groupcasting a single SLPP Start Session message (e.g. an SLPP Start Session message) containing the common group key(s) in ciphered form to the other r–1 UEs.

At stage 5, the group of r UEs exchange SLPP messages to perform sidelink positioning using the common group key(s) from stage 4 to cipher SLPP messages and optionally provide integrity protection of SLPP messages (e.g. using a digital signature).

The solution for secure sidelink communication and secure sidelink positioning described previously with respect to FIGS. 5 and 6 can be seen as a degenerate version of the method of derived cipher keys described for FIGS. 7A, 7B and 8, where a Type B UE is configured with a random value ($RV_1$) and a derived cipher key ($K_3$) and a Type A UE is configured with a private cipher key ($K_1$) and can determine the derived cipher key for the Type B UE using the private cipher key and random value, but where the reverse of this (Type B UE configured and acting as a Type A UE and Type A UE configured and acting as a Type B UE) may not be used.

Figure 9:
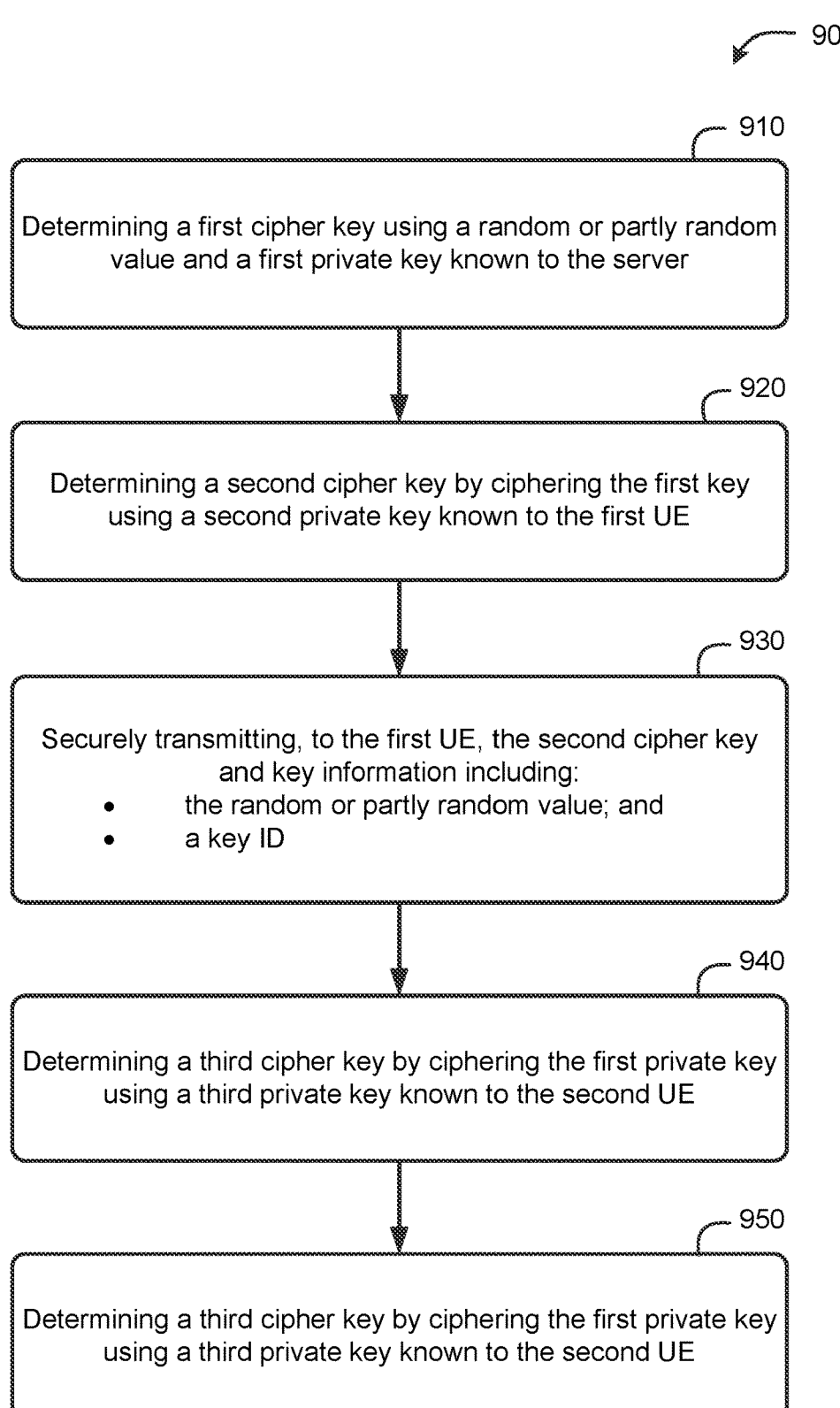
FIG. 9 is a flow diagram of a method of secure sidelink communication performed by a server, according to an embodiment.

FIG. 9 is a flow diagram of a method 900 of secure sidelink communication between a first UE (e.g., the type B UE with respect to the description of FIGS. 5 and 6) and a second UE (e.g., the type A UE with respect to the description of FIGS. 5 and 6) performed by a server, according to an embodiment. In some embodiments, the server may correspond to server 510 in FIG. 5 and/or server 610 in FIG. 6. Means/structure for performing the functionality illustrated in one or more of the blocks shown in FIG. 9 may be performed by hardware and/or software components of a computer system, as described herein. Example components of a computer system are illustrated in FIG. 13, which are described in more detail below.

At block 910, the functionality comprises determining a first cipher key (e.g., a cipher key $K_3$ with respect to the description of FIGS. 5 and 6) using a random or partly random value (e.g., $RV_1$ with respect to the description of FIGS. 5 and 6) and a first private cipher key (e.g., $K_1$ with respect to the description of FIGS. 5 and 6) known to the server. In some embodiments, the server may select $RV_1$ from a pool of random or partly random values and ciphering $RV_1$ using $K_1$ known to $K_3$. Additionally or alternatively, prior to determining $K_3$, the server may determine an intermediate cipher key $K_2$ by ciphering the $RV_1$ using the $K_1$, and $K_3$ may be determined by ciphering $K_2$.

Figure 13:
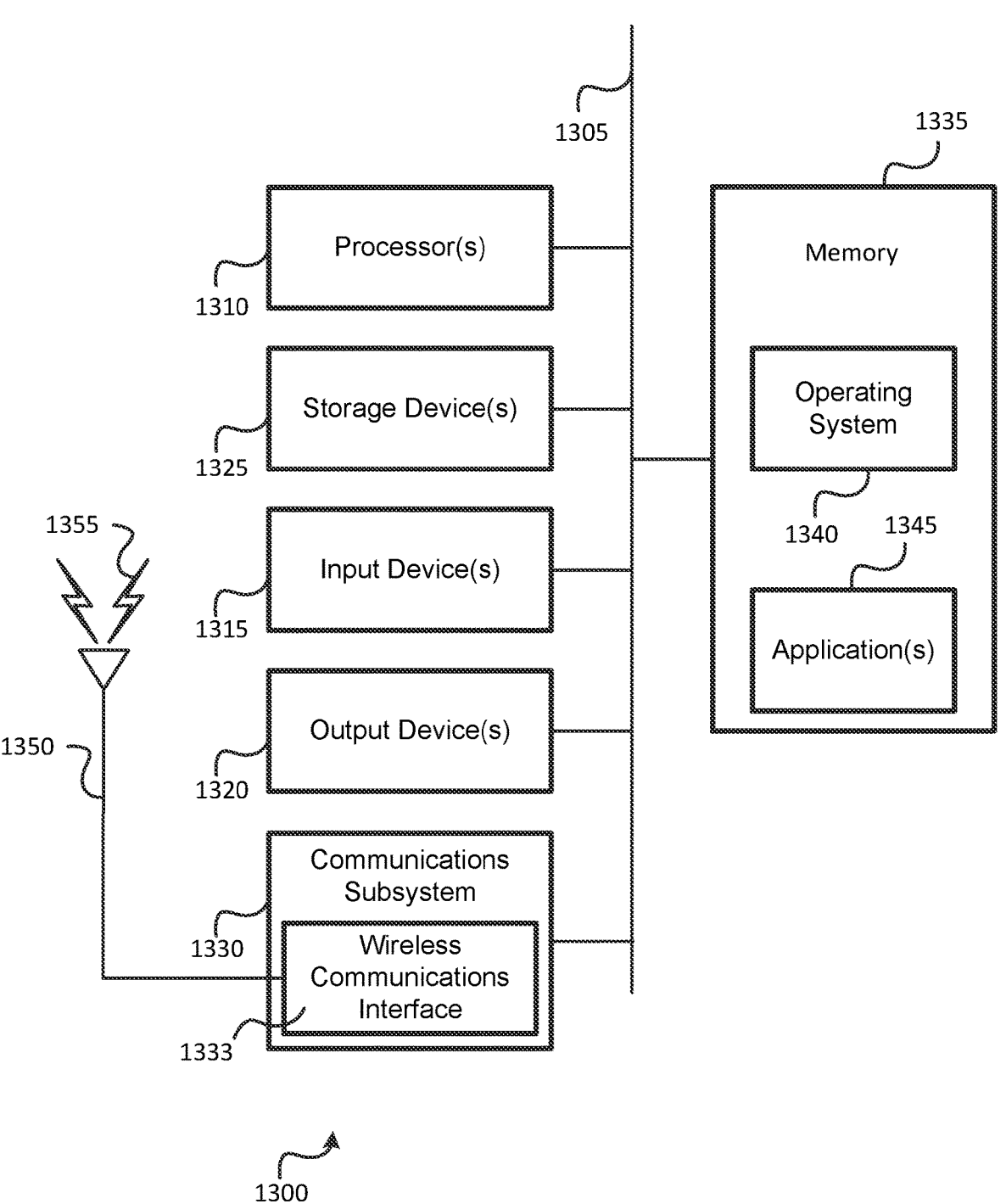
FIG. 13 is a block diagram of an embodiment of a computer system, which can be utilized in embodiments as described herein.

Means for performing functionality at block 910 may comprise a bus 1305, processor(s) 1310, communications subsystem 1330, memory 1335, and/or other components of computer system 1300, as illustrated in FIG. 13.

At block 920, the functionality comprises determining a second cipher key (e.g., $K_3$* with respect to the description of FIGS. 5 and 6) by ciphering the first cipher key using a second private cipher key (e.g., $K_{ueB}$ with respect to the description of FIGS. 5 and 6) known to the first UE. For example, the server may cipher $K_3$ using a private cipher key $K_{ueB}$ known to the type B UE (e.g., the private cipher key stored in the V2XSIM of the type B UE along with the global ID of the type B UE) to generate $K_3$*. Additionally or alternatively, $K_{ueB}$ may also be some other data known to both the server and the type B UE.

Means for performing functionality at block 920 may comprise a bus 1305, processor(s) 1310, communications subsystem 1330, memory 1335, and/or other components of computer system 1300, as illustrated in FIG. 13.

At block 930, the functionality comprises securely transmitting, to the first UE, the second cipher key and key information including the random or partly random value and a key ID. In some embodiments, the first key information with respect to the description of FIGS. 5 and 6 may be securely transmitted to the first UE. The key ID may correspond to $K_{1id}$ with respect to the description of FIGS. 5 and 6. For example, the server may assign $K_{1id}$ indicating $K_1$ and the server to $RV_1$. For example, $K_{1id}$ may include a pointer to or an indication of both $K_1$ and the server. In some embodiments, on the server, $K_{1id}$ may be stored for later use if the security of the type B UE has been detected as compromised. In some embodiments, the server may cipher $K_3$ using a private cipher key $K_{ueB}$ known to the type B UE (e.g., the private cipher key stored in the V2XSIM of the type B UE along with the global ID of the type B UE to generate $K_3$*. Additionally or alternatively, $K_{ueB}$ may also be some other data known to both the server and the type B UE. In some embodiments, the server and the type B UE may establish a secure connection, e.g. using a public-private key pair of the server, and transmit the first key information including $K_{1id}$, $RV_1$, and $K_3$* to the type B UE securely.

Means for performing functionality at block 930 may comprise a bus 1305, processor(s) 1310, communications subsystem 1330, memory 1335, and/or other components of computer system 1300, as illustrated in FIG. 13.

At block 940, the functionality comprises determining a third cipher key (e.g., $K_1$* with respect to the description of FIGS. 5 and 6) by ciphering the first private key using a third private key ($K_{ueA}$ with respect to the description of FIGS. 5 and 6) known to the second UE. For example, the server may cipher $K_1$ (e.g., the private key known to the server and is used for ciphering $RV_1$ to generate $K_3$) using a private key $K_{ueA}$ known to the type A UE (e.g., the private key stored in the V2XSIM of the type A UE along with the global ID of the type A UE) to generate a key $K_1$*. Additionally or alternatively, $K_{ueA}$ may also be some other data known to both the server and the type A UE.

Means for performing functionality at block 940 may comprise a bus 1305, processor(s) 1310, communications subsystem 1330, memory 1335, and/or other components of computer system 1300, as illustrated in FIG. 13.

At block 950, the functionality comprises securely transmitting, to the second UE, the third cipher key and the key ID. For example, the server and the type A UE may establish a secure connection, e.g. using a public-private key pair of the server, and transmit a second key information including $K_{1id}$ and $K_1$* to the type A UE.

Means for performing functionality at block 950 may comprise a bus 1305, processor(s) 1310, communications subsystem 1330, memory 1335, and/or other components of computer system 1300, as illustrated in FIG. 13.

In some embodiments, method 900 further comprises updating the first private key over a predetermined time period.

In some embodiments, method 900 further comprises transmitting, to the second UE, the second cipher key and the first key ID responsive to detecting tampering of the first UE.

In some embodiments, method 900 further comprises verifying the first UE or the second UE for accessing the server based on performing a cyclic redundancy check (CRC) on a vehicle-to-everything (V2X) subscriber identity module (SIM) memory of a corresponding UE.

In some embodiments, in method 900, the first cipher key, the second cipher key, the third cipher key, or any combination thereof are determined based on an 128-bit AES algorithm.

In some embodiments, method 900 further comprises receiving, from the second UE, a notification reporting erroneous results in a sidelink positioning of the first UE; and disqualifying the second UE from participating in the sidelink positioning.

Figure 10:
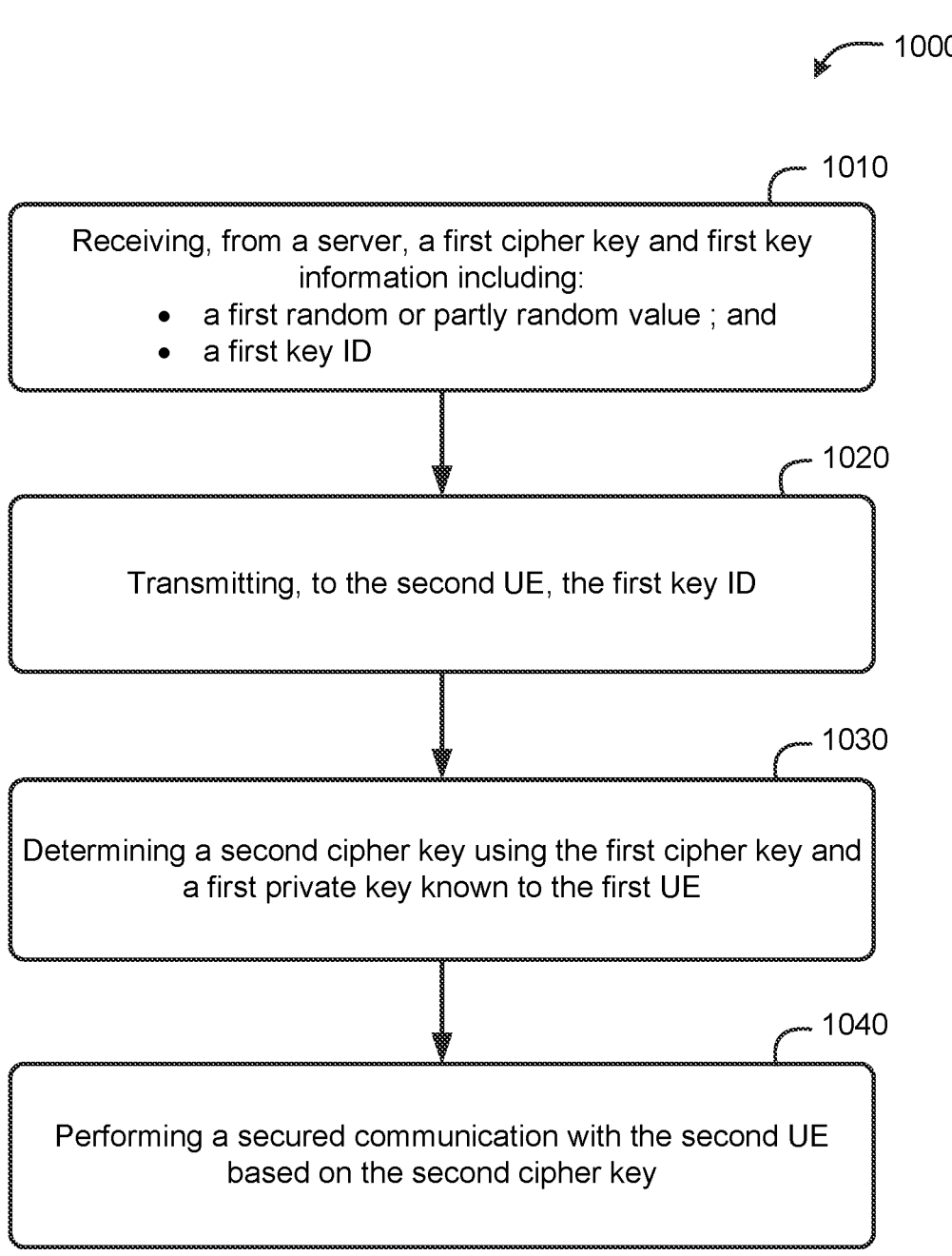
FIG. 10 is a flow diagram of a method of secure sidelink communication performed by a UE, according to an embodiment.

FIG. 10 is a flow diagram of a method 1000 of secure sidelink communication between a first UE (e.g., the type B UE with respect to the description of FIGS. 5 and 6) and a second UE (e.g., the type A UE with respect to the description of FIGS. 5 and 6) performed by a type B UE, according to an embodiment. In some embodiments, the type B UE may correspond to type B UE 520 in FIG. 5 and/or type B UE 620 in FIG. 6. Means/structure for performing the functionality illustrated in one or more of the blocks shown in FIG. 10 may be performed by hardware and/or software components of a UE, as described herein. Example components of a UE are illustrated in FIG. 12, which are described in more detail below.

At block 1010, the functionality comprises receiving, from a server (e.g., the server with respect to the description of FIGS. 5 and 6), a first cipher key (e.g., $K_3$* with respect to the description of FIGS. 5 and 6) and first key information including the random or partly random value and a key ID. In some embodiments, the first key information with respect to the description of FIGS. 5 and 6 may be received by the first UE. The key ID may correspond to $K_{1id}$ with respect to the description of FIGS. 5 and 6. For example, the server may assign $K_{1id}$ indicating $K_1$ and the server to $RV_1$. For example, $K_{1id}$ may include a pointer to or an indication of both $K_1$ and the server. In some embodiments, on the server, $K_{1id}$ may be stored for later use if the security of the type B UE has been detected as compromised. In some embodiments, the server may cipher $K_3$ using a private key $K_{ueB}$ known to the type B UE (e.g., the private key stored in the V2XSIM of the type B UE along with the global ID of the type B UE to generate $K_3$*. Additionally or alternatively, $K_{ueB}$ may also be some other data known to both the server and the type B UE. In some embodiments, the server and the type B UE may establish a secure connection, e.g. using a public-private key pair of the server, and transmit the first key information including $K_{1id}$, $RV_1$, and $K_3$* to the type B UE securely.

Means for performing functionality at block 1010 may comprise a bus 1205, processor(s) 1210, wireless communication interface 1230, memory 1260, and/or other components of a UE 1200, as illustrated in FIG. 12.

At block 1020, the functionality comprises transmitting, to the second UE, the first key information. In some embodiments, as noted above, the first key information here may include the random or partly random value $RV_1$ and $K_{1id}$.

Means for performing functionality at block 1020 may comprise a bus 1205, processor(s) 1210, wireless communication interface 1230, memory 1260, and/or other components of a UE 1200, as illustrated in FIG. 12.

At block 1030, the functionality comprises determining a second cipher key (e.g., a cipher key $K_3$ with respect to the description of FIGS. 5 and 6) using the first cipher key and a first private key (e.g., $K_{ueB}$ with respect to the description of FIGS. 5 and 6) known to the first UE.

Means for performing functionality at block 1030 may comprise a bus 1205, processor(s) 1210, wireless communication interface 1230, memory 1260, and/or other components of a UE 1200, as illustrated in FIG. 12.

At block 1040, the functionality comprises performing a secured communication with the second UE based on the second cipher key. For example, the first UE (e.g., type B UE) and the second UE (e.g., type A UE) establish a secure connection based on cipher key $K_3$ and may perform side-link communication using the security association between the first UE and the second UE. In some embodiments, a new cipher key for performing the sidelink communication in the secure mode (e.g., ciphering the sidelink positioning messages) may be determined based on $K_3$ (e.g., by ciphering $K_3$) and may be shared among the first UE and the second UE (e.g., determined by one of the first UE or the second UE and transmitted to the other the second UE or the first UE).

Means for performing functionality at block 1040 may comprise a bus 1205, processor(s) 1210, wireless communication interface 1230, memory 1260, and/or other components of a UE 1200, as illustrated in FIG. 12.

In some embodiments, the second cipher key is stored in a volatile random-access memory (RAM) of the first UE.

In some embodiments, the secured communication comprises a sidelink positioning with the second UE and method 1000 further comprises removing the second cipher key from the volatile RAM and obtaining a third cipher key (e.g., the new cipher key for performing the sidelink communication in the secure mode with respect to the description of FIGS. 5 and 6) determined based on the second cipher key for ciphering sidelink positioning messages for performing the sidelink positioning with the second UE.

In some embodiments, when method 1000 is performed among an association that includes no type A UE (e.g., with only type B UEs), as disclosed above, one of the type B UE may assume the role of a type A UE. Method 1000 may further comprises receiving, from the server, a fourth cipher key (e.g., another $K_1*$ with respect to the description of FIGS. 5 and 6), determining a third private key (e.g., a $K_1$ corresponding to the $K_1*$ with respect to the description of FIGS. 5 and 6) known to the server based on the fourth cipher key and a fourth private key known to the first UE (e.g., a $K_{ueA}$ corresponding to the $K_1*$ with respect to the description of FIGS. 5 and 6), receiving, from a third UE (e.g., another type B UE with respect to the description of FIGS. 5 and 6), second key information including: a second random or partly random value (e.g., another $RV_1$ with respect to the description of FIGS. 5 and 6) and a second key ID indicating: the third private key; and the server. Method 1000 may further comprises determining a fifth cipher key (e.g., a new $K_3$ with respect to the description of FIGS. 5 and 6) based on the third private key and the second random or partly random value included in the second key information and performing the secured communication with the third UE based on the fifth cipher key.

In some embodiments, when method 1000 is performed in the sessionless mode (e.g., where type A and type B UEs may broadcast sidelink positioning protocol messages to all nearby UEs), as disclosed above, method 1000 may further comprise broadcasting sidelink positioning messages based on the first private key, determining a fourth cipher key (e.g., a new k3 with respect to the description of FIGS. 5 and 6) using a second random or partly random value (e.g., a new $RV_1$ with respect to the description of FIGS. 5 and 6) and the first private key, ciphering the sidelink positioning messages based on the fourth cipher key, broadcasting the ciphered sidelink positioning messages, wherein a header of the ciphered sidelink positioning messages includes second key information including the second random partly random value and a second key ID. The second key ID indicates the first private key and the server.

In some embodiments, method 1000 further comprises recording an indication in a non-erasable memory responsive to detecting a non-allowed access.

FIG. 11 is a flow diagram of a method 1100 of secure sidelink communication between a first UE (e.g., the type B UE with respect to the description of FIGS. 5 and 6) and a second UE (e.g., the type A UE with respect to the description of FIGS. 5 and 6) performed by a type A UE, according to an embodiment. In some embodiments, the type A UE may correspond to type A UE 530 in FIG. 5 and/or type A UE 630 in FIG. 6. Means/structure for performing the functionality illustrated in one or more of the blocks shown in FIG. 11 may be performed by hardware and/or software components of a UE, as described herein. Example components of a UE are illustrated in FIG. 12, which are described in more detail below.

At block 1110, the functionality comprises receiving, from a server (e.g., the server with respect to the description of FIGS. 5 and 6), a first cipher key (e.g., $K_1*$ with respect to the description of FIGS. 5 and 6).

Means for performing functionality at block 1110 may comprise a bus 1205, processor(s) 1210, wireless communication interface 1230, memory 1260, and/or other components of a UE 1200, as illustrated in FIG. 12.

At block 1120, the functionality comprises determining a first private key (e.g., $K_1$ with respect to the description of FIGS. 5 and 6) known to the server based on the first cipher key and a second private key (e.g., $K_{ueA}$ with respect to the description of FIGS. 5 and 6) known to the second UE.

Means for performing functionality at block 1120 may comprise a bus 1205, processor(s) 1210, wireless communication interface 1230, memory 1260, and/or other components of a UE 1200, as illustrated in FIG. 12.

At block 1130, the functionality comprises receiving, from the first UE, first key information including: a first random or partly random value (e.g., $RV_1$ with respect to the description of FIGS. 5 and 6) and a first key ID (e.g., $K_{1id}$ with respect to the description of FIGS. 5 and 6).

Means for performing functionality at block 1130 may comprise a bus 1205, processor(s) 1210, wireless communication interface 1230, memory 1260, and/or other components of a UE 1200, as illustrated in FIG. 12.

At block 1140, the functionality comprises determining a second cipher key (e.g., a cipher key $K_3$ with respect to the description of FIGS. 5 and 6) based on the first private key and the first random or partly random value included in the first key information.

Means for performing functionality at block 1140 may comprise a bus 1205, processor(s) 1210, wireless communication interface 1230, memory 1260, and/or other components of a UE 1200, as illustrated in FIG. 12.

At block 1150, the functionality comprises performing the secured communication with the first UE based on the second cipher key. For example, the first UE (e.g., type B UE) and the second UE (e.g., type A UE) establish a secure connection based on cipher key $K_3$ and may perform sidelink communication using the security association between the first UE and the second UE. In some embodiments, a new cipher key for performing the sidelink communication in the secure mode (e.g., ciphering the sidelink positioning messages) may be determined based on $K_3$ (e.g., by ciphering $K_3$) and may be shared among the first UE and the second UE (e.g., determined by one of the first UE or the second UE and transmitted to the other the second UE or the first UE).

Means for performing functionality at block 1150 may comprise a bus 1205, processor(s) 1210, wireless communication interface 1230, memory 1260, and/or other components of a UE 1200, as illustrated in FIG. 12.

In some embodiments, the determined first private key is stored in a vehicle-to-everything (V2X) subscriber identity module (SIM) processor of the second UE.

In some embodiments, the first key ID indicates: the first private key (k1); and the server.

In some embodiments, the secured communication comprises a sidelink positioning with the first UE and method 1100 further comprises removing the second cipher key from the volatile RAM, and obtaining a third cipher key determined based on the second cipher key for ciphering sidelink positioning messages for the sidelink positioning with the second UE.

In some embodiments, when there is no first UE (e.g., a type B UE), one of the second UEs (e.g., the type A UEs) may assume the type B UE's role. For example, method 1100 may further comprise receiving, from the server, a fourth cipher key (e.g., a new $K_3$*) and second key information including a second random or partly random value and a second key ID indicating the third private key and the server. Method 1100 may further comprise transmitting, to a third UE, the second key ID, determining a fifth cipher key (e.g., a new $K_3$) based on the fourth cipher key and a fourth private key known to the second UE, and performing a secured communication with the third UE based on the fifth cipher key.

In some embodiments, when performing the sessionless mode, method 1100 may further comprise broadcasting sidelink positioning messages based on the first private key (e.g., $K_1$), determining a fourth cipher key (e.g., a new $K_3$) using a second random or partly random value and the first private key, and ciphering the sidelink positioning messages based on the fourth cipher key. Method 1100 may further comprise broadcasting the ciphered sidelink positioning messages, wherein a header of the ciphered sidelink positioning messages includes a second key information including: a second random partly random value; and a second key ID indicating the fourth private key; and the server.

In some embodiments, method 1100 may further comprise recording an indication in a non-erasable memory responsive to detecting a non-allowed access.

FIG. 12 is a block diagram of an embodiment of a UE 1200, which can be utilized as described herein (e.g., in association with the previously described figures) and may correspond to a UE 105 in 1 to 3, the UE 520 and UE 530 in FIG. 5, the UE 620 and UE 630 in FIG. 6, a UE 1 or UE 2 in FIGS. 7A, 7B and 8, or a UE 3 or UE r in FIG. 8. In some embodiments, for example, the UE 1200 may comprise, for example, a mobile (e.g., movable/portable) device (e.g., tablet, laptop, vehicle, etc.). It should be noted that FIG. 12 is meant only to provide a generalized illustration of various components, any or all of which may be utilized as appropriate.

The UE 1200 is shown to comprise hardware elements that can be electrically coupled via a bus 1205 (or may otherwise be in communication, as appropriate). The hardware elements may include a processor(s) 1210 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1210 may comprise one or more processing units, which may be housed in a single integrated circuit (IC) or multiple ICs. As shown in FIG. 12, some embodiments may have a separate DSP 1220, depending on desired functionality. Location determination and/or other determinations based on wireless communication may be provided in the processor(s) 1210 and/or wireless communication interface 1230 (discussed below). The UE 1200 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

The UE 1200 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1200 to communicate with other devices as described in the embodiments above. The wireless communication interface 1230 may permit data and signaling to be communicated (e.g., transmitted and received) with base stations of a network, for example, via eNBs, gNBs, ng-eNBs, access points, various base stations and/or other access node types, and/or other network components, computer systems, and/or any other electronic devices communicatively coupled with base stations, as described herein. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof. The antenna(s) 1232 may be capable of transmitting and receiving wireless signals using beams (e.g., Tx beams and Rx beams). Beam formation may be performed using digital and/or analog beam formation techniques, with respective digital and/or analog circuitry. The wireless communication interface 1230 may include such circuitry.

Depending on desired functionality, the wireless communication interface 1230 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1200 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA)

network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000®, wideband code division multiple access (WCDMA), and so on. CDMA2000® includes IS-95, IS-2000 and/or IS-856 standards. A TDMA network may implement global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from 3rd Generation Partnership Project (3GPP). CDMA2000® is described in documents from a consortium named "$3^{rd}$ Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1200 can further include sensor(s) 1240. Sensor(s) 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1200 may further comprise a sensing unit 1250. The sensing unit 1250 may comprise hardware and/or software components capable of transmitting and/or receiving RF signals (e.g., RS) to detect one or more targets in the manner described herein. The sensing unit 1250 may comprise a standalone component connected with a bus 1205, as illustrated, or may be incorporated into another component (e.g., the wireless indication interface 1230). Further, the sensing unit 1250 may be communicatively coupled with an antenna 1232, which it may share with the wireless communication interface 1230. Additionally or alternatively, the sensing unit 1250 may have its own antenna (not shown). In some embodiments, the sensing unit 1250 may be communicatively coupled with multiple antennas or an antenna array capable of sending and/or receiving RF signals via directional beams.

Embodiments of the UE 1200 may also include a Global Navigation Satellite System (GNSS) receiver 1280 capable of receiving signals 1284 from one or more GNSS satellites using an antenna 1282 (which could be the same as antenna 1232). Positioning based on GNSS signal measurement can be utilized to complement and/or incorporate the techniques described herein. The GNSS receiver 1280 can extract a position of the UE 1200, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1280 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 is illustrated in FIG. 12 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1210, DSP 1220, and/or a processor within the wireless communication interface 1230 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1210 or DSP 1220.

The UE 1200 may further include and/or be in communication with a memory 1260. The memory 1260 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the UE 1200 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the UE 1200 (and/or processor(s) 1210 or DSP 1220 within UE 1200). In some embodiments, then, such code and/or instructions can be used to configure and/or adapt a general-purpose computer (or other devices) to perform one or more operations in accordance with the described methods.

FIG. 13 is a block diagram of an embodiment of a computer system 1300, which may be used, in whole or in part, to provide the functions of one or more components and/or devices as described in the embodiments herein, including a server (e.g., sensing server/SMF, location server/LMF, etc.) in communication with one or more base stations and/or one or more sensing nodes to coordinate RF sensing as described in embodiments herein. This may include, for example, a computer server, personal computer, personal electronic device, or the like. The computer system 1300 may correspond to or support the server 150 in FIG. 1, the server 510 in FIG. 5, the server 610 in FIG. 6 or any of the servers referred to herein that can configure a UE with security related information (e.g. such as the security related information described in relation to FIGS. 7A, 7B and 8). It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner. In addition, it can be noted that components illustrated by FIG. 13 can be localized to a single device and/or distributed among various networked devices, which may be disposed at different geographical locations.

The computer system 1300 is shown comprising hardware elements that can be electrically coupled via a bus 1305 (or may otherwise be in communication, as appropriate). The hardware elements may include processor(s) 1310, which may comprise without limitation one or more general-purpose processors, one or more special-purpose processors (such as digital signal processing chips, graphics accelera-tion processors, and/or the like), and/or other processing structure, which can be configured to perform one or more of the methods described herein. The computer system 1300 also may comprise one or more input devices 1315, which may comprise without limitation a mouse, a keyboard, a camera, a microphone, and/or the like; and one or more output devices 1320, which may comprise without limitation a display device, a printer, and/or the like.

The computer system 1300 may further include (and/or be in communication with) one or more non-transitory storage devices 1325, which can comprise, without limitation, local and/or network accessible storage, and/or may comprise, without limitation, a disk drive, a drive array, an optical storage device, a solid-state storage device, such as a ran-dom-access memory (RAM) and/or read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1300 may also include a commu-nications subsystem 1330, which may comprise wireless communication technologies managed and controlled by a wireless communication interface 1333, as well as wired technologies (such as Ethernet, coaxial communications, universal serial bus (USB), and the like). The wireless communication interface 1333 may comprise one or more wireless transceivers that may send and receive wireless signals 1355 (e.g., signals according to 5G NR or LTE) via wireless antenna(s) 1350. Thus the communications subsys-tem 1330 may comprise a modem, a network card (wireless or wired), an infrared communication device, a wireless communication device, and/or a chipset, and/or the like, which may enable the computer system 1300 to communi-cate on any or all of the communication networks described herein to any device on the respective network, including a User Equipment (UE), base stations and/or other transmis-sion reception points (TRPs), and/or any other electronic devices described herein. Hence, the communications sub-system 1330 may be used to receive and send data as described in the embodiments herein.

In many embodiments, the computer system 1300 will further comprise a working memory 1335, which may comprise a RAM or ROM device, as described above. Software elements, shown as being located within the work-ing memory 1335, may comprise an operating system 1340, device drivers, executable libraries, and/or other code, such as one or more applications 1345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accor-dance with the described methods.

A set of these instructions and/or code might be stored on a non-transitory computer-readable storage medium, such as the storage device(s) 1325 described above. In some cases, the storage medium might be incorporated within a com-puter system, such as computer system 1300. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation n programs, compression/decompression utilities, etc.), then takes the form of executable code.

Figure 14:
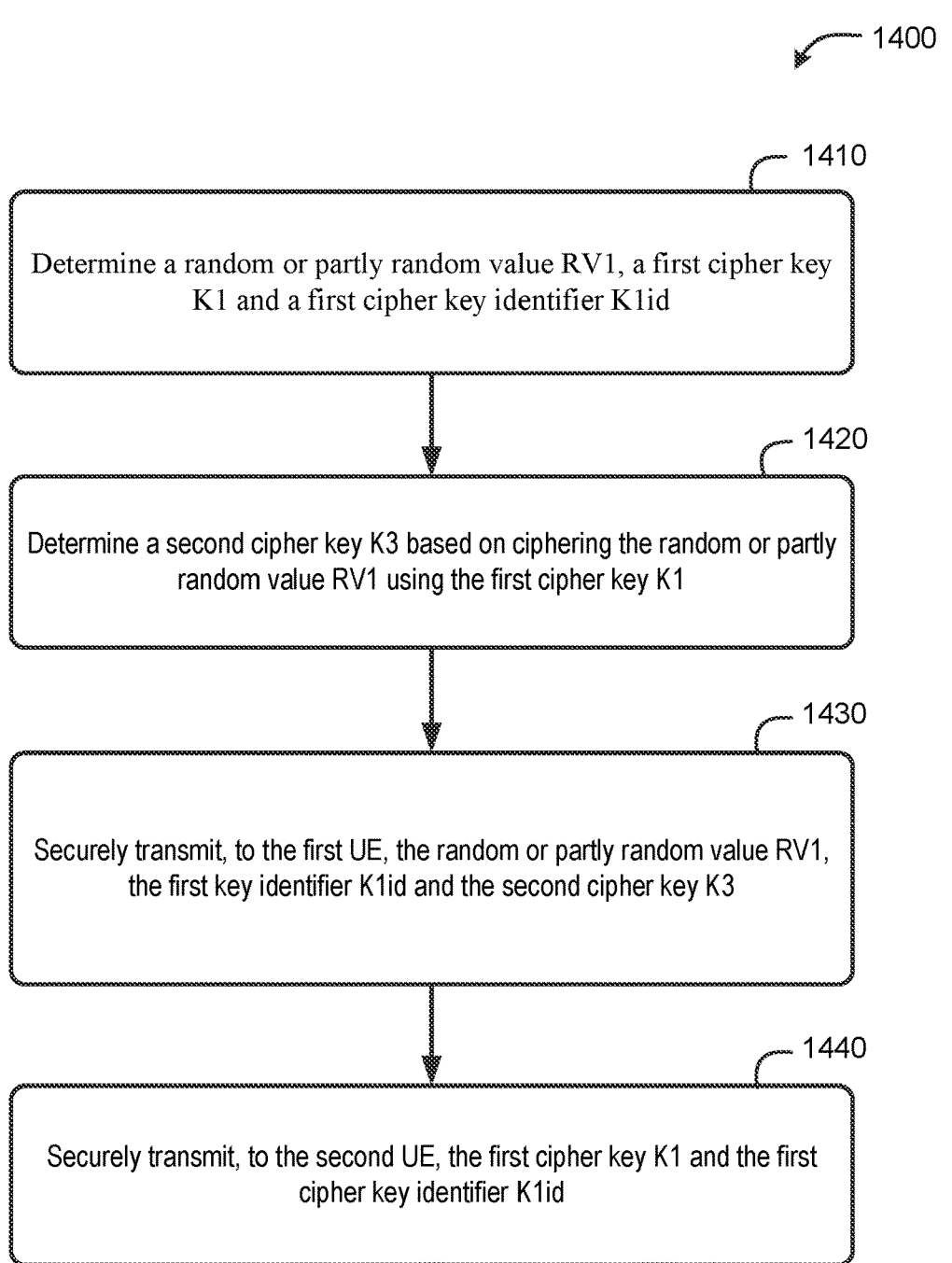
FIG. 14 is a flow diagram of a method of enabling secure sidelink communication between a first UE and a second UE, performed by a server, according to an embodiment.

FIG. 14 is a flow diagram of a method 1400 of enabling secure sidelink communication between a first user equip-ment (UE) and a second UE (e.g. UEs 105), performed by a server (e.g. a server 150), according to an embodiment. Means/structure for performing the functionality illustrated in one or more of the blocks shown in FIG. 14 may be performed by hardware and/or software components of a computer system, as described herein. Example components of a computer system are illustrated in FIG. 13, which are described in more detail above.

At block 1410, the functionality comprises determining a random or partly random value RV1, a first cipher key K1 and a first cipher key identifier K1id, e.g. as described for FIG. 5.

Means for performing functionality at block 1410 may comprise a bus 1305, processor(s) 1310, communications subsystem 1330, memory 1335, and/or other components of computer system 1300, as illustrated in FIG. 13.

At block 1420, the functionality comprises determining a second cipher key K3 based on ciphering the random or partly random value RV1 using the first cipher key K1, e.g. as described for FIG. 5.

Means for performing functionality at block 1420 may comprise a bus 1305, processor(s) 1310, communications subsystem 1330, memory 1335, and/or other components of computer system 1300, as illustrated in FIG. 13.

At block 1430, the functionality comprises securely trans-mitting, to the first UE, the random or partly random value RV1, the first key identifier K1id and the second cipher key K3, e.g. as described for FIG. 5 and for 650 in FIG. 6.

Means for performing functionality at block 1430 may comprise a bus 1305, processor(s) 1310, communications subsystem 1330, memory 1335, and/or other components of computer system 1300, as illustrated in FIG. 13.

At block 1440, the functionality comprises securely trans-mitting, to the second UE, the first cipher key K1 and the first cipher key identifier K1id, e.g. as described for FIG. 5 and for 660 in FIG. 6.

Means for performing functionality at block 1440 may comprise a bus 1305, processor(s) 1310, communications subsystem 1330, memory 1335, and/or other components of computer system 1300, as illustrated in FIG. 13.

In some embodiments, determining the second cipher key K3 based on ciphering the random or partly random value RV1 using the first cipher key K1 comprises: determining an intermediate cipher key K2 based on ciphering the random or partly random value RV1 using the first cipher key K1; and determining the second cipher K3 based on ciphering the random or partly random value RV1 using the intermediate cipher key K2, e.g. as described for FIG. 5.

In some embodiments, securely transmitting, to the first UE, the second cipher key K3 comprises: determining a key K3* based on ciphering the second cipher key K3 using a private cipher key Kue1 of the first UE; and transmitting the key K3* to the first UE, e.g. as described for FIG. 5.

In some embodiments, securely transmitting, to the second UE, the first cipher key K1 comprises: determining a key K1* based on ciphering the first cipher key K1 using a private cipher key Kue2 of the second UE; and transmitting the key K1* to the second UE, e.g. as described for FIG. 5.

In some embodiments, the second cipher key is determined based on a 128-bit or a 256-bit advanced encryption standard (AES) algorithm.

FIG. 15 is a flow diagram of a method 1500 of secured communication between a first user equipment (UE) and a second UE (e.g. UEs 105), performed by the first UE, according to an embodiment. Means/structure for performing the functionality illustrated in one or more of the blocks shown in FIG. 15 may be performed by hardware and/or software components of a UE, as described herein. Example components of a UE are illustrated in FIG. 12, which are described in more detail above.

At block 1510, the functionality comprises securely receiving, from a server (e.g. a server 150), a random or partly random value RV1, a first cipher key identifier K1id and a second cipher key K3, e.g. as described for FIG. 5 and for 650 in FIG. 6.

Means for performing functionality at block 1510 may comprise a bus 1205, processor(s) 1210, wireless communication interface 1230, memory 1260, and/or other components of a UE 1200, as illustrated in FIG. 12.

At block 1520, the functionality comprises transmitting in plain text, to the second UE, the random or partly random value RV1 and the first cipher key identifier K1id, wherein the random or partly random value RV1 and the first cipher key identifier K1id enable the second UE to determine the second cipher key K3, e.g. as described for FIG. 5 and for 670 in FIG. 6.

Means for performing functionality at block 1520 may comprise a bus 1205, processor(s) 1210, wireless communication interface 1230, memory 1260, and/or other components of a UE 1200, as illustrated in FIG. 12.

At block 1530, the functionality comprises performing a secured communication with the second UE based on the second cipher key K3, e.g. as described for FIG. 5 and for 695 in FIG. 6.

Means for performing functionality at block 1530 may comprise a bus 1205, processor(s) 1210, wireless communication interface 1230, memory 1260, and/or other components of a UE 1200, as illustrated in FIG. 12.

In some embodiments, securely receiving the second cipher key K3 from the server comprises: receiving a key K3* from the server; and determining the second cipher key K3 based on deciphering the key K3* using a private cipher key Kue1 of the first UE, e.g. as described for FIG. 5 and for 685 in FIG. 6.

FIG. 16 is a flow diagram of a method 1600 of secured communication between a first user equipment (UE) and a second UE (e.g. UEs 105), performed by the second UE, according to an embodiment. Means/structure for performing the functionality illustrated in one or more of the blocks shown in FIG. 16 may be performed by hardware and/or software components of a UE, as described herein. Example components of a UE are illustrated in FIG. 12, which are described in more detail above.

At block 1610, the functionality comprises securely receiving, from a server (e.g. server 150), a first cipher key K1 and a first cipher key identifier K1id, e.g. as described for FIG. 5 and for 660 in FIG. 6.

Means for performing functionality at block 1610 may comprise a bus 1205, processor(s) 1210, wireless communication interface 1230, memory 1260, and/or other components of a UE 1200, as illustrated in FIG. 12.

At block 1620, the functionality comprises receiving in plain text, from the first UE, a random or partly random value RV1 and the first cipher key identifier K1id, e.g. as described for FIG. 5 and for 670 in FIG. 6.

Means for performing functionality at block 1620 may comprise a bus 1205, processor(s) 1210, wireless communication interface 1230, memory 1260, and/or other components of a UE 1200, as illustrated in FIG. 12.

At block 1630, the functionality comprises identifying the first cipher key K1 based on the first cipher key identifier K1id, e.g. as described for FIG. 5 and for 675 in FIG. 6.

Means for performing functionality at block 1630 may comprise a bus 1205, processor(s) 1210, wireless communication interface 1230, memory 1260, and/or other components of a UE 1200, as illustrated in FIG. 12.

At block 1640, the functionality comprises determining a second cipher key K3 by ciphering the random or partly random value RV1 using the first cipher key K1, e.g. as described for FIG. 5 and for 675 in FIG. 6.

Means for performing functionality at block 1640 may comprise a bus 1205, processor(s) 1210, wireless communication interface 1230, memory 1260, and/or other components of a UE 1200, as illustrated in FIG. 12.

At block 1650, the functionality comprises performing a secured communication with the first UE based on the second cipher key K3, e.g. as described for FIG. 5 and for 695 in FIG. 6.

Means for performing functionality at block 1650 may comprise a bus 1205, processor(s) 1210, wireless communication interface 1230, memory 1260, and/or other components of a UE 1200, as illustrated in FIG. 12.

In some embodiments, securely receiving the first cipher key K1 from the server comprises: receiving a key K1* from the server; and determining the first cipher key K1 based on deciphering the key K1* using a private cipher key Kue2 of the second UE, e.g. as described for FIG. 5 and for 675 in FIG. 6.

In some embodiments, determining the second cipher key K3 based on ciphering the random or partly random value RV1 using the first cipher key K1 comprises: determining an intermediate cipher key K2 based on ciphering the random or partly random value RV1 using the first cipher key K1; and determining the second cipher K3 based on ciphering the random or partly random value RV1 using the intermediate cipher key K2, e.g. as described for FIG. 5.

FIG. 17 is a flow diagram of a method 1700 of enabling secure sidelink communication between a group of user equipments (e.g. UEs 105), performed by a server (e.g. a server 150), according to an embodiment. Means/structure for performing the functionality illustrated in one or more of the blocks shown in FIG. 17 may be performed by hardware and/or software components of a computer system, as described herein. Example components of a computer system are illustrated in FIG. 13, which are described in more detail above.

At block 1710, the functionality comprises determining a set of private cipher keys PK and a set of corresponding cipher key IDs Kid, e.g. as described for the method of derived cipher keys above.

Means for performing functionality at block 1710 may comprise a bus 1305, processor(s) 1310, communications subsystem 1330, memory 1335, and/or other components of computer system 1300, as illustrated in FIG. 13.

At block 1720, the functionality comprises determining a random or partly random value RV for each UE of the group of UEs, e.g. as described for the method of derived cipher keys above.

Means for performing functionality at block 1720 may comprise a bus 1305, processor(s) 1310, communications subsystem 1330, memory 1335, and/or other components of computer system 1300, as illustrated in FIG. 13.

At block 1730, the functionality comprises determining a set of derived cipher keys DK for each UE of the group of UEs based on the random or partly random value RV for the each UE and the set of private cipher keys PK, e.g. as described for the method of derived cipher keys above.

Means for performing functionality at block 1730 may comprise a bus 1305, processor(s) 1310, communications subsystem 1330, memory 1335, and/or other components of computer system 1300, as illustrated in FIG. 13.

At block 1740, the functionality comprises securely configuring each UE of the group of UEs with the random or partly random value RV for the each UE, the set of derived cipher keys DK for the each UE, one private cipher key of the set of private cipher keys PK and one cipher key ID of the set of corresponding cipher key IDs Kid, wherein the one cipher key ID corresponds to the one private cipher key, e.g. as described for the method of derived cipher keys above.

Means for performing functionality at block 1740 may comprise a bus 1305, processor(s) 1310, communications subsystem 1330, memory 1335, and/or other components of computer system 1300, as illustrated in FIG. 13.

In some embodiments, securely configuring each UE of the group of UEs with the random or partly random value RV for the each UE, the set of derived cipher keys DK for the each UE, the one private cipher key of the set of private cipher keys PK and the one cipher key ID of the set of corresponding cipher key IDs Kid, comprises configuring the each UE of the group of UEs using a secure connection between the each UE and the server, where the secure connection is based on a public key-private key pair of the server, e.g. as described for the method of derived cipher keys above.

In some embodiments, determining the set of derived cipher keys DK for each UE of the group of UEs based on the random or partly random value RV for the each UE and the set of private cipher keys PK comprises: determining each derived cipher key of the set of derived cipher keys DK based on ciphering the random or partly random value RV using a different private cipher key in the set of private cipher keys PK, wherein the set of derived cipher keys DK and the set of private cipher keys PK contain equal numbers of cipher keys, wherein each private cipher key in the set of private cipher keys PK is used to determine one derived cipher key in the set of derived cipher keys DK, e.g. as described for the method of derived cipher keys above.

In some embodiments, method 1700 further comprises periodically determining a new random or partly random value RV and a new set of derived cipher keys DK for each UE of the group of UEs; and securely configuring each UE of the group of UEs with the new random or partly random value RV and the new set of derived cipher keys DK for the each UE, e.g. as described for the method of derived cipher keys above.

FIG. 18 is a flow diagram of a method 1800 of supporting secure sidelink communication between a group of user equipments (e.g. UEs 105), performed by a first UE of the group of UEs, according to an embodiment. Means/structure for performing the functionality illustrated in one or more of the blocks shown in FIG. 18 may be performed by hardware and/or software components of a UE, as described herein. Example components of a UE are illustrated in FIG. 12, which are described in more detail above.

At block 1810, the functionality comprises securely receiving, from a server (e.g. a server 150), a first random or partly random value RV1, a first set of derived cipher keys DK1, a first private cipher key K1 of a set of private cipher keys PK and a first cipher key ID K1id, wherein the first cipher key ID K1id identifies the first private cipher key K1, e.g. as described for the method of derived cipher keys above.

Means for performing functionality at block 1810 may comprise a bus 1205, processor(s) 1210, wireless communication interface 1230, memory 1260, and/or other components of a UE 1200, as illustrated in FIG. 12.

At block 1820, the functionality comprises sending in plain text, to a second UE of the group of UEs, the first random or partly random value RV1 and the first cipher key ID K1id, e.g. as described for stage 1 in FIG. 7A and stage 1 in FIG. 7B.

Means for performing functionality at block 1820 may comprise a bus 1205, processor(s) 1210, wireless communication interface 1230, memory 1260, and/or other components of a UE 1200, as illustrated in FIG. 12.

At block 1830, the functionality comprises receiving in plain text, from the second UE of the group of UEs, a second random or partly random value RV2 and a second cipher key ID K2id, wherein the second cipher key ID K2id identifies a second private cipher key K2 of the set of private cipher keys PK configured in the second UE, e.g. as described for stage 1 in FIG. 7A and stage 2 in FIG. 7B.

Means for performing functionality at block 1830 may comprise a bus 1205, processor(s) 1210, wireless communication interface 1230, memory 1260, and/or other components of a UE 1200, as illustrated in FIG. 12.

At block 1840, the functionality comprises determining at least one common cipher key based on the first set of derived cipher keys DK1, the first private cipher key K1, the second random or partly random value RV2 and the second cipher key ID K2id, e.g. as described for stages 5 and 6 in FIG. 7A and stages 3 and 5 in FIG. 7B.

Means for performing functionality at block 1840 may comprise a bus 1205, processor(s) 1210, wireless communication interface 1230, memory 1260, and/or other components of a UE 1200, as illustrated in FIG. 12.

At block 1850, the functionality comprises supporting secure sidelink communication with the second UE based on the at least one common cipher key, e.g. as described for stage 7 in FIG. 7A and stage 7 in FIG. 7B.

Means for performing functionality at block 1850 may comprise a bus 1205, processor(s) 1210, wireless communication interface 1230, memory 1260, and/or other components of a UE 1200, as illustrated in FIG. 12.

In some embodiments, securely receiving, from the server, the first random or partly random value RV1, the first set of derived cipher keys DK1, the first private cipher key K1 and the first cipher key ID K1id comprises receiving the first random or partly random value RV1, the first set of derived cipher keys DK1, the first private cipher key K1 and the first cipher key ID K1id using a secure connection between the first UE and the server, the secure connection based on a public key-private key pair of the server, e.g. as described for the method of derived cipher keys above.

In some embodiments, each derived cipher key DKm in the first set of derived cipher keys DK1 corresponds to a separate private cipher key PKm in the set of private cipher keys PK, wherein the each derived cipher key DKm comprises a ciphering of the first random or partly random value RV1 using the corresponding separate private cipher key PKm in the set of private cipher keys PK, wherein the first set of derived cipher keys DK1 and the set of private cipher keys PK contain equal numbers of cipher keys, wherein each private cipher key in the set of private cipher keys PK is used to determine one derived cipher key in the set of derived cipher keys DK, e.g. as described for the method of derived cipher keys above.

In some embodiments, determining the at least one common cipher key based on the first set of derived cipher keys DK1, the first private cipher key K1, the second random or partly random value RV2 and the second cipher key ID K2id comprises: identifying a first derived cipher key in the first set of derived cipher keys DK1, wherein the first derived cipher key corresponds to a second private cipher key K2 in the set of private cipher keys PK, wherein the second private cipher key K2 is identified by the second cipher key ID K2id; determining a second derived cipher key based on ciphering the second random or partly random value RV2 using the first private cipher key K1; and determining the at least one common cipher key based on the first derived cipher key and the second derived cipher key, e.g. as described for stages 5 and 6 in FIG. 7A and stages 3 and 5 in FIG. 7B.

In some embodiments, determining the at least one common cipher key based on the first derived cipher key and the second derived cipher key comprises: sending a first key component to the second UE, the first key component ciphered using the first derived cipher key or the second derived key; receiving a second key component from the second UE, the second key component ciphered using the other of the first derived cipher key or the second derived key; deciphering the second key component using the other of the first derived cipher key or the second derived key; and determining the at least one common cipher key based on the first key component and the second key component, e.g. as described for stages 2, 4, 5 and 6 in FIG. 7A.

In some embodiments, method 1800 further comprises sending in plain text, to each UE of the group of UEs excluding the first UE and the second UE, the first random or partly random value RV1 and the first cipher key ID K1id; receiving in plain text, from the each UE of the group of UEs, a unique random or partly random value RV and a cipher key ID Kid, wherein the cipher key ID Kid identifies a private cipher key K of the set of private cipher keys PK configured in the each UE; determining at least one common cipher key for the each UE based on the first set of derived cipher keys DK1, the first private cipher key K1, the random or partly random value RV and the cipher key ID Kid; sending at least one common group cipher key to the each UE, the at least one common group cipher key ciphered using the at least one common cipher key for the each UE; and supporting secure sidelink communication for the group of UEs based on the at least one common group cipher key, e.g. as described for FIG. 8.

In some embodiments, supporting secure sidelink communication for the group of UEs based on at least one common group cipher key comprises exchanging messages for a sidelink positioning protocol (SLPP) with others of the group of UEs, wherein the SLPP messages are ciphered or integrity protected or both using the at least one common group cipher key, e.g. as described for stage 5 in FIG. 8.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. An example method of enabling secure sidelink communication between a group of user equipments (UEs), performed by a server, the method comprising: determining a set of private cipher keys PK and a set of corresponding cipher key IDs Kid; determining a random or partly random value RV for each UE of the group of UEs; determining a set of derived cipher keys DK for each UE of the group of UEs based on the random or partly random value RV for the each UE and the set of private cipher keys PK; and securely configuring each UE of the group of UEs with the random or partly random value RV for the each UE, the set of derived cipher keys DK for the each UE, one private cipher key of the set of private cipher keys PK and one cipher key ID of the set of corresponding cipher key IDs Kid, wherein the one cipher key ID corresponds to the one private cipher key.

Clause 2. The method of the clause 1, wherein securely configuring each UE of the group of UEs with the random or partly random value RV for the each UE, the set of derived cipher keys DK for the each UE, the one private cipher key of the set of private cipher keys PK and the one cipher key ID of the set of corresponding cipher key IDs Kid, comprises configuring the each UE of the group of UEs using a secure connection between the each UE and the server, the secure connection based on a public key-private key pair of the server.

Clause 3. The method of any of clause 1 or 2, wherein determining the set of derived cipher keys DK for each UE of the group of UEs based on the random or partly random value RV for the each UE and the set of private cipher keys PK comprises: determining each derived cipher key of the set of derived cipher keys DK based on ciphering the random or partly random value RV using a different private cipher key in the set of private cipher keys PK, wherein the set of derived cipher keys DK and the set of private cipher keys PK contain equal numbers of cipher keys, wherein each private cipher key in the set of private cipher keys PK is used to determine one derived cipher key in the set of derived cipher keys DK.

Clause 4. The method of any of clauses 1-3, further comprising: periodically determining a new random or partly random value RV and a new set of derived cipher keys DK for each UE of the group of UEs; and securely configuring each UE of the group of UEs with the new random or partly random value RV and the new set of derived cipher keys DK for the each UE.

Clause 5. An example method of supporting secure sidelink communication between a group of user equipments (UEs), performed by a first UE of the group of UEs, the method comprising: securely receiving, from a server, a first random or partly random value RV1, a first set of derived cipher keys DK1, a first private cipher key K1 of a set of private cipher keys PK and a first cipher key ID K1id, wherein the first cipher key ID K1id identifies the first private cipher key K1; sending in plain text, to a second UE of the group of UEs, the first random or partly random value RV1 and the first cipher key ID K1id; receiving in plain text, from the second UE of the group of UEs, a second random or partly random value RV2 and a second cipher key ID K2id, wherein the second cipher key ID K2id identifies a second private cipher key K2 of the set of private cipher keys PK configured in the second UE; determining at least one common cipher key based on the first set of derived cipher keys DK1, the first private cipher key K1, the second random or partly random value RV2 and the second cipher key ID K2id; and supporting secure sidelink communication with the second UE based on the at least one common cipher key.

Clause 6. The method of clause 5, wherein securely receiving, from the server, the first random or partly random value RV1, the first set of derived cipher keys DK1, the first private cipher key K1 and the first cipher key ID K1id comprises receiving the first random or partly random value RV1, the first set of derived cipher keys DK1, the first private cipher key K1 and the first cipher key ID K1id using a secure connection between the first UE and the server, the secure connection based on a public key-private key pair of the server.

Clause 7. The method of any of clause 5 or 6, wherein each derived cipher key DKm in the first set of derived cipher keys DK1 corresponds to a separate private cipher key PKm in the set of private cipher keys PK, wherein the each derived cipher key DKm comprises a ciphering of the first random or partly random value RV1 using the corresponding separate private cipher key PKm in the set of private cipher keys PK, wherein the first set of derived cipher keys DK1 and the set of private cipher keys PK contain equal numbers of cipher keys, wherein each private cipher key in the set of private cipher keys PK is used to determine one derived cipher key in the set of derived cipher keys DK.

Clause 8. The method of any of clauses 5-7, wherein determining the at least one common cipher key based on the first set of derived cipher keys DK1, the first private cipher key K1, the second random or partly random value RV2 and the second cipher key ID K2id comprises: identifying a first derived cipher key in the first set of derived cipher keys DK1, wherein the first derived cipher key corresponds to a second private cipher key K2 in the set of private cipher keys PK, wherein the second private cipher key K2 is identified by the second cipher key ID K2id; determining a second derived cipher key based on ciphering the second random or partly random value RV2 using the first private cipher key K1; and determining the at least one common cipher key based on the first derived cipher key and the second derived cipher key.

Clause 9. The method of any of clauses 5-8, wherein determining the at least one common cipher key based on the first derived cipher key and the second derived cipher key comprises: sending a first key component to the second UE, the first key component ciphered using the first derived cipher key or the second derived key; receiving a second key component from the second UE, the second key component ciphered using the other of the first derived cipher key or the second derived key; deciphering the second key component using the other of the first derived cipher key or the second derived key; and determining the at least one common cipher key based on the first key component and the second key component.

Clause 10. The method of any of clauses 5-9, further comprising: sending in plain text, to each UE of the group of UEs excluding the first UE and the second UE, the first random or partly random value RV1 and the first cipher key ID K1id; receiving in plain text, from the each UE of the group of UEs, a unique random or partly random value RV and a cipher key ID Kid, wherein the cipher key ID Kid identifies a private cipher key K of the set of private cipher keys PK configured in the each UE; determining at least one common cipher key for the each UE based on the first set of derived cipher keys DK1, the first private cipher key K1, the random or partly random value R and the cipher key ID Kid; sending at least one common group cipher key to the each UE, the at least one common group cipher key ciphered using the at least one common cipher key for the each UE; and supporting secure sidelink communication for the group of UEs based on the at least one common group cipher key.

Clause 11. The method of any of clauses 5-10, wherein supporting secure sidelink communication for the group of UEs based on at least one common group cipher key comprises exchanging messages for a sidelink positioning protocol (SLPP) with others of the group of UEs, wherein the SLPP messages are ciphered or integrity protected or both using the at least one common group cipher key.

Clause 12. An example apparatus for enabling secure sidelink communication between a group of user equipments (UEs), the apparatus comprising: means for determining a set of private cipher keys PK and a set of corresponding cipher key IDs Kid; means for determining a random or partly random value RV for each UE of the group of UEs; means for determining a set of derived cipher keys DK for each UE of the group of UEs based on the random or partly random value RV for the each UE and the set of private cipher keys PK; and means for securely configuring each UE of the group of UEs with the random or partly random value RV for the each UE, the set of derived cipher keys DK for the each UE, one private cipher key of the set of private cipher keys PK and one cipher key ID of the set of corresponding cipher key IDs Kid, wherein the one cipher key ID corresponds to the one private cipher key.

Clause 13. The apparatus of the clause 12, wherein securely configuring each UE of the group of UEs with the random or partly random value RV for the each UE, the set of derived cipher keys DK for the each UE, the one private cipher key of the set of private cipher keys PK and the one cipher key ID of the set of corresponding cipher key IDs Kid, comprises configuring the each UE of the group of UEs using a secure connection between the each UE and the server, the secure connection based on a public key-private key pair of the server.

Clause 14. The apparatus of any of clause 12 or 13, wherein determining the set of derived cipher keys DK for each UE of the group of UEs based on the random or partly random value RV for the each UE and the set of private cipher keys PK comprises: determining each derived cipher key of the set of derived cipher keys DK based on ciphering the random or partly random value RV using a different private cipher key in the set of private cipher keys PK, wherein the set of derived cipher keys DK and the set of private cipher keys PK contain equal numbers of cipher keys, wherein each private cipher key in the set of private cipher keys PK is used to determine one derived cipher key in the set of derived cipher keys DK.

Clause 15. The apparatus of any of clauses 12-14, further comprising: means for periodically determining a new random or partly random value RV and a new set of derived cipher keys DK for each UE of the group of UEs; and means for securely configuring each UE of the group of UEs with the new random or partly random value RV and the new set of derived cipher keys DK for the each UE.

Clause 16. An example apparatus for supporting secure sidelink communication between a group of user equipments (UEs), performed by a first UE of the group of UEs, the apparatus comprising: means for securely receiving, from a server, a first random or partly random value RV1, a first set of derived cipher keys DK1, a first private cipher key K1 of a set of private cipher keys PK and a first cipher key ID K1id, wherein the first cipher key ID K1id identifies the first private cipher key K1; means for sending in plain text, to a second UE of the group of UEs, the first random or partly random value RV1 and the first cipher key ID K1id; means for receiving in plain text, from the second UE of the group of UEs, a second random or partly random value RV2 and a second cipher key ID K2id, wherein the second cipher key ID K2id identifies a second private cipher key K2 of the set of private cipher keys PK configured in the second UE; means for determining at least one common cipher key based on the first set of derived cipher keys DK1, the first private cipher key K1, the second random or partly random value RV2 and the second cipher key ID K2id; and means for supporting secure sidelink communication with the second UE based on the at least one common cipher key.

Clause 17. The apparatus of clause 16, wherein securely receiving, from the server, the first random or partly random value RV1, the first set of derived cipher keys DK1, the first private cipher key K1 and the first cipher key ID K1id comprises receiving the first random or partly random value RV1, the first set of derived cipher keys DK1, the first private cipher key K1 and the first cipher key ID K1id using a secure connection between the first UE and the server, the secure connection based on a public key-private key pair of the server.

Clause 18. The apparatus of any of clause 16 or 17, wherein each derived cipher key DKm in the first set of derived cipher keys DK1 corresponds to a separate private cipher key PKm in the set of private cipher keys PK, wherein the each derived cipher key DKm comprises a ciphering of the first random or partly random value RV1 using the corresponding separate private cipher key PKm in the set of private cipher keys PK, wherein the first set of derived cipher keys DK1 and the set of private cipher keys PK contain equal numbers of cipher keys, wherein each private cipher key in the set of private cipher keys PK is used to determine one derived cipher key in the set of derived cipher keys DK.

Clause 19. The apparatus of any of clauses 16-18, wherein determining the at least one common cipher key based on the first set of derived cipher keys DK1, the first private cipher key K1, the second random or partly random value RV2 and the second cipher key ID K2id comprises: identifying a first derived cipher key in the first set of derived cipher keys DK1, wherein the first derived cipher key corresponds to a second private cipher key K2 in the set of private cipher keys PK, wherein the second private cipher key K2 is identified by the second cipher key ID K2id; determining a second derived cipher key based on ciphering the second random or partly random value RV2 using the first private cipher key K1; and determining the at least one common cipher key based on the first derived cipher key and the second derived cipher key.

Clause 20. The apparatus of any of clauses 16-19, wherein determining the at least one common cipher key based on the first derived cipher key and the second derived cipher key comprises: sending a first key component to the second UE, the first key component ciphered using the first derived cipher key or the second derived key; receiving a second key component from the second UE, the second key component ciphered using the other of the first derived cipher key or the second derived key; deciphering the second key component using the other of the first derived cipher key or the second derived key; and determining the at least one common cipher key based on the first key component and the second key component.

Clause 21. The apparatus of any of clauses 16-20, further comprising: means for sending in plain text, to each UE of the group of UEs excluding the first UE and the second UE, the first random or partly random value RV1 and the first cipher key ID K1id; means for receiving in plain text, from the each UE of the group of UEs, a unique random or partly random value RV and a cipher key ID Kid, wherein the cipher key ID Kid identifies a private cipher key K of the set of private cipher keys PK configured in the each UE; means for determining at least one common cipher key for the each UE based on the first set of derived cipher keys DK1, the first private cipher key K1, the random or partly random value R and the cipher key ID Kid; means for sending at least one common group cipher key to the each UE, the at least one common group cipher key ciphered using the at least one common cipher key for the each UE; and means for supporting secure sidelink communication for the group of UEs based on the at least one common group cipher key.

Clause 22. The apparatus of any of clauses 16-21, wherein supporting secure sidelink communication for the group of UEs based on at least one common group cipher key comprises exchanging messages for a sidelink positioning protocol (SLPP) with others of the group of UEs, wherein the SLPP messages are ciphered or integrity protected or both using the at least one common group cipher key.

What is claimed is:

1. A method of enabling secure sidelink communication between a group of user equipments (UEs), performed by a server, the method comprising:
   determining a set of private cipher keys PK and a set of corresponding cipher key IDs KID;
   determining a random or partly random value RV for each UE of the group of UEs;
   determining a set of derived cipher keys DK for each UE of the group of UEs based on the random or partly random value RV for the each UE and the set of private cipher keys PK, wherein determining the set of derived cipher keys DK for each UE of the group of UEs based on the random or partly random value RV for the each UE and the set of private cipher keys PK comprises:
   determining each derived cipher key of the set of derived cipher keys DK based on ciphering the random or partly random value RV using a different private cipher key in the set of private cipher keys PK, wherein the set of derived cipher keys DK and the set of private cipher keys PK contain equal numbers of cipher keys, wherein each private cipher key in the set of private cipher keys PK is used to determine one derived cipher key in the set of derived cipher keys DK; and
   securely configuring each UE of the group of UEs with the random or partly random value RV for the each UE, the set of derived cipher keys DK for the each UE, one private cipher key of the set of private cipher keys PK and one cipher key ID of the set of corresponding cipher key IDs KID, wherein the one cipher key ID corresponds to the one private cipher key.

2. The method of claim 1, further comprising:
   periodically determining a new random or partly random value RV and a new set of derived cipher keys DK for each UE of the group of UEs; and
   securely configuring each UE of the group of UEs with the new random or partly random value RV and the new set of derived cipher keys DK for the each UE.

3. A method of enabling secure sidelink communication between a group of user equipments (UEs), performed by a server, the method comprising:
   determining a set of private cipher keys PK and a set of corresponding cipher key IDs KID;
   determining a random or partly random value RV for each UE of the group of UEs;
   determining a set of derived cipher keys DK for each UE of the group of UEs based on the random or partly random value RV for the each UE and the set of private cipher keys PK; and
   securely configuring each UE of the group of UEs with the random or partly random value RV for the each UE, the set of derived cipher keys DK for the each UE, one private cipher key of the set of private cipher keys PK and one cipher key ID of the set of corresponding cipher key IDs KID, wherein the one cipher key ID corresponds to the one private cipher key,
   wherein securely configuring each UE of the group of UEs with the random or partly random value RV for the each UE, the set of derived cipher keys DK for the each UE, the one private cipher key of the set of private cipher keys PK and the one cipher key ID of the set of corresponding cipher key IDs KID, comprises configuring the each UE of the group of UEs using a secure connection between the each UE and the server, the secure connection based on a public key-private key pair of the server.

4. A method of supporting secure sidelink communication between a group of user equipments (UEs), performed by a first UE of the group of UEs, the method comprising:
   securely receiving, from a server, a first random or partly random value RV1, a first set of derived cipher keys DK1, a first private cipher key K1 of a set of private cipher keys PK and a first cipher key ID K1ID, wherein the first cipher key ID K1ID identifies the first private cipher key K1;
   sending in plain text, to a second UE of the group of UEs, the first random or partly random value RV1 and the first cipher key ID K1ID;
   receiving in plain text, from the second UE of the group of UEs, a second random or partly random value RV2 and a second cipher key ID K2ID, wherein the second cipher key ID K2ID identifies a second private cipher key K2 of the set of private cipher keys PK configured in the second UE;
   determining at least one common cipher key based on the first set of derived cipher keys DK1, the first private cipher key K1, the second random or partly random value RV2 and the second cipher key ID K2ID; and supporting secure sidelink communication with the second UE based on the at least one common cipher key.

5. The method of claim 4, wherein securely receiving, from the server, the first random or partly random value RV1, the first set of derived cipher keys DK1, the first private cipher key K1 and the first cipher key ID K1ID comprises receiving the first random or partly random value RV1, the first set of derived cipher keys DK1, the first private cipher key K1 and the first cipher key ID K1ID using a secure connection between the first UE and the server, the secure connection based on a public key-private key pair of the server.

6. The method of claim 4, wherein each derived cipher key DKm in the first set of derived cipher keys DK1 corresponds to a separate private cipher key PKm in the set of private cipher keys PK, wherein the each derived cipher key DKm comprises a ciphering of the first random or partly random value RV1 using the corresponding separate private cipher key PKm in the set of private cipher keys PK, wherein the first set of derived cipher keys DK1 and the set of private cipher keys PK contain equal numbers of cipher keys, wherein each private cipher key in the set of private cipher keys PK is used to determine one derived cipher key in the set of derived cipher keys DK.

7. The method of claim 4, wherein determining the at least one common cipher key based on the first set of derived cipher keys DK1, the first private cipher key K1, the second random or partly random value RV2 and the second cipher key ID K2ID comprises:

identifying a first derived cipher key in the first set of derived cipher keys DK1, wherein the first derived cipher key corresponds to a second private cipher key K2 in the set of private cipher keys PK, wherein the second private cipher key K2 is identified by the second cipher key ID K2ID;

determining a second derived cipher key based on ciphering the second random or partly random value RV2 using the first private cipher key K1; and determining the at least one common cipher key based on the first derived cipher key and the second derived cipher key.

8. The method of claim 7, wherein determining the at least one common cipher key based on the first derived cipher key and the second derived cipher key comprises:

sending a first key component to the second UE, the first key component ciphered using the first derived cipher key or the second derived key;

receiving a second key component from the second UE, the second key component ciphered using the other of the first derived cipher key or the second derived key;

deciphering the second key component using the other of the first derived cipher key or the second derived key; and determining the at least one common cipher key based on the first key component and the second key component.

9. The method of claim 4 further comprising:

sending in plain text, to each UE of the group of UEs excluding the first UE and the second UE, the first random or partly random value RV1 and the first cipher key ID K1ID;

receiving in plain text, from the each UE of the group of UEs, a unique random or partly random value RV and a cipher key ID K ID, wherein the cipher key ID KID identifies a private cipher key K of the set of private cipher keys PK configured in the each UE;

determining at least one common cipher key for the each UE based on the first set of derived cipher keys DK1, the first private cipher key K1, the random or partly random value RV and the cipher key ID KID;

sending at least one common group cipher key to the each UE, the at least one common group cipher key ciphered using the at least one common cipher key for the each UE; and supporting secure sidelink communication for the group of UEs based on the at least one common group cipher key.

10. The method of claim 4, wherein supporting secure sidelink communication for the group of UEs based on at least one common group cipher key comprises exchanging messages for a sidelink positioning protocol (SLPP) with others of the group of UEs, wherein the SLPP messages are ciphered or integrity protected or both using the at least one common group cipher key.

11. An apparatus for enabling secure sidelink communication between a group of user equipments (UEs), the apparatus comprising:

means for determining a set of private cipher keys PK and a set of corresponding cipher key IDs KID;

means for determining a random or partly random value RV for each UE of the group of UEs;

means for determining a set of derived cipher keys DK for each UE of the group of UEs based on the random or partly random value RV for the each UE and the set of private cipher keys PK, wherein means for determining the set of derived cipher keys DK for each UE of the group of UEs based on the random or partly random value RV for the each UE and the set of private cipher keys PK comprises:

means for determining each derived cipher key of the set of derived cipher keys DK based on ciphering the random or partly random value RV using a different private cipher key in the set of private cipher keys PK, wherein the set of derived cipher keys DK and the set of private cipher keys PK contain equal numbers of cipher keys, wherein each private cipher key in the set of private cipher keys PK is used to determine one derived cipher key in the set of derived cipher keys DK; and means for securely configuring each UE of the group of UEs with the random or partly random value RV for the each UE, the set of derived cipher keys DK for the each UE, one private cipher key of the set of private cipher keys PK and one cipher key ID of the set of corresponding cipher key IDs KID, wherein the one cipher key ID corresponds to the one private cipher key.

12. The apparatus of claim 11, further comprising:

means for periodically determining a new random or partly random value RV and a new set of derived cipher keys DK for each UE of the group of UEs; and means for securely configuring each UE of the group of UEs with the new random or partly random value RV and the new set of derived cipher keys DK for the each UE.

13. An apparatus for enabling secure sidelink communication between a group of user equipments (UEs), the apparatus comprising:

means for determining a set of private cipher keys PK and a set of corresponding cipher key IDs KID;

means for determining a random or partly random value RV for each UE of the group of UEs;

means for determining a set of derived cipher keys DK for each UE of the group of UEs based on the random or partly random value RV for the each UE and the set of private cipher keys PK; and means for securely configuring each UE of the group of UEs with the random or partly random value RV for the each UE, the set of derived cipher keys DK for the each UE, one private cipher key of the set of private cipher keys PK and one cipher key ID of the set of corresponding cipher key IDs KID, wherein the one cipher key ID corresponds to the one private cipher key, wherein means for securely configuring each UE of the group of UEs with the random or partly random value RV for the each UE, the set of derived cipher keys DK for the each UE, the one private cipher key of the set of private cipher keys PK and the one cipher key ID of the set of corresponding cipher key IDs KID, comprises means for configuring the each UE of the group of UEs using a secure connection between the each UE and a server, the secure connection based on a public key-private key pair of the server.

14. An apparatus for supporting secure sidelink communication between a group of user equipments (UEs), performed by a first UE of the group of UEs, the apparatus comprising:

means for securely receiving, from a server, a first random or partly random value RV1, a first set of derived cipher keys DK1, a first private cipher key K1 of a set of private cipher keys PK and a first cipher key ID K1ID, wherein the first cipher key ID K1ID identifies the first private cipher key K1;

means for sending in plain text, to a second UE of the group of UEs, the first random or partly random value RV1 and the first cipher key ID K1ID;

means for receiving in plain text, from the second UE of the group of UEs, a second random or partly random value RV2 and a second cipher key ID K2ID, wherein the second cipher key ID K2ID identifies a second private cipher key K2 of the set of private cipher keys PK configured in the second UE;

means for determining at least one common cipher key based on the first set of derived cipher keys DK1, the first private cipher key K1, the second random or partly random value RV2 and the second cipher key ID K2ID; and means for supporting secure sidelink communication with the second UE based on the at least one common cipher key.

15. The apparatus of claim 14, wherein means for securely receiving, from the server, the first random or partly random value RV1, the first set of derived cipher keys DK1, the first private cipher key K1 and the first cipher key ID K1ID comprises means for receiving the first random or partly random value RV1, the first set of derived cipher keys DK1, the first private cipher key K1 and the first cipher key ID K1ID using a secure connection between the first UE and the server, the secure connection based on a public key-private key pair of the server.

16. The apparatus of claim 14, wherein each derived cipher key DKm in the first set of derived cipher keys DK1 corresponds to a separate private cipher key PKm in the set of private cipher keys PK, wherein the each derived cipher key DKm comprises a ciphering of the first random or partly random value RV1 using the corresponding separate private cipher key PKm in the set of private cipher keys PK, wherein the first set of derived cipher keys DK1 and the set of private cipher keys PK contain equal numbers of cipher keys, wherein each private cipher key in the set of private cipher keys PK is used to determine one derived cipher key in the set of derived cipher keys DK.

17. The apparatus of claim 14, wherein means for determining the at least one common cipher key based on the first set of derived cipher keys DK1, the first private cipher key K1, the second random or partly random value RV2 and the second cipher key ID K2ID comprises:

means for identifying a first derived cipher key in the first set of derived cipher keys DK1, wherein the first derived cipher key corresponds to a second private cipher key K2 in the set of private cipher keys PK, wherein the second private cipher key K2 is identified by the second cipher key ID K2ID;

means for determining a second derived cipher key based on ciphering the second random or partly random value RV2 using the first private cipher key K1; and means for determining the at least one common cipher key based on the first derived cipher key and the second derived cipher key.

18. The apparatus of claim 17, wherein means for determining the at least one common cipher key based on the first derived cipher key and the second derived cipher key comprises:

means for sending a first key component to the second UE, the first key component ciphered using the first derived cipher key or the second derived key;

means for receiving a second key component from the second UE, the second key component ciphered using the other of the first derived cipher key or the second derived key;

means for deciphering the second key component using the other of the first derived cipher key or the second derived key; and means for determining the at least one common cipher key based on the first key component and the second key component.

19. The apparatus of claim 14 further comprising:

means for sending in plain text, to each UE of the group of UEs excluding the first UE and the second UE, the first random or partly random value RV1 and the first cipher key ID K1ID;

means for receiving in plain text, from the each UE of the group of UEs, a unique random or partly random value RV and a cipher key ID KID, wherein the cipher key ID KID identifies a private cipher key K of the set of private cipher keys PK configured in the each UE;

means for determining at least one common cipher key for the each UE based on the first set of derived cipher keys DK1, the first private cipher key K1, the random or partly random value RV and the cipher key ID KID;

means for sending at least one common group cipher key to the each UE, the at least one common group cipher key ciphered using the at least one common cipher key for the each UE; and means for supporting secure sidelink communication for the group of UEs based on the at least one common group cipher key.

20. The apparatus of claim 14, wherein means for supporting secure sidelink communication for the group of UEs based on at least one common group cipher key comprises means for exchanging messages for a sidelink positioning protocol (SLPP) with others of the group of UEs, wherein the SLPP messages are ciphered or integrity protected or both using the at least one common group cipher key.

* * * * *